(12) United States Patent
Fang et al.

(10) Patent No.: US 11,772,583 B2
(45) Date of Patent: Oct. 3, 2023

(54) SYSTEM, METHOD, AND APPARATUS FOR MANAGING VEHICLE AUTOMATION

(71) Applicant: Sonatus, Inc., Sunnyvale, CA (US)

(72) Inventors: Yu Fang, Palo Alto, CA (US); Thurston Zhu, San Francisco, CA (US); Andrew Ling, Daly City, CA (US); Yixiang Chen, Palo Alto, CA (US)

(73) Assignee: Sonatus, Inc., Sunnyvale, CA (US)

( * ) Notice: Subject to any disclaimer, the term of this patent is extended or adjusted under 35 U.S.C. 154(b) by 0 days.

(21) Appl. No.: 18/093,955

(22) Filed: Jan. 6, 2023

(65) Prior Publication Data

US 2023/0158974 A1 May 25, 2023

Related U.S. Application Data

(63) Continuation-in-part of application No. 17/833,614, filed on Jun. 6, 2022, which is a continuation-in-part (Continued)

(51) Int. Cl.
*B60R 16/023* (2006.01)
*G06F 8/65* (2018.01)

(52) U.S. Cl.
CPC .............. *B60R 16/023* (2013.01); *G06F 8/65* (2013.01)

(58) Field of Classification Search
CPC .................................. B60R 16/023; G06F 8/65
See application file for complete search history.

(56) References Cited

U.S. PATENT DOCUMENTS 6,292,731 B1 * 9/2001 Kirchhoffer ........ F16H 61/0206
701/55
9,355,507 B1 5/2016 Lee et al.
(Continued)

FOREIGN PATENT DOCUMENTS

KR 20010027471 A 4/2001
KR 100310412 B1 9/2001
(Continued)

OTHER PUBLICATIONS

PCT/US2022/046292, dated Oct. 11, 2022, Pending, Yu Fang.
(Continued)

*Primary Examiner* — Behrang Badii
(74) *Attorney, Agent, or Firm* — GTC LAW GROUP PC & AFFILIATES

(57) ABSTRACT

A system including a vehicle having a network comprising a plurality of end points and a controller, where the controller includes an automation definition circuit, an automation management circuit, and an automation execution circuit. The automation definition circuit is structured to interpret an automation trigger description and an automation action description. The automation management circuit is structured to provide a trigger detection plan and an automated action plan in response to the automation trigger description and the automation action description. The automation execution circuit is structured to determine a trigger event value in response to the trigger detection plan, and to provide an automation command in response to the trigger event value and the automated action plan, where an end point of the plurality of end points is responsive to the automation command to implement an automated vehicle response.

9 Claims, 35 Drawing Sheets

Related U.S. Application Data of application No. 17/195,589, filed on Mar. 8, 2021, now Pat. No. 11,538,287.

(60) Provisional application No. 63/197,021, filed on Jun. 4, 2021, provisional application No. 63/123,531, filed on Dec. 10, 2020, provisional application No. 63/024,383, filed on May 13, 2020, provisional application No. 62/986,444, filed on Mar. 6, 2020.

(56) References Cited

U.S. PATENT DOCUMENTS

| | | | |
|---|---|---|---|
| 9,634,892 | B2 | 4/2017 | Das |
| 9,871,819 | B2 | 1/2018 | Liyanage et al. |
| 10,616,176 | B2 | 4/2020 | Lei et al. |
| 10,650,621 | B1 | 5/2020 | King et al. |
| 10,945,199 | B2 | 3/2021 | Omiya et al. |
| 10,951,728 | B2 | 3/2021 | Lepp et al. |
| 11,165,651 | B2 | 11/2021 | Fang et al. |
| 11,228,496 | B2 | 1/2022 | Fang et al. |
| 11,252,039 | B2 | 2/2022 | Fang et al. |
| 11,349,717 | B2 | 5/2022 | Fang et al. |
| 11,362,899 | B2 | 6/2022 | Fang et al. |
| 11,411,823 | B2 | 8/2022 | Fang et al. |
| 11,538,287 | B2 | 12/2022 | Fang et al. |
| 2001/0033225 | A1 | 10/2001 | Razavi et al. |
| 2007/0229350 | A1 | 10/2007 | Scalisi et al. |
| 2008/0119983 | A1 | 5/2008 | Inbarajan et al. |
| 2008/0147250 | A1 | 6/2008 | Oesterling et al. |
| 2008/0195257 | A1* | 8/2008 | Rauch ................. B61B 1/02 701/1 |
| 2008/0258939 | A1 | 10/2008 | Smith et al. |
| 2009/0125153 | A1 | 5/2009 | Yang et al. |
| 2009/0187968 | A1 | 7/2009 | Roese et al. |
| 2010/0269155 | A1 | 10/2010 | Droms et al. |
| 2011/0153149 | A1 | 6/2011 | Jeon et al. |
| 2011/0260884 | A1 | 10/2011 | Yi et al. |
| 2013/0159489 | A1 | 6/2013 | Cha et al. |
| 2013/0311774 | A1 | 11/2013 | Larson et al. |
| 2014/0173076 | A1 | 6/2014 | Ravindran et al. |
| 2014/0325602 | A1 | 10/2014 | Kwon et al. |
| 2014/0350768 | A1 | 11/2014 | Filippov et al. |
| 2014/0359185 | A1 | 12/2014 | Sawal et al. |
| 2015/0210287 | A1 | 7/2015 | Penilla et al. |
| 2015/0276415 | A1* | 10/2015 | Shrinath ................. H04M 1/66 701/1 |
| 2016/0133063 | A1 | 5/2016 | Lim et al. |
| 2016/0163136 | A1 | 6/2016 | Lee et al. |
| 2016/0197776 | A1 | 7/2016 | Das |
| 2016/0255154 | A1 | 9/2016 | Kim et al. |
| 2016/0275158 | A1 | 9/2016 | Baset et al. |
| 2017/0054574 | A1 | 2/2017 | Wu et al. |
| 2017/0161973 | A1 | 6/2017 | Katta et al. |
| 2017/0248965 | A1 | 8/2017 | Wellman et al. |
| 2017/0339095 | A1 | 11/2017 | Lei et al. |
| 2017/0359128 | A1 | 12/2017 | Xi et al. |
| 2018/0131524 | A1 | 5/2018 | Shin et al. |
| 2018/0191636 | A1 | 7/2018 | Wang |
| 2018/0270230 | A1 | 9/2018 | Schmidt et al. |
| 2018/0293809 | A1 | 10/2018 | James et al. |
| 2018/0367525 | A1 | 12/2018 | Kassimis et al. |
| 2019/0097932 | A1 | 3/2019 | Buczek et al. |
| 2019/0108049 | A1 | 4/2019 | Singh et al. |
| 2019/0260800 | A1 | 8/2019 | Shalev et al. |
| 2019/0334763 | A1 | 10/2019 | Cawse et al. |
| 2019/0349071 | A1 | 11/2019 | Saxena et al. |
| 2019/0356574 | A1 | 11/2019 | Schoch |
| 2019/0394089 | A1 | 12/2019 | Barrett et al. |
| 2019/0394305 | A1 | 12/2019 | Kim et al. |
| 2020/0036717 | A1 | 1/2020 | Akella et al. |
| 2020/0145252 | A1 | 5/2020 | Torisaki et al. |
| 2020/0160633 | A1 | 5/2020 | Zhang et al. |
| 2020/0252339 | A1 | 8/2020 | McKeefery et al. |
| 2020/0259919 | A1 | 8/2020 | Lepp et al. |
| 2020/0264632 | A1 | 8/2020 | Sugimoto |
| 2020/0267080 | A1 | 8/2020 | Joshi et al. |
| 2020/0361487 | A1 | 11/2020 | Sakamoto et al. |
| 2021/0070321 | A1 | 3/2021 | Serizawa et al. |
| 2021/0075800 | A1 | 3/2021 | Paraskevas et al. |
| 2021/0092018 | A1 | 3/2021 | Fang et al. |
| 2021/0092019 | A1 | 3/2021 | Fang et al. |
| 2021/0155267 | A1 | 5/2021 | Goto et al. |
| 2021/0155269 | A1 | 5/2021 | Oba |
| 2021/0171042 | A1 | 6/2021 | Hayakawa et al. |
| 2021/0173911 | A1 | 6/2021 | Ohashi et al. |
| 2021/0192867 | A1* | 6/2021 | Fang .................... G07C 5/0816 |
| 2021/0234760 | A1 | 7/2021 | Fang et al. |
| 2021/0234761 | A1 | 7/2021 | Fang et al. |
| 2021/0234762 | A1 | 7/2021 | Fang et al. |
| 2021/0234763 | A1 | 7/2021 | Fang et al. |
| 2021/0407220 | A1 | 12/2021 | Fang et al. |
| 2022/0070063 | A1 | 3/2022 | Fang et al. |
| 2022/0078084 | A1 | 3/2022 | Fang et al. |
| 2022/0173969 | A1 | 6/2022 | Fang et al. |
| 2022/0173970 | A1 | 6/2022 | Fang et al. |
| 2022/0173971 | A1 | 6/2022 | Fang et al. |
| 2022/0173972 | A1 | 6/2022 | Fang et al. |
| 2022/0231917 | A1 | 7/2022 | Fang et al. |
| 2022/0297635 | A1 | 9/2022 | Fang et al. |

FOREIGN PATENT DOCUMENTS

| | | |
|---|---|---|
| WO | 2001026332 | 4/2001 |
| WO | 2021055952 A1 | 3/2021 |
| WO | 2021055955 A1 | 3/2021 |
| WO | 2021178979 A1 | 9/2021 |
| WO | 2021178979 A8 | 10/2021 |
| WO | 2022256742 A1 | 12/2022 |

OTHER PUBLICATIONS

Chapin, Peter C., et al., "Authorization in Trust Management: Features and Foundations", Retrieved on Dec. 2, 2020 (Dec. 2, 2020) from <http://lemuria.cis.vtc.edu/-pchapin/papers/chapin-skalka-wang-ACMCS2008.pdf> entire document, 48 pages.

Chen, Wai, et al., "Ad hoc peer-to-peer network architecture for vehicle safety communications", IEEE Communications Magazine, vol. 43, No. 4, 2005, pp. 100-107.

Nguyen-Duy, Jonathan, "Smart Cars: A Peek Into the Future of Converged Networks", Jan. 9, 2018, 4 pages.

PCT/US2020/051817, "International Application Serial No. PCT/US2020/051817, International Preliminary Report on Patentability dated Mar. 31, 2022", Sonatus, Inc., 22 pages.

PCT/US2020/051817, "International Application Serial No. PCT/US2020/051817, International Search Report and Written Opinion dated Feb. 24, 2021", Sonatus, Inc., 23 pages.

PCT/US2020/051817, "International Application Serial No. PCT/US2020/051817, Invitation to Pay Additional Fees and, Where Applicable, Protest Fee dated Dec. 1, 2020", Sonatus, Inc., 2 pages.

PCT/US2020/051825, "International Application Serial No. PCT/US2020/051825, International Search Report and Written Opinion dated Jan. 13, 2021", Sonatus, Inc., 15 pages.

PCT/US2021/021421, "International Application Serial No. PCT/US2021/021421, International Preliminary Report on Patentability dated Sep. 15, 2022", Sonatus, Inc., 17 pages.

PCT/US2021/021421, "International Application Serial No. PCT/US2021/021421, International Search Report and Written Opinion dated Jul. 21, 2021", Sonatus, Inc., 19 pages.

PCT/US2021/021421, "International Application Serial No. PCT/US2021/021421, Invitation to Pay Additional Fees and, Where Applicable, Protest Fee dated May 10, 2021", Sonatus, Inc., 2 pages.

PCT/US2022/032380, "International Application Serial No. PCT/US2022/032380, International Search Report and Written Opinion dated Sep. 8, 2022", Sonatus, Inc., 12 pages.

PCTUS2020051825, "International Application Serial No. SONA-0007-WO, International Preliminary Reporton Patentability dated Mar. 31, 2022", Sonatus, Inc., 16 pages.

(56) References Cited

OTHER PUBLICATIONS

Wakikawa, Ryuji, et al., "Design of Vehicle Network: Mobile Gateway for MANET and NEMO Converged Communication", Sep. 2, 2005, 2 pages.

Wang, Yujing, et al., "Adapting a Container Infrastructure for Autonomous Vehicle Development", Cornell University Library/ Computer Science/Software Engineering, Nov. 19, 2019, [online] [retrieved on Jun. 22, 2021 (Jun. 22, 2021)] Retrieved from the Internet < URL: https://arxiv.org/abs/1911.01075>, entire document,, 6 pages.

* cited by examiner

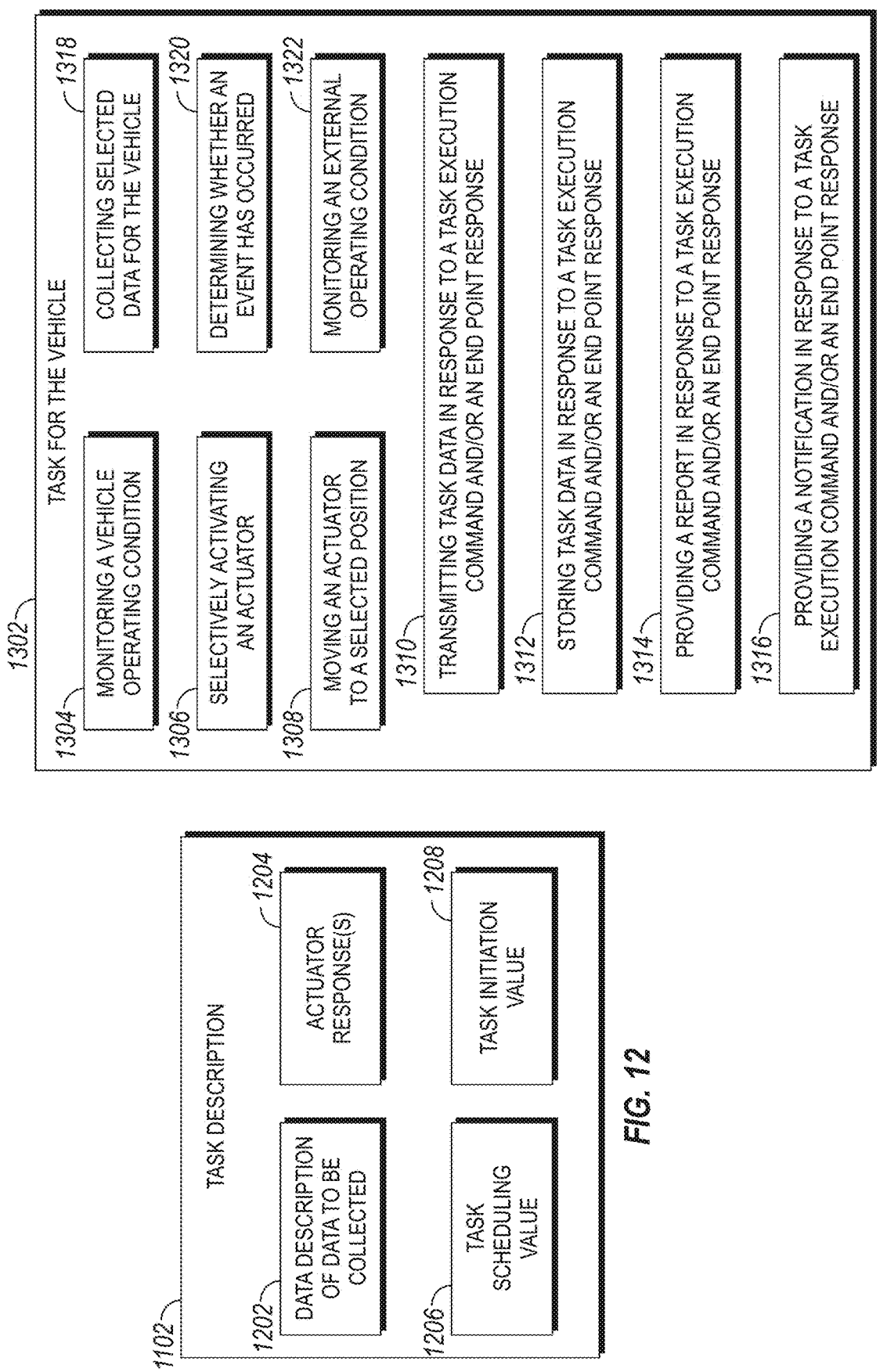

RECIPE NAME — 1504

RECIPE DATA AVAILABLE, MODIFICATIONS

| TASK NAME | TRIGGER | ACTION | CALLED TASKS |
|---|---|---|---|
| A | X < Y | MOVE ALPHA | B, C, D, E, F |
| B | X > Y | COLLECT DATA BETA | G |
| C | X < Y AND T > V | BEGIN DATA BETA | |
| D | | SET VALUE DELTA | H |
| E | | | |
| F | | | |
| G | | | |
| H | | | |

TASK RELATIONSHIPS

*FIG. 31*

SYSTEM, METHOD, AND APPARATUS FOR MANAGING VEHICLE AUTOMATION

CROSS-REFERENCE TO RELATED APPLICATIONS

This application claims priority to, and is a continuation-in-part of, U.S. patent application Ser. No. 17/833,614, filed 6 Jun. 2022 and entitled "SYSTEM, METHOD, AND APPARATUS FOR MANAGING VEHICLE DATA COLLECTION" (SONA-0012-U01), published at US 2022/0297635 A1 on Sep. 9, 2022.

U.S. patent application Ser. No. 17/833,614 (SONA-0012-U01) claims priority to and is a continuation-in-part of U.S. patent application Ser. No. 17/195,589, filed 8 Mar. 2021, now U.S. Pat. No. 11,538,287 issued 27 Dec. 2022 and entitled "SYSTEM, METHOD, AND APPARATUS FOR MANAGING VEHICLE DATA COLLECTION" (SONA-0010-U01).

U.S. patent application Ser. No. 17/833,614 (SONA-0012-U01) claims priority to U.S. Provisional Patent Application Ser. No. 63/197,021, filed 4 Jun. 2021, and entitled "SYSTEM, METHOD, AND APPARATUS FOR VEHICLE AUTOMATION MANAGEMENT" (SONA-0011-P01).

U.S. patent application Ser. No. 17/195,589 (SONA-0010-U01) claims priority to U.S. Provisional Patent Application Ser. No. 62/986,444, filed 6 Mar. 2020 and entitled "SYSTEM, METHOD AND APPARATUS FOR IMPLEMENTING CONFIGURABLE DATA COLLECTION FOR A VEHICLE" (SONA-0004-P01), U.S. Provisional Patent Application Ser. No. 63/024,383, filed 13 May 2020 and entitled "SYSTEM, METHOD AND APPARATUS FOR IMPLEMENTING CONFIGURABLE DATA COLLECTION FOR A VEHICLE" (SONA-0005-P01), and U.S. Provisional Patent Application Ser. No. 63/123,531, filed 10 Dec. 2020 and entitled "SYSTEM METHOD AND APPARATUS FOR IMPLEMENTING CONFIGURABLE DATA COLLECTION FOR A VEHICLE" (SONA-0009-P01).

All of the above patent documents are incorporated herein by reference in their entirety for all purposes.

BACKGROUND

Previously known systems are available for updating vehicle operational capabilities, adjusting the operation of vehicle features, or the like. However, previously known systems suffer from a number of drawbacks. For example, previously known systems require direct vehicle access, or utilize over the air (OTA) software updates to perform these functions.

However, previously known systems introduce significant risks, for example requiring a shutdown of the vehicle, updating software or firmware on the vehicle that imposes downtime and a risk that the vehicle will not be operational (e.g., if the update is interrupted) and/or significant management expense (e.g., keeping multiple versions of software available in case an update is unsuccessful) is imposed on updates or changes. Additionally, functionality for previously known systems is limited, for example features that result in version changes to software may be limited, or require additional verification or certification before they can be implemented. Further, previously known systems require that the entity performing the update or change has full vehicle knowledge (e.g., parameter names, hardware layout of end points, controllers, memory locations, and the like) and authority (e.g., permission to access and adjust software on a controller of the vehicle). Thus, previously known systems introduce significant costs, risks, and have limited functionality.

Vehicle communication networks are utilized to connect sensors, actuators, controllers, user interfaces, rider personal devices, trailers, and communication devices throughout a vehicle. Recent trends have been increasing the burden on these vehicle communication networks, with more devices being connected, more data passing between devices, lower latency requirements to meet vehicle performance, safety, and emissions requirements, and added vehicle features. Additionally, consumers expect increasing connectivity, enhanced and/or customized features for the vehicle, features to reduce driver burden, and other features that increase the burdens on vehicle communication networks. These trends are expected to continue, and to accelerate, for the foreseeable future.

The evolution of vehicle capabilities drives the situation where it is desirable that a greater number of entities have access to vehicle functions (e.g., manufacturers, dealers, service providers, OEMs, bodybuilders, aftermarket feature providers, and/or individual consumers). However, a number of factors drive the situation where providing capability for vehicle function changes is becoming more expensive and higher risk. For example, regulations related to safety and/or emissions, a desire for high vehicle reliability and low failure rates, and increased complexity of the vehicle itself, with multiple networks, configurations, and numerous interacting controllers on the vehicle, all come together to increase the expense, risk, and complexity to implement new functionality on the vehicle.

Further, the pace of change for a given vehicle design, including changing network types, sensors, actuators, driveline components, and the like, is increasing, which makes providing capability that reaches a broader audience, and that can reach a greater content cross-section of the vehicle even more complex, expensive, and higher risk. Additionally, a significant amount of data available on the vehicle is sensitive data, whether such data includes personally identifiable information, proprietary information, vehicle control information, or information that could be a security risk (e.g., locations of the vehicle at particular times, etc.). In sum, there is a desire to expand the base of entities that can implement functions on the vehicle and interact with the vehicle from a data or functional standpoint, while the cost and risk to do these things is increasing.

The complexities and other challenges set forth preceding have synergistic effects that cause the complexity of the vehicle data environment to be even greater than the sum of the individual contributions from each challenge.

SUMMARY

An example system includes a vehicle having a network including a plurality of end points; a controller, including: an automation definition circuit structured to interpret an automation description; an automation management circuit structured to provide an automated action plan in response to the automation description; and an automation execution circuit structured to provide an automation command in response to the automated action plan; and wherein an end point of the plurality of end points is responsive to the automation command to implement an automated vehicle response.

Certain further aspects of the example system are described following, any one or more of which may be present in certain embodiments. The automation description includes at least a portion of a policy for the vehicle. The automated action plan includes at least one of: a data description of data to be collected; an actuator response; or a trigger description. The end point of the plurality of end points includes an actuator of the vehicle.

The end point of the plurality of end points includes a sensor of the vehicle. The end point of the plurality of end points includes a second controller. The second controller is configured to provide one of a selected data value or a selected actuator command value in response to the automation command. The second controller is further configured to provide a confirmation value to the controller in response to implementing the automate vehicle response. The system further including a second end point of the plurality of end points, wherein the second end point is responsive to the automation command to implement the automated vehicle response. The end point includes a sensor, and wherein the second end point includes an actuator. The system further including the vehicle having a second network having a second plurality of end points; a second end point of the second plurality of end points, wherein the second end point is responsive to the automation command to implement the automated vehicle response. The end point includes a sensor, and wherein the second end point includes an actuator. The network includes a first network type, wherein the second network includes a second network type, and wherein the first network type is distinct from the second network type. The automated vehicle response includes at least one of: selectively activating an actuator; collection of selected data; moving an actuator to a selected position; delaying the automated vehicle response for a hold period; delaying the automated vehicle response for a detected event, wherein the automated action plan includes an event detection description; or providing a notification associated with any one or more of the foregoing. The automated action plan includes an event detection description, and wherein the automation execution circuit is further structured to detect an event in response to the event detection description, and to implement the automated vehicle response further in response to the detected event. The automation description further includes a vehicle operating condition, and wherein the automation management circuit is further structured to provide the automated action plan in response to the vehicle operating condition. The automation description further includes an external operating condition, and wherein the automation management circuit is further structured to provide the automated action plan in response to the external operating condition. The automation definition circuit is further structured to receive the automation description from an external device.

BRIEF DESCRIPTION OF THE FIGURES

FIG. 12 is a schematic diagram of an example task description according to certain embodiments of the present disclosure.

FIG. 13 is a schematic diagram of task descriptions according to certain embodiments of the present disclosure.

FIG. 31 is a schematic diagram of an example automated user interface according to certain embodiments of the present disclosure.

DETAILED DESCRIPTION

Figure 1:
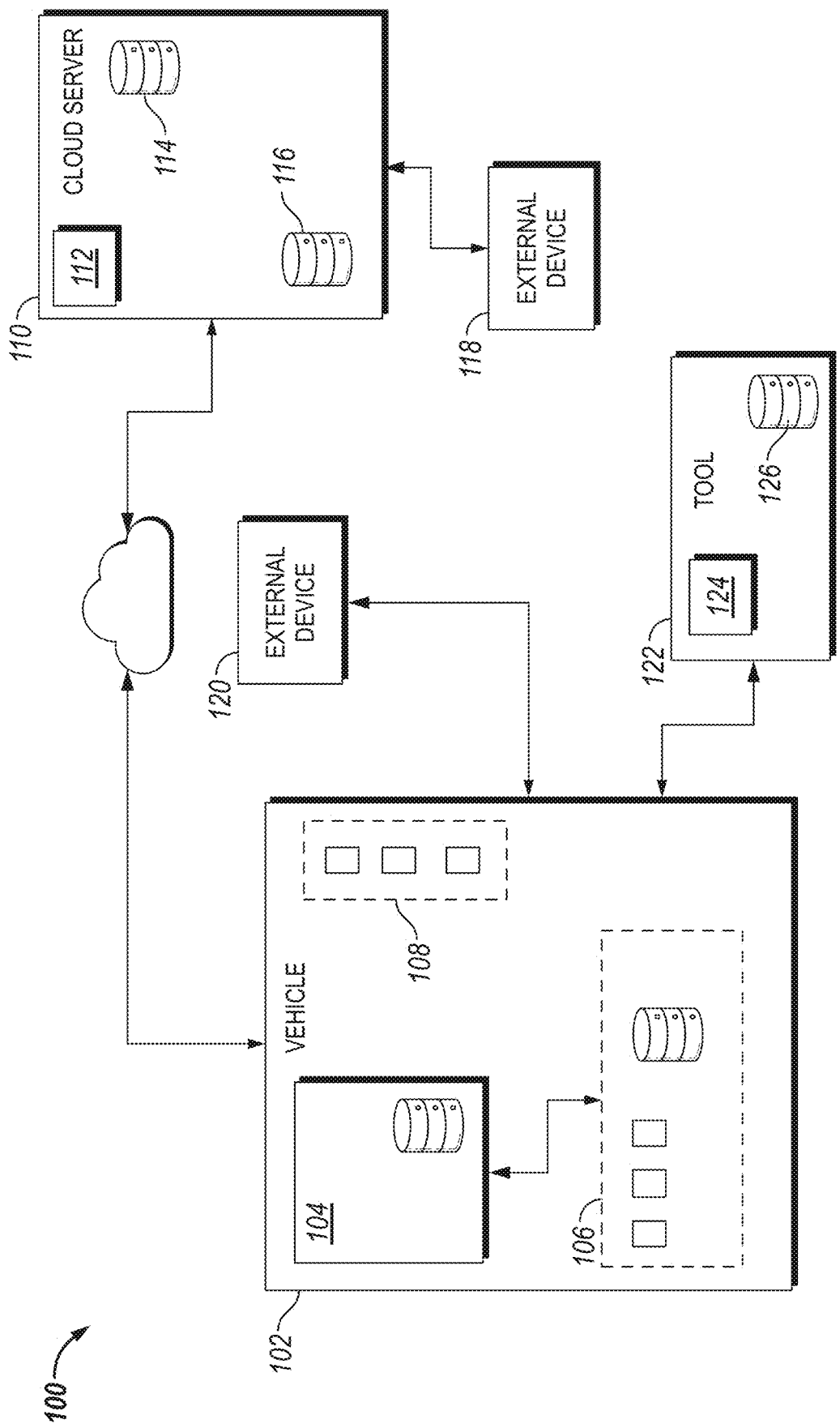
FIG. 1 is schematic diagram of an automated vehicle system according to certain embodiments of the present disclosure.

Without limitation to any other aspect of the present disclosure, aspects of the disclosure herein reduce and/or eliminate any one or more of: a cost per entity added to a vehicle functionality interaction system, a basic learning cost for a new entity to implement an application to implement new vehicle functionality, an adaptation cost to changing vehicle network configuration(s), a cost incurred to meet the increasing demand to support new vehicle functions, a cost to adapt to a changing regulatory environment, a cost to secure data and/or losses incurred for breaches or unauthorized use, and a cost to modify vehicle functions or features via software development and deployment. Certain embodiments and/or aspects of the disclosure herein may address one or more of the described cost parameters. Certain embodiments and/or aspects of the disclosure herein may increase one or more given cost parameters, but nevertheless be beneficial by decreasing the overall cost function for a target vehicle, vehicle type, entity, industry, etc. Certain embodiments and/or aspects of the disclosure herein may increase one or more given cost parameters, but provide other benefits such as improved functionality and improve time-to-market for a feature. In certain embodiments, improved functionality may be achieved at an increased cost, but at a lower cost than previously known systems configured to achieve a similar improved functionality.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Without limitation to any aspect of the present disclosure, the present disclosure references numerous operations that may be supported, in whole or part, by procedures, circuits, controllers, assemblies, engines, systems, or other components described in one or more of US applications U.S. Ser. No. 17/027,167, filed 21 Sep. 2020, entitled "SYSTEM, METHOD, AND APPARATUS TO SUPPORT MIXED NETWORK COMMUNICATIONS ON A VEHICLE" (SONA-0006-U01), U.S. Ser. No. 17/027,187, filed 21 Sep. 2020, entitled "SYSTEM, METHOD, AND APPARATUS TO EXTRA VEHICLE COMMUNICATIONS CONTROL" (SONA-0007-U01), and/or U.S. Ser. No. 17/195,589, filed 8 Mar. 2021, entitled "SYSTEM, METHOD, AND APPARATUS FOR MANAGING VEHICLE DATA COLLECTION" (SONA-0010-U01). Each one of the foregoing applications is incorporated herein by reference in the entirety for all purposes. Example supported operations include, without limitation: operations to collect data from, provide data to, and/or provide instructions to end points on a vehicle network, regardless of the network zone, and without the requestor requiring vehicle-specific information about the end point address or network location, data configuration, communication protocol, etc.; implementation of a policy for a vehicle, for example initialization, amendment, replacement, updating, authorization, etc. for the policy; configuration of network communications between zones; configuration of collected or provided data, including for example adjusting data units, data resolution, performing up-sampling and/or down-sampling of data, and/or passing data between end points on distinct network zones; storage of collected data, including short-term, medium-term, and/or long-term storage, storage of rolling buffer data to support trigger evaluations and/or execution of trigger operations, and including treatment of aging data including prioritization, deletion, transmission, summarization, and/or compression of aging data, and including a determination of whether data is aging data; transmission of any data from off-vehicle to any end point of the vehicle, and/or from any end point of the vehicle to an off-vehicle recipient, including operations to manage transmission resources and/or prioritize data for transmission; operations to support a service oriented architecture (SOA), including controlling the publication and visibility of services, controlling the subscription to services for applications, flows, end points, or the like, and operations to support execution of a service including collecting or providing related data, commands, communications, or the like; and/or operations to support providing notifications and/or alerts to users, end points, applications, or the like. Support for any of these features, as well as any other features described throughout the present disclosure, may include configurations such as: the inclusion, in whole or part, of one or more circuits, controllers, processors, engines, apparatus, and/or computing devices of the referenced applications with one or more circuits, controllers, processors, engines, apparatus, and/or computing devices of the present disclosure; cooperation between one or more circuits, controllers, processors, engines, apparatus, and/or computing devices of the referenced applications with one or more circuits, controllers, processors, engines, apparatus, and/or computing devices of the present disclosure; the inclusion, in whole or part, of one or more circuits, controllers, processors, engines, apparatus, and/or computing devices of the present disclosure with one or more circuits, controllers, processors, engines, apparatus, and/or computing devices of the referenced applications; and/or performing one or more operations, using one or more circuits, controllers, processors, engines, apparatus, and/or computing devices of the present disclosure to perform one or more operations described in a procedure and/or performable by one or more circuits, controllers, processors, engines, apparatus, and/or computing devices of the referenced applications.

Embodiments herein reference a recipe, workflow, automation description, automated action plan, automation trigger description, automation trigger plan, rules, task description, task action plan, or the like. Such terminology is utilized for clarity of the description to set forth automated vehicle operations to be performed, where the automated vehicle operations may exist in more than one location for a given embodiment, to illustrate the context of the automated vehicle operations description at various stages and/or locations in the embodiments herein. For example, a requestor of the automated vehicle operations may work with and/or request the automated vehicle operations on an automated user interface, by exercising an API, or the like, where the description of the automated vehicle operations may be simplified (e.g., using industry standard names, descriptive names for parameters, graphical depictions of operations and/or workflows, etc.), vehicle agnostic (e.g., configured without knowledge of the vehicle specific parameter names, end point locations, end point addresses, distribution of parameters on controllers and/or networks of the vehicle, etc.). In another example, a cloud application or circuit and/or a vehicle side application or circuit may adjust the description of the automated vehicle operations, for example converting the description into a data file, as a part of a policy, as a separate policy, or the like, for communication to the vehicle or as an intra-vehicle communication to an implementer of the automated vehicle operations. The example description of the automated vehicle operations utilized by the communicator of the data file, policy, plan, or the like may be distinct from the version of the description submitted by the requestor, for example configured such that the desired operations according to the automated vehicle operations can be identified and performed as desired. In another example, an implementing component, such as a vehicle controller, a circuit on the vehicle, and/or a distributed group of these, may have yet another version of the description, for example allowing the implementing component to provide specific actuator commands that can be utilized by the actuator to perform the desired operations. A recipe, workflow, automation description, automated action plan, automation trigger description, automation trigger plan, rules, task description, task action plan, or the like may be distinct elements for a particular embodiments, and one or more of these may be the same for a particular embodiment, for example depending upon where the automated vehicle operations are requested (e.g., by a cloud-connected device and/or by a direct vehicle-connected device), and/or the implementing circuit(s) for communication of the operations to the vehicle, and/or for implementing the operations on the vehicle (e.g., whether translation from an agnostic description to a vehicle description occurs on the vehicle, in the cloud, in another location such as a tool, and/or a combination of these). In certain embodiments, recipes, workflows, descriptions, plans, rules, or the like may be encrypted, for example during transmission and/or while stored (e.g., preventing access to memory from accessing an unencrypted version). In certain embodiments, the recipes, workflows, descriptions, plans, rules, or the like may be decrypted just before utilization, for example before parsing, processing for conversion to the next stage (e.g., converting and automation description to an automated action plan), execution (e.g., of a workflow on the vehicle), and/or checks (e.g., authorization, operational capability, etc.).

The present disclosure describes systems, method, and apparatuses to perform automated vehicle operations, including, without limitation to any other aspect of the present disclosure, operations to manipulate (e.g., move to a selected position, limit a range of available positions, enable or disable actuation, etc.) any actuator on the vehicle, operations to manipulate (e.g., enable or disable, adjust calibrations or other behaviors of the feature, and/or to create or eliminate features in certain instances) any feature on the vehicle, to have the vehicle perform selected functions, to collect data (e.g., data related to any actuator, sensor, fault condition, vehicle function, application, flow, or the like, and/or to collect data for utilization at a later time, whether on the vehicle or off the vehicle—for example operations to confirm or verify an aspect of the vehicle and/or another aspect of an automated vehicle operation, to support fault detection or state determination for the vehicle and/or for a group of related vehicles, etc.), operations to respond to a vehicle condition (e.g., a fault code, off-nominal operation or data value, an operator complaint or description of vehicle behavior, or the like; where the responsive operations may include responses such as: modifications to vehicle behavior to correct or mitigate the condition, operations to confirm, verify, and/or repeat the vehicle condition or behavior, and/or operations to determine conditions relevant to the vehicle condition or behavior, such as related conditions, triggering conditions, resulting conditions, etc.); operations to modify vehicle behavior (e.g., vehicle operations, data collection, actuator or feature parameters, etc.)

based on selected conditions (e.g., selected trigger conditions; and/or operating parameters such as vehicle location, operator characteristics, duty cycle, etc.). In certain embodiments, performance of automated vehicle operations, including the addition of vehicle features, can be performed without modification to base software for the vehicle—for example control software for the vehicle, for example by providing an interface where parameters in a data structure (e.g., a policy, an automation recipe, an automation action description, a task description, or the like) can be implemented to effect the automated vehicle operations without changes to the base software of the vehicle.

An example embodiment allows for the building of a feature for operation on the vehicle, either for a selected time period, to be executed a selected number of times (e.g., a single time, multiple times, periodically, etc.), to be executed until it is later removed (e.g., by the creator of the feature), or the like. A feature includes any selected operation or operational behavior of the vehicle performed or adjusted in response to any selected condition (e.g., vehicle operating condition, operator input, external condition, etc.), and may include a feature that might typically be on the vehicle (e.g., cruise control, windshield wiper delay, automatic seat positioning, etc.) or a feature that is created by a user for any purpose, such as service operations, manufacturer operations, operator convenience, operator preference, or the like.

An example embodiment allows for the modification of a feature on the vehicle, whether the feature is a pre-existing feature, or a feature created by an embodiment of the present disclosure. Modifications to a feature may include any one or more of: adjusting calibrations of the feature (e.g., which may include providing values utilized to override calibrations, with or without adjusting the actual calibrations on the vehicle); changing initiating conditions for a feature; changing enabling conditions for a feature; changing responses of the feature to vehicle operating conditions and/or to external conditions (e.g., time of day, weather, traffic, location, etc.); adjusting a range of the feature (e.g., allowed settings, speed ranges, response times, etc.); applying or adjusting a limit related to the feature, etc.

An example embodiment allows for automation of a number of operations, for example to perform a test on the vehicle without requiring dedicated tools (e.g., a service tool, manufacturing tool, or engineering tool). A test, as utilized herein, should be understood broadly, and may include operations to perform one or more of: observation of vehicle behavior, driver behavior, and/or a feature on the vehicle, which may include observing one or more of these based on specific conditions; exercising of one or more vehicle actuators, features, flows, applications, or the like; observation of vehicle behavior, driver behavior, and/or a feature on the vehicle, for example in response to the exercised aspects; confirmation of the behavior (e.g., collecting relevant data, repeating as needed based on the confidence level that the observed behavior is due to the exercising, etc.); and reporting (e.g., communicating parameters relevant to the test, including for example result values, confidence values, related data, or the like).

An example embodiment allows for automation of operations to respond to an off-nominal condition, such as an operation to respond to a detected intrusion event (e.g., where it is determined that an improper actor may be attempting to collect data, provide improper data, introduce disruptive information such as through a denial of service attack, and/or modify data improperly such as trying to perform an unauthorized control operation of the vehicle). Example operations to respond to a detected intrusion event include, without limitation, performing operations to reconfigure the network (e.g., listing requestors, addresses, or the like that should be blocked or ignored), reporting data related to the detected intrusion event (e.g., identifiers of an intrusion source; operational parameters related to the intrusion, such as attempt frequency, targets such as data, end points, control parameters, etc.; authorization data utilized during the intrusion event; and/or values utilized by the intrusion, such as communication headers, communication payloads, etc.). In certain embodiments, operations to respond to a detected intrusion event can mitigate the intrusion attempt, prevent the intrusion attempt, be utilized to detect later intrusion attempts on the vehicle or other vehicles, and/or capture data relevant to the intrusion attempt (e.g., to mitigate further damage, to identify a perpetrator, and/or to prove aspects related to the intrusion attempt).

An example embodiment allows for automation of operations to provide additional information to a user, and/or to adjust vehicle operations based on a user preference and/or user characteristic. For example, a vehicle owner that is a parent may set up a feature using embodiments of the present disclosure to provide information about another driver (e.g., their child), for example determining significant operational events such as vehicle speed values, time of day of operation, location of operation, significant acceleration events, or the like. Such information may be utilized to monitor the other driver, and/or to assist the other driver (e.g., contacting the parent when the vehicle is in a location unlikely to be consistent with normal operation, such as stopped for an extended period on a highway). In certain embodiments, automation of operations may additionally or alternatively include adjustment of the vehicle features based on the driver, for example the parent operator may set up various vehicle features (e.g., maximum speed, power rating, light configurations such as daytime headlight usage, etc.) that can assist a child driver in safe operation of the vehicle. In certain embodiments, data may be provided to the parent directly (e.g., acceleration events provided in a reporting message), and/or may be stored for selective access. The examples utilize a parent-child relationship between a primary vehicle operator and a secondary vehicle operator as a non-limiting example, but any other primary/secondary relationship is understood herein, including in a situation such as: a fleet of vehicles, vehicles used for employment, a stolen vehicle (e.g., taking certain operations in response to a vehicle theft, which may include allowing some level of vehicle operation, for example to allow the vehicle to be moved to a safe location), a loaned vehicle, a rental vehicle, etc.

The description herein utilizing off-vehicle, extra-vehicle, and/or cloud-based interactions references any external network communications of the vehicle, including without limitation wireless-based communications (e.g., mobile data, WiFi, and/or Bluetooth) to external devices. Communications to external devices may be to a general network (e.g., over the internet), a WAN, a LAN, a mobile device in proximity to the vehicle, and/or combinations of these. Certain systems and procedures described herein particularly contemplate run-time operations of the vehicle, for example external communications occurring during operating conditions wherein the vehicle is executing a mission (e.g., moving, performing operations while not moving, etc.). The disclosure herein further contemplates communications that may occur during any period, including during down-time of the vehicle and/or during service events. The disclosure herein further contemplates communications that may occur through wired communication channels, such as when the vehicle network is in communication with a service tool, on-board diagnostics (OBD) instrument, or other physically coupled device.

The description herein references vehicle applications as a non-limiting example and for clarity of the present description. However, embodiments herein are applicable to other applications having similar challenges and/or implementations. Without limitation to any other application, embodiments herein are applicable to any application having multiple end points, including multiple data sources, controllers, sensors, and/or actuators, and which may further include end points present in distinct or distributed network environments, and/or applications having historical or legacy networking or communication systems that may be transitioning (within a given system, as a class of systems, and/or as an industry) to newer and/or more capable networking or communication systems. Example and non-limiting embodiments include one or more of: industrial equipment; robotic systems (including at least mobile robots, autonomous vehicle systems, and/or industrial robots); mobile applications (that may be considered "vehicles", or not) and/or manufacturing systems. It will be understood that certain features, aspects, and/or benefits of the present disclosure are applicable to any one or more of these applications, not applicable to others of these applications, and the applicability of certain features, aspects, and/or benefits of the present disclosure may vary depending upon the operating conditions, constraints, cost parameters (e.g., operating cost, integration cost, operating cost, data communication and/or storage costs, service costs and/or downtime costs, etc.) of the particular application. Accordingly, wherever the present disclosure references a vehicle, a vehicle system, a mobile application, industrial equipment, robotic system, and/or manufacturing systems, each one of these are also contemplated herein, and may be applicable in certain embodiments, or not applicable in certain other embodiments, as will be understood to one of skill in the art having the benefit of the present disclosure.

A flow, as utilized herein, should be understood broadly. An example flow includes a related group of data (e.g., speed data, temperature data, audio-visual data, navigation data, etc.), a related group of functions (e.g., among vehicle functions, extra-vehicle functions such as service operations and/or data collection, aggregations between related vehicles, and/or combinations of these that are related for a particular system), a related group of devices (e.g., door actuators), and/or a related group of applications. Flows, as used herein, provide an organizing concept that may be utilized to relate certain data, certain end points, certain applications, and/or related functions of the vehicle or apart from the vehicle. In certain embodiments, a controller can utilize a flow to identify a data source, a data destination, permissions available for the flow, priority information related to the flow, or the like, to implement certain data regulating operations here. In certain embodiments, the controller can utilize a flow to identify a data intrusion attempt, for example by determining that a flow is providing unexpected information or operational requests, by determining that information or operational requests are coming from an unexpected location, and/or according to the frequency and/or values of information or operational requests relative to historical parameters, expected parameters, and/or pre-determined limits. In certain embodiments, the utilization of the flow allows the controller to perform separate operations that may involve the same end points to support the desired network management. For example, a vehicle speed management application may have a high priority, and a speedometer end point may be associated with the vehicle speed management application. In the example, if the vehicle speed is being communicated to support the vehicle speed management application, then the controller applies a high priority to the vehicle speed message. However, if the vehicle speed is being communicated to support a trip planning flow (e.g., where a trip planning flow is present and does not have a high priority), the controller may apply a lower priority to the vehicle speed message. In a further example, a failure of a vehicle controller, portion of a network, or other off-nominal condition may result in the migration of the vehicle speed management application to another controller in the system, whereby the vehicle speed message is being communicated (e.g., where the backup controller is on another network) to support the vehicle speed management application, and the controller may apply a higher priority to the vehicle speed message. The utilization of flows and applications to organize the components of the system allows for the same or similar information to be regulated by the controller in a differential manner to support various functions, allowing for improvements in the performance and security of network regulation operations (e.g., reducing unnecessary cross-network traffic, and providing information only as needed), and supports additional functionality relative to previously known systems, such as redundancy support, distributed control, and granular cross-network messaging.

Embodiments of the present disclosure provide for systems, apparatuses, and methods for operating and/or managing vehicle automation features and/or functions. Embodiments herein allow for the addition, deployment, configuration, and/or updating of vehicle automation features and/or functions without coding (e.g., algorithm development, compiling, and/or updating of computer readable instructions, operating system changes, and/or firmware updates). Embodiments herein allow for the addition, deployment, configuration, and/or updating of vehicle automation features utilizing an index of automation recipes, interactions with an operator, and/or interactions with an application that further interfaces with an operator, owner, service personnel, manufacturer, fleet personnel, and/or OEM. Embodiments herein support management, initiation, and/or updating of flexible triggers for vehicle automation features and/or functions, and/or execution of vehicle automation features and/or functions.

Embodiments of the present disclosure provide for systems, apparatuses, and methods for managing and/or operating vehicle remote control enhancements. Embodiments herein allow for reduced latency and/or no latency vehicle-external network communications, for example utilizing low power persistent vehicle-cloud communications. Embodiments herein allow for extensive control functions for customer support, customer service, business analysis, manufacturer/OEM application differentiation, consumer applications, customized features, and/or aftermarket features. Embodiments herein allow for implementation of remote control enhancements utilizing programmable complex control procedures, with high capability for secure access to vehicle networks, devices, end points, and/or flows, and for access to ancillary aspects to allow for implementation of high capability features (e.g., determining supporting vehicle states, conditions, etc., and/or capabilities to ensure mission functions are not inhibited).

Embodiments of the present disclosure provide for systems, apparatuses, and methods for management and/or operation of shared network storage for a mobile application having a number of data storage devices associated therewith, and/or may further include where the number of data storage devices are distributed across at least two networks and/or across networks of a mixed network for the mobile application. Embodiments include a unified storage shared by multiple applications, flows, processors, circuits, end points, devices, services, and the like. Embodiments herein provide for network file system access to end points, devices, applications, and/or flows on the networks of the mobile application. Embodiments herein provide for an overlaid database service for shared stored data, and/or portions thereof. Embodiments herein provide for selected encryption schemes for shared stored data, including at least encryption of data at rest. Embodiments herein provide for authentication, access control, and auditing of shared network storage operations, including at least scheduled operations according to a policy, permissions of participating devices, etc. Embodiments herein provide for data life cycle management of shared stored data, including at least: implementation of policies; data retention schemes; and/or prioritization between devices, end points, applications, flows, related services, data types, and/or determined operating conditions of the mobile application.

Implementations of the present disclosure are provided as a service oriented architecture (SOA), faster development, code reuse, reduced complexity, and easier deployment. OEMs benefit from reduced development costs, improved time-to-market, reduced warranty expenses, and recall expenses. Customer benefits include vehicles with more capabilities, feature upgrades after purchase, and less inconveniences due to work associated with warranties and/or recalls. A SOA, as used herein, includes operations for devices, end points, applications, and/or flows to publish (e.g., a service provider) the availability of a service (e.g., data values, actuator operations, and/or functions available), and to subscribe (e.g., a service requestor) or otherwise request an available service. Services may be selectively published (e.g., only to subscribers having sufficient permissions, and/or only by providers having sufficient permissions). Services may have distinct permissions on both the publication and request side, for example with owners, manufacturers, OEMs, body builders, fleet operators, third-party applications, etc. having distinct permissions to publish and/or request services. Service providers and/or requestors may be on-vehicle or off-vehicle.

Examples of the present disclosure provide for the ability to provide frequent feature upgrades, addition or removal of features, and a personalized configuration of features for a mobile application. An example embodiment enables customized vehicle behavior by providing a simple, flexible, automation capability. An example embodiment includes an interface and integration tools allowing developers and users to quickly and easily create custom workflows that manipulate vehicle features based on user input and vehicle state.

Example embodiments allow users to create custom trigger-action rules to automate the vehicle environment, and to allow in-vehicle capabilities that were not previously available. For example, embodiments herein include customer control of cabin temperature, lighting, infotainment, seats, windows, sunroof, cabriolet top, driving mode, and/or adjustment of any other actuator or vehicle interface in response to voice commands, smart phone inputs, buttons in the vehicle, and/or detected vehicle operating conditions or events.

Example operations are described following to illustrate a few operations of a type supportable by embodiments of the present disclosure. The example operations are non-limiting, and an example automation manager is capable to respond to any input capable of being provided as a network communication and/or data parameter stored on a computer readable medium, and to provide any response capable of being commanded to any actuator in the system, including actuators under the control of another controller in the system (e.g., a vehicle display, system speakers, vehicle powertrain, etc.).

An example customized operation includes an operation to set the passenger's seat heating in response to a driver tapping a driver's seat heating switch twice and setting the passenger's seat heating. The example operation returns the driver's seat heating switch to control of the driver's side heating after a brief delay (e.g., a few seconds). The example operation allows the driver to conveniently set the passenger seat heating from the driver's side of the vehicle.

An example customized operation includes an operation to configure a number of vehicle aspects in response to a command, such as "Hey car, start my morning commute." In the example, configured vehicle aspects may include tuning the radio to a selected station and volume, setting a pre-selected navigation destination (e.g., an office), setting the performance mode of the vehicle (e.g., fuel economy mode), setting the driver's seat position (e.g., forward/reverse, height, tilt, lumbar support, etc.), and/or setting HVAC parameters (e.g., selected cabin temperature). In certain embodiments, a customized operation may include further interactions based on ambient or external conditions, such as utilizing a different radio station depending upon the day of the week, adjusting HVAC settings based on ambient temperature, adjusting navigation according to a number of people in the vehicle, and the like.

An example customized operation includes an operation to configure a number of vehicle aspects in response to a system condition, such as an approach of the vehicle to the driver's home at night. In the example, the customized operation implements a workflow that dims the headlights, lowers the radio volume, sends a message to a home automation system to turn on lights and open the garage door, and retracts the side mirrors as the car pulls into the garage. In certain embodiments, the approach of the vehicle to the driver's home at night may be determined by any operations, such as determining from GPS coordinates, direct interaction with a network of the home automation system, etc.

An example customized operation includes an operation to configure a number of vehicle aspects in response to an input, such as a hard coded button on a vehicle display. An example includes setting an HVAC system of the vehicle to a desired temperature in response to the hard coded button, without having to navigate a climate control system, utilize multiple button presses, and/or turn related knobs where visibility may be lacking (e.g., the vehicle is dark) and/or the driver does not want to utilize attention to find and focus on the related knobs.

An example automation manager (or vehicle automation manager) allows users to create arbitrary trigger-action rules which can be executed on the vehicle, such as by the centralized controller. For instance, the user could create a trigger-action rule that would automatically turn on the high-beam headlights when there is no oncoming traffic while driving at night. An example schematic flow description of the customized operation includes:

The user accesses an app on her phone or web browser and uses it to create custom trigger-action rules, or enable predefined ones created by the OEM;

The trigger-action rules are sent to the cloud, and the enabled trigger-action rules are consolidated as a "recipe" on the cloud side;

The cloud pushes the recipe to the vehicle through a vehicle update controller (VUC—for example embodied on an automation manager 1404) (e.g., downloading, storing, and installing configuration information related to customized operations);

When the trigger evaluation engine receives the latest recipe, it analyzes each workflow in the recipe and executes each workflow in a controlled and isolated manner;

Accounting data (such as the number of times a trigger-action rule has been executed, trigger event detections, trigger event data, and/or events where the action is taken or triggered but suppressed based on operating conditions, etc.) is sent back to the cloud, where it can be further reviewed, e.g., from the phone app and/or other monitoring application It can be seen that the vehicle automation manager 1404 allows users to enrich their vehicle experience without waiting for a feature request, approval, and update process. The example vehicle automation manager further allows the user to leverage their own creativity and/or the creativity of $3^{rd}$ party application providers to implement improved vehicle interactions. Additionally, the vehicle brand owner (e.g., manufacturer or OEM) or other supporting or responsible party can implement trigger-action rules to more rapidly and/or more frequently provide updates or features to many users, or even to specific users.

An example Vehicle Automation Manager (VAM) takes recipes from the cloud as inputs and executes the trigger-action rules in the recipes. Each trigger-action rule is composed of triggers, conditions, and actions. The triggers are the inputs to the rule that encompass signals from the CAN bus, time, location, diagnostic states, vehicle status, video/audio, driving log, etc. Conditions take trigger input values and decide if certain conditions are met.

The conditions are described using a custom syntax, in order to express complex logical conditions, such as multi-level AND/OR logic, comparators, and advanced utility functions to calculate sum/mean/stddev etc. If the conditions are met, then the corresponding actions will be executed, and/or requested (but may be blocked due to operating conditions, etc.). The actions could include calling services in the SOA or sending CAN signals to the CAN ECUs.

Figure 56:
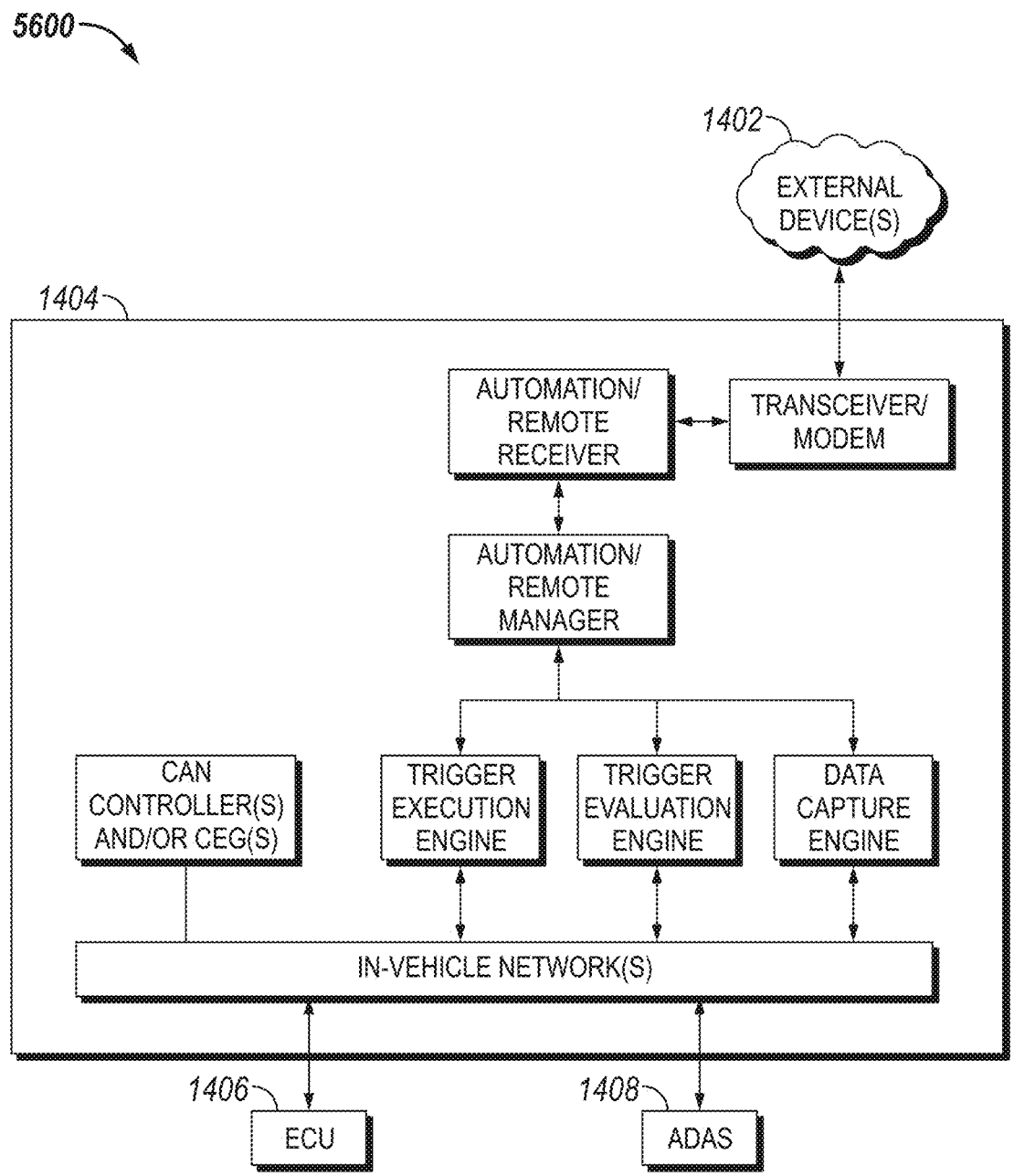
FIG. 56 is a schematic diagram of an example automation manager according to certain embodiments of the present disclosure.

Referencing FIG. 56, an example apparatus 5600 includes an automation manager 1404 is schematically depicted, and positioned on a centralized controller. In the example of FIG. 56, the automation manager 1404 receives recipes (and/or configuration information describing a customized operation) from the cloud using MQTT/HTTP/WebSocket, etc. The VAM controls the vehicle automation based on the recipes, and includes a lexical engine to parse the recipes, and a rule engine to orchestrate the rule execution by leveraging a trigger evaluation engine and a task execution engine (and/or a trigger execution engine). Operations of the automation manager such as in FIG. 56 may include vehicle automation operations, event trigger operations, remote control operations, and/or any configurable operations performed in response to an application, feature, trigger, or other automated application created by a manufacturer, OEM, fleet owner, vehicle owner, vehicle operator, and/or a third party.

An example trigger evaluation engine takes trigger data as inputs and evaluates the trigger conditions based on the trigger data values. The trigger data can come from any network, such as a CAN bus, for example using a configurable edge gateway to adjust the routing table to retrieve the signal values dynamically. In addition, the data could also come from any ECU 1406, such as a Ethernet ECU through a SOA, from other modules on the centralized controller (e.g., Diagnostic Server), or raw sensor data such as video/RADAR/LiDAR streams over Ethernet or other types of network (for example to support an advanced driver assistance system—ADAS 1408). The centralized controller may further share the data collection performed for customized operations with other aspects of the system, such as data collection operations for other purposes, and/or between multiple customized operations utilizing at least some of the same trigger data parameters, thereby reducing redundant requests for the same data parameters. In certain embodiments, data collection may be a separate operation that may additionally be based on a trigger condition, and/or data collection may be performed as a customized operation.

In the example of FIG. 56, the trigger manager (e.g., as the automation/remote manager in the example of FIG. 56) manages triggers from various trigger related clients, such as vehicle automation, remote control, and/or data collection triggered flows. The example in FIG. 56 further includes a data listener that receives data related to the triggers, which may be taken from any location in the vehicle, such as: a CAN bus; Ethernet packets (including EthCC packets having state information such as vehicle location); a diagnostic manager providing DET errors, RDBI data, fault codes, etc.; a system manager (e.g., providing vehicle power state information); a time manager (e.g., providing a current time value); and/or any other information such as from the SOA. The trigger data may also be taken from any location outside of the vehicle, such as a REST API endpoint in the cloud.

In the example of FIG. 56, the data cache stores the data for condition evaluation, for example including buffered data, intermediate parameters, etc.

In the example of FIG. 56, the condition evaluation runtime is an engine to evaluate the conditions based on the trigger values in the cache, and to determine whether the trigger condition is met in response to the evaluation. The condition evaluation supports any type of analysis or determination operations, including at least: basic logical operators (e.g., AND, OR, numerical comparisons, etc.); nested logical expressions with appropriate formatting (e.g., ((X>5 && Y<10)||Z !=100) && P<0.05); math functions (e.g., arithmetic, exponential, trigonometric, modular, gamma, etc.); and/or complex data transformation functions over a range of data (e.g., median; mean; standard deviation; map; reduce; min/max; bucketing; filtering; integrating; derivating; and/or frequency analysis operations).

In the example of FIG. 56, the task execution engine performs actions defined in the action catalog (e.g., the actuators to be adjusted according to the customized operation). Example and non-limiting actions include turning on a light, turning on and/or adjusting the HVAC, turning on the ignition, etc. Embodiments of the present disclosure are capable to access any actuator that is reachable through any network, including actuators provided on more than one network (e.g., an Ethernet for one actuator, and a CAN for the other actuator). In certain embodiments, actions include a request for operation of an actuator (e.g., to another controller having direct control of the actuator), actions to request a published service be performed, and/or actions having complex interactions which may further be present on more than one other controller. For example, an action includes adjusting the ambient environment for the current user, which may include interacting with multiple controllers and/or flows, for example to determine a current user identity, her preferences, and adjusting the environment such as seat position, HVAC settings, radio channels, etc. The actions may also include calling a REST API in the cloud, sending a SMS message to a contact, etc.

In certain embodiments, the automation manager advertises one or more customized operations as a service (e.g., which may be selectable by the requestor of the customized operation, defined in a policy, etc.). In certain embodiments, components, circuits, controllers, and/or engines of the automation manager are shared in whole or part with other managers such as a remote control manager, and/or may be responsive to other managers using an API, library calls, or other interaction interface, for example to determine whether a specified group of data and trigger logic (e.g., passed from the other manager to the automation manager) indicates that a trigger event has occurred (e.g., determined by the condition evaluation runtime), and/or to implement an operation provided by another manager (e.g., passed as an operation request from the other manager to the automation manager) to be implemented (e.g., operated by the task execution engine to move the actuator and/or provide appropriate commands to other controllers).

Implementations of the present disclosure provide for rapid development and deployment of customizable operations, automation implementation without coding and/or compilation requirements, access to customization for customers, $3^{rd}$ party applications, aftermarket suppliers, etc. Implementations of the present disclosure provide for ease of implementation of customizable operations even where data providers and/or actuators are distributed across more than one network type, and do not require that providers for customizable operations have knowledge of the present configuration of on vehicle networks.

Examples of the present disclosure provide for the ability to perform remote control operations for a mobile application. Remote control operations for certain features may be hard-coded in the ECU software—for example simple operations such as start/stop operations of the engine, lock/unlock operations of the doors, open/close operations of the windows and/or sunroof, etc. However, adding or changing functionality after production is complete for such features requires code changes and verification, which may include re-qualification of one or more ECUs, and/or software builds on those ECUs, that participate in remote functions. Embodiments of the present disclosure are capable to configure remote control operations of a mobile application at any point in the life cycle of the vehicle, and further allow for configuration, updating, and fixing of remote operations included at the time of manufacture. Additionally or alternatively, where a more robust remote control implementation is present such as set forth in the present disclosure, features that would previously be hard-coded may be implemented as a dynamic feature as set forth herein.

Example operations are described following to illustrate a few remote control operations of a type supportable by embodiments of the present disclosure. The example operations are non-limiting, and an example remote control manager is capable to respond to any input capable of being provided as a network communication and/or data parameter stored on a computer readable medium, and to provide any response capable of being commanded to any actuator in the system, including actuators under the control of another controller in the system (e.g., a vehicle display, system speakers, vehicle powertrain, etc.).

An example operation includes receiving a customer configuration of a scheduled acclimatization, where remote control operations include activating the HVAC system at a scheduled time (e.g., 7 AM) on selected days (e.g., weekdays), to a selected condition (e.g., a selected temperature, and/or utilization of defrost to ensure the windows are clear). In certain embodiments, the customer may configure the operation using an application (e.g., a $3^{rd}$ party application), using a cloud or web-based interface, and/or using an application provided by a manufacturer, dealer, etc. In certain embodiments, an operator selects a recipe for a remote control operation (e.g., which may include prompts to set certain parameters, and/or may be only an instruction or approval to turn a feature on or off). In certain embodiments, an operator builds a customized remote control operation, which may, for example, be based upon customized operation features present on the vehicle, available in a recipe, and/or may be built entirely by the user interacting with an interface to allow the entry of operations to be performed, any conditions to be applied, and settings for any thresholds, etc.

An example operation includes the remote control manager responding to a progressive preconditioning command to heat the cabin of the vehicle in a selected order, such as using the HVAC to get cabin air to a desired temperature, then activating a heated steering wheel and/or heated seat function.

An example operation includes the remote control manager responding to a user setting request, and adjusting the vehicle configuration (e.g., steering column position, ambient light color, interior/dash light brightness, UI/UX style selection, etc.) in response to the user setting request.

An example operation includes a vehicle management setting (e.g., a valet mode, borrowed vehicle mode, configured mode for a child of the parent owner when driving the vehicle, etc.), for example to reduce a vehicle speed limit, a location limit (e.g., a geofence perimeter of 500 m from an activation location, limits with defined areas such as a city limit, and/or outside of defined areas such as a state line, another city limit, a total distance from an activation location, etc.). The applied limits for the vehicle management setting may be an actual applied limit (e.g., a maximum speed, performance value, etc.) or a notification limit (e.g., typically a geographic restriction may be implemented as a notification limit rather than a shutdown limit), where a notification is sent to the owner and/or to a selected device if a limit of the vehicle management setting is exceeded (and/or tested, such as with an actual applied limit).

An example operation includes a security mode, for example requesting data from a camera, microphone, vehicle display, dashboard, etc., in response to a request for the security mode. In certain embodiments, the user can select one or more devices (e.g., specific cameras and/or locations within or relative to the vehicle), and can receive streaming video and/or a snapshot from the selected device(s). In certain embodiments, the security mode allows for a data request from a device communicatively coupled to the vehicle, for example a security camera of a home security system in communication with the vehicle (e.g., see customized operations preceding).

An example operation includes a personalized operation, such as playing "Happy Birthday to You" and/or manipulating cabin lights upon the driver entering the vehicle on her birthday. Additionally or alternatively, a personalized operation can be any type of operation such as: playing a selected song or play list on a given calendar date, day of the week, etc.; reminding an operator of a calendar event (e.g., linking to a calendar function of a smart phone, etc.), an anniversary, etc. upon entry to the vehicle; and/or reminding an operator of a scheduled stop (e.g., picking up groceries upon entering the vehicle to return home from work).

Example and non-limiting remote control operations include performing one or more operations, such as: sending a note to the operator, showing the note on a vehicle display, and/or announcing the note on a speaker; taking a snapshot from one or more cameras and sending it to an operator and/or requestor; allowing a $3^{rd}$ party service (e.g., mobile re-fueling, vehicle service, and/or delivery company) to access vehicle location and door status, but only under specified conditions (e.g., selected times of the day, until the completion of an event, and/or in response to a proximity of the $3^{rd}$ party service to the vehicle); beginning start-up operations of the vehicle, a controller, the head unit, etc., as an operator approaches; reacting to environmental changes by defrosting the vehicle (e.g., in response to frost build-up, ambient temperature determination, etc.); and/or running a scheduled test for diagnostic purposes (e.g., running an active diagnostic test when the operator is away from the vehicle, reducing impact of the test on the vehicle mission).

Example remote control operations include a prerequisite condition, a task, and/or a status report. The prerequisite condition includes any combination of vehicle status, CAN signals, Ethernet packets, information stored on a computer readable medium (e.g., log information, trip information, and/or other vehicle information stored in a memory location), time and/or date, location, etc. to be utilized as a prerequisite trigger condition for the remote operation, and can further be configured as a complex logical expression and may further be based on a number of conditions. The task includes an action that can be performed utilizing a CAN signal, Ethernet packet, or other network communication, including at least any action described under customized operation preceding. The status report includes acknowledgement information, confirmation that an operation was performed and/or notification that an operation was not performed, related data, confirming data, utilization data related to the remote control operation, etc. The content of the status report may vary with the recipient and/or requestor of the status report—for example the operator may receive a simple status report confirming the operation, a service personnel may receive a more detailed status report with associated parameters related to the operation, and a manufacturer may receive a detailed status report with personally identifiable information removed (e.g., to compile reliability data, while allowing for storage and aggregation of the data without having to manage personally identifiable information). The presence and/or content of the prerequisite condition, task, and/or status report may be provided and/or updated by user input, policy, and/or configuration information.

An example remote control solution supports the specification of a final vehicle state (to which the vehicle should return) after all the remote control functions are completed (e.g., an operating condition, interior cabin settings, a battery state of charge, etc.). This vehicle state can be different than the vehicle state when the request was received. It is also configurable and programmable, similar to the task.

Again referencing FIG. 56, an example remote control manager is schematically depicted, being a part of a centralized controller in the example, although the remote control manager may be a distinct device, and/or positioned on another device. The interface to the CAN controller may be performed through a configurable edge gateway. In the example, the task execution engine and trigger evaluation engine is depicted as separate and dedicated to the remote control manager, solely for clarity of the present description. The task execution engine and/or trigger evaluation engine may be positioned, in whole or part, with another device or controller such as an automation manager, shared between the remote control manager and the automation manager, and/or each of the remote control manager and automation manager (where present) may have separate trigger evaluation engine(s) and/or task execution engine(s).

A mission, vehicle mission, or other similar terminology as used herein should be understood broadly. A mission, as utilized herein, references any one of: a primary function; an intended function; a critical function; and/or a minimum enabling function (e.g., a function required for operations to be considered normal, and/or acceptable to allow continued operation). A mission, for example of the vehicle, may depend upon the current operating condition of the vehicle and/or an intended use of the vehicle. For example, a vehicle mission may include an ability to provide motive power and/or motive operation, and may further include a performance description such as a minimum available power, torque, and/or vehicle speed (e.g., which may be the same as, or lower than, rated values for these). In another example, a mission may be an ability to provide power and/or functionality of a system of the vehicle—such as a light, communication operations, holding operations, cabin environment operations, or the like. In certain embodiments, some level of operation of the vehicle or component may be available, where the vehicle or component is not mission capable—for example where motive operation is available, but below acceptable performance characteristics for the vehicle. In certain embodiments, a mission related aspect may not affect the performance of the vehicle but nevertheless be mission critical—for example a loss of air bag function, ABS function, or the like may not prevent operation of the mission (e.g., motive operation), but nevertheless be considered mission critical for the vehicle to continue operation in an acceptable manner. It can be seen that the mission of a vehicle, component, control operation, or the like may depend on the context of the vehicle, including design considerations, purpose of the vehicle, policies and/or preferences of an entity related to the vehicle (e.g., a fleet owner, vehicle owner, regulatory authority, etc.), geographic location of the vehicle, and/or terrain position of the vehicle (e.g., current altitude, grade, road type, etc.). A data value or other feature may be a mission critical and/or mission related data value or feature on a first vehicle but not on a second vehicle, and/or at a first time for a given vehicle but not at a second time for the given vehicle. One of skill in the art, having the benefit of the present disclosure and information ordinarily available for a vehicle and components thereof, can readily determine whether a data value, control operation, component, or other element of the system is mission critical and/or mission related. Certain considerations to determine whether a data value, control operation, component, or other element of the system is mission critical and/or mission related include, without limitation: a rating of the vehicle, an intended use of the vehicle, a quality of service requirement associated with the vehicle, a warranty description of the vehicle or a component thereof, a duty cycle expected for the vehicle, a geographical operating region of the vehicle, a terrain operating region of the vehicle, regulatory requirements associated with the vehicle, and/or policy considerations associated with the vehicle.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Referencing FIG. 1, an example system 100 to provide, create, deploy, implement, and/or support automated vehicle response activities. An automated vehicle response activity as used herein should be understood broadly, and includes, without limitation to any other aspect of the present disclosure, operations such as: control of any actuator on the vehicle, and/or communicatively coupled to the vehicle; collection of selected data available on the vehicle, including operations to generate and/or communicate data that might otherwise not be available; providing notifications or alerts, for example in response to detected conditions, vehicle data having selected values, ranges, or thresholds, etc.; enabling or commencing monitoring operations, conditional operations, or the like; triggered embodiments of any one or more of the foregoing (e.g., determining whether a trigger is present, and responding to the presence, or lack, of the conditions detected by the trigger); scheduled embodiments of any one or more of the foregoing (e.g., where the scheduling includes commencement timing, implementation timing, data storage timing, delay periods, or the like, and where the scheduling may be applied to trigger evaluation, automated operations, notifications, alerts, data storage, data transmission, related communications, etc.); and/or implementing a workflow of any type (e.g., implementing a single action, a sequence of actions, a branched action sequence, a cyclical action sequence, a repeated action sequence, and/or an operation of a state machine).

The system 100 of FIG. 1, as well as systems, apparatuses, assemblies, controllers, circuits, procedures, and/or other embodiments of the present disclosure allow for implementation of automated vehicle responses with one or more features such as: the ability to provide robust vehicle functionality and complex workflows without changing the base software, firmware, or other aspects of a vehicle controller that may otherwise require additional certification, testing, debugging, or the like; the ability to expand automated vehicle response implementation to a wider group of people or entities, such as end consumers, vehicle owners, vehicle operators, fleet managers, dealers, service personnel, original equipment manufacturers (OEMs), vehicle assemblers/body builders, aftermarket component providers, or the like; the ability to provide robust vehicle functionality and complex workflows without requiring that the creator have vehicle specific knowledge about available data, sensors, actuators, or the like; the ability to schedule permissions and authorization to ensure that creators do not have access to data or vehicle functions that they should not; the ability to configure data for the specific creator and/or recipient of the data, for example to protect proprietary information (e.g., control algorithms, including algorithmic steps, response times, data resolution, or the like), to protect personally identifiable information (PII), etc., while expanding the available data that can be used by creators (e.g., sensitive data may be available in embodiments of the present disclosure that would not be otherwise, for example by providing the data with reduced resolution, with some dynamic information removed or changed, and/or at a changed sampling rate); and/or the ability to configure actuator or vehicle control access for the specific creator and/or beneficiary of automated vehicle responses (e.g., the vehicle operator) while expanding the available automated vehicle responses that can be used by creators (e.g., by limiting the access to the actuators/controls to specified conditions, set points, requested vs. commanded operations, or the like, according to permissions or authorizations associated with the creator and/or the beneficiary, and/or according to separate rules that protect selected vehicle functions).

The example system 100 includes a vehicle 102 having a number of network zones 106, 108, each having a number of end points. For example, network zone 106 in the example of FIG. 1 depicts four end points on the network zone 106, including one end point represented as a data store, and three end points on the network zone 108. The example of FIG. 1 includes a controller 104, depicted schematically as being in communication with each network zone 106, 108, and having a separate associated data store. In certain embodiments, the controller 104 may be provided as an end point of a network zone 106, 108, and/or the controller 104 may include a converged network device (CND)—for example to regulate and facilitate communications between network zones 106, 108 of the vehicle, and/or communications with external devices, cloud servers, service tools, manufacturing tools, etc. The example system 100 includes a cloud server 110 having a controller 112 and separate data stores 114, 116, and a tool 122 having a controller 124 and data store 126. The example tool 122 may be any type of tool, including for example a service tool, manufacturing tool, but may include any type of tool such as an engineering tool, aftermarket tool, consumer oriented tool, or the like. The example system 100 depicts an external device 120 connected directly to the vehicle 102 (e.g., a mobile phone or laptop connected directly to the vehicle 102), for example an operator device, a service device, a fleet management device, or the like. The example system 100 depicts an external device 118 connected to the cloud server 110, for example using a web portal, a mobile application, proprietary application, or the like. The example components depicted in FIG. 1 are a non-limiting example, and a given system 100 may include or omit any of the components depicted in FIG. 1. In certain embodiments, a component may be a part of the system 100 at a first time (e.g., while external device 120 is communicatively coupled to the vehicle 102), and not a part of the system 100 at a second time.

The example controllers 104, 112, 124 are depicted in an example arrangement. Aspects of the present disclosure, including circuits, controllers, engines, or the like, may be provided in whole or part on depicted controllers 104, 112, 124 in any arrangement, distributed across depicted controllers, positioned in other locations (e.g., on a network zone 106, 108, including being positioned in whole or part on an end point of a network zone 106, 108), and/or positioned in distinct locations depending upon the current operating condition of the system (e.g., a circuit positioned on the cloud server 110 in a first operating condition, and positioned on a service tool 122 in a second operating condition), time of day, calendar date, position of the operator, position of the vehicle 102, etc. The example data stores depicted in FIG. 1 may be positioned at any place in the system 100, and any data store that is at least selectively or intermittently in communication with any controller embodying a portion of the system 100 is contemplated herein as a data store for certain operations herein, including at least storing data, moving stored data, providing data to an operator or other entity associated with the vehicle (e.g., service personnel, fleet management personnel, a manufacturer, owner, dealer, aftermarket provider, etc.).

Figure 2:
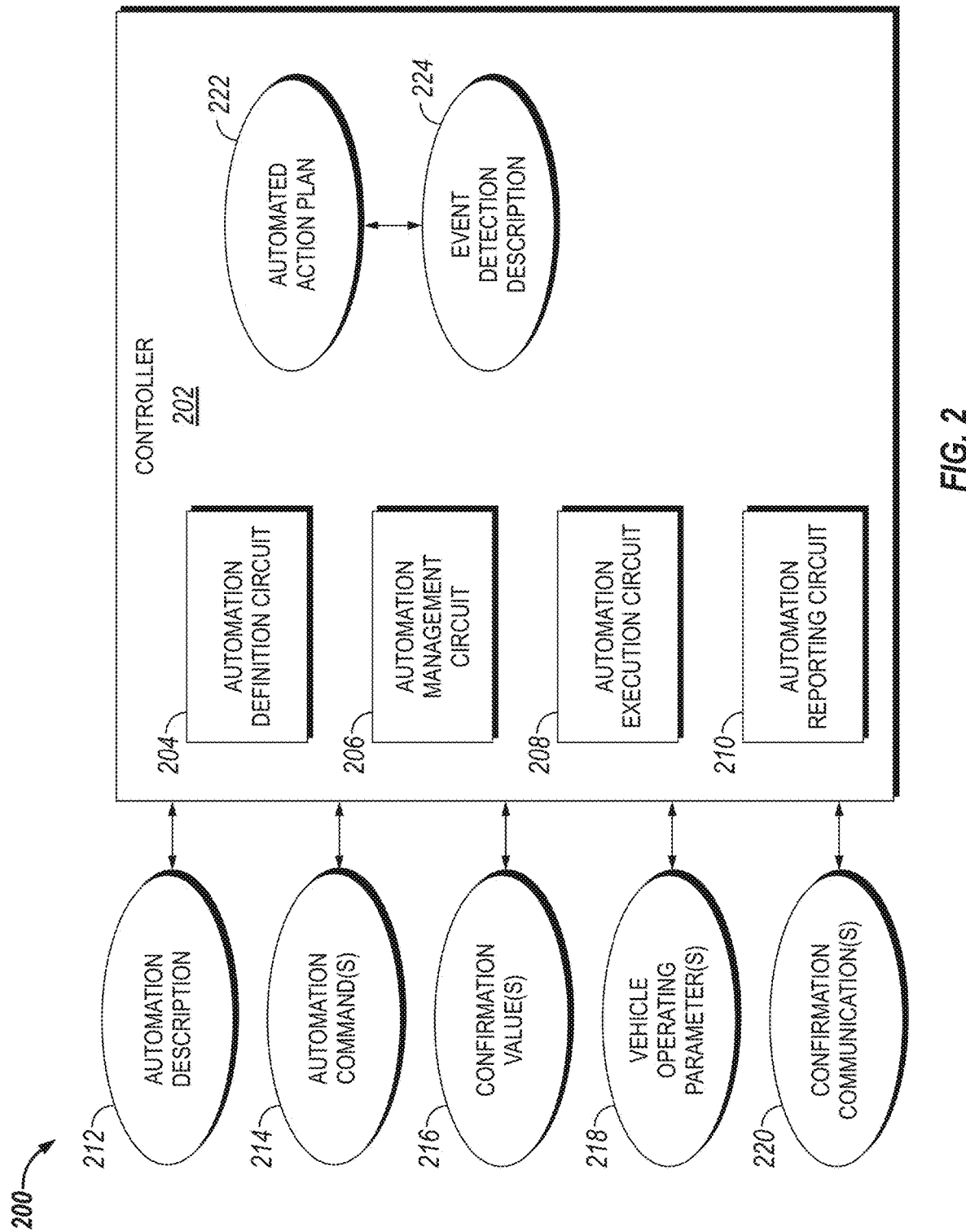
FIG. 2 is schematic diagram of an automation command system according to certain embodiments of the present disclosure.

Referencing FIG. 2, an example apparatus 200 is schematically depicted to provide, without limitation, automation commands 214 where end points of the vehicle 102 are responsive to the automation commands 214 to implement automated vehicle response activities. The example controller 202, as well as all controllers depicted herein (e.g., reference FIGS. 6, 11, 15, 17, 20, 22, 32, 34, and 35, and the related descriptions), may be positioned, in whole or part, on the vehicle, the cloud server, a tool, and/or an external device, and may be distributed across more than one of these, including distribution within one or more of these (e.g., a controller having a first portion positioned on a first end point of the vehicle, and a second portion positioned on a second end point of the vehicle).

Example controllers herein are depicted having a number of circuits configured to perform operations of the controller. Without limitation to any other aspect of the present disclosure, a circuit includes components configured to perform the operations set forth for the circuit, and may include components such as: an actuator responsive to commands to perform selected operations and/or to provide communications such as an actuator state, fault condition, or the like; a sensor providing one or more information values utilized by the circuit, including direct sensors (e.g., a temperature, speed, voltage, etc.) and/or virtual sensors (e.g., a value determined from a number of other values available on the system); a processor and/or executable instructions stored on a computer readable medium, where a processor is configured to execute the instructions to perform one or more operations of the circuit; and/or a data store configured to store related data, executable instructions, or the like associated with the circuit. In certain embodiments, the components and/or distribution of the circuit are dependent upon the operations performed by the circuit, the operating conditions of the vehicle, and/or the communication connectivity of components (e.g., availability of communications with the cloud server, a tool, and/or an external device). In certain embodiments, a sensor, actuator, supporting controller, data store, or the like may be communicatively coupled to the circuit, for example a circuit that interprets a temperature value may include a data store having a data value stored thereon representing the temperature value, where the operations of the circuit to interpret the temperature value may include reading the data value, and in another example a circuit that interprets a temperature value may include a temperature sensor that provides the temperature value for utilization by the remainder of the circuit. An example circuit may be embodied by any configuration of hardware, executable instructions, sensors, actuators, logic circuits, or the like, that are configured to cooperate to perform the functions of the circuit. In certain embodiments, portions of a circuit may be distributed across more than one controller, with portions on the vehicle and/or off the vehicle, and/or with portions of the circuit distributed across more than one end point of the vehicle. For clarity of the present description, each circuit and/or controller herein is depicted as a single component, but may be distributed and/or positioned in any manner as set forth herein.

The example controller 202 includes an automation definition circuit 204 structured to interpret an automation description 212. The example automation description 212 includes operations to be performed to implement an automated vehicle response, and may be provided by an external device, tool, cloud server, or the like. The utilization of the automation description 212 allows for the planning of the automated vehicle response to be performed by a user that does not have vehicle specific information (e.g., parameter names, end point locations, network addresses, and/or information about the distribution of control operations and/or end points on the vehicle). In certain embodiments, a user interface allowing for a user to provide the automation description 212 can inherently limit the user to seeing or accessing only information, functions, or the like that are permitted for that user. In certain embodiments, operations of the controller 202 to determine an automated action plan 222 in response to the automation description 212 include checking whether aspects of the automation description 212 are permitted by the requestor (e.g., the user providing the automation description 212), in addition to or alternatively to a user interface that limits the user to permitted activity.

The example controller 202 includes an automation management circuit 206 structured to provide an automated action plan 222 in response to the automation description 212. In certain embodiments, the automated action plan 222 includes vehicle specific information, such as the addresses, owners, network locations, etc. of end points of the vehicle that are responsive to the automation description 212, for example end points that provide requested data, end points that can perform requested functions, and/or end points that include, or are in command of, selected actuators of the vehicle that are exercised as a part of the automated vehicle response activities. The automated action plan 222 may further include information such as: trigger evaluation information (e.g., information utilized to determine if aspects of the automated vehicle response activity should be initiated, performed, continued, interrupted, etc.), data to be collected, actuator(s) to be manipulated, data values that should be communicated, or the like. In certain embodiments, the automated action plan 222 further includes information such as data processing (e.g., collected data resolution, units, sampling rate, adjustments, summarization, up-sampling, down-sampling, or the like), calibration adjustments to make (e.g., calibrations associated with flows, applications, end points, etc. of the vehicle), data storage to support operations (e.g., including storage of collected data, storage of trigger evaluation data, and/or storage to support automated operations such as a rolling buffer of certain vehicle data which may be stored for a longer term in response to a detected event). The example controller 202 further includes an automation execution circuit 208 that provides automation command(s) 214 in response to the automated action plan 222, for example to implement the automated action plan 222, and/or to perform a workflow and/or tasks of a workflow set forth in the automated action plan 222. One or more end points of the vehicle, regardless of which network zone of the vehicle such end points are located on, are responsive to the automation command(s) 214 to perform selected operations of the automated vehicle response activity.

An example apparatus 200, the controller 202 includes an automation reporting circuit 210 that provides a confirmation communication 220 to an external device in response to the implementation of the automated vehicle response 402. An example automation management circuit 206 further stores a policy responsive to the automated action plan 222, and where the automation execution circuit 208 provides the automation command 214 in response to the policy. An example automation management circuit 206 further adjusts a stored policy responsive to the automated action plan 222, where the automation execution circuit 208 provides the automation command 214 in response to the adjusted stored policy. An example automation command 214 includes an actuator command and/or a data collection command. An example an automation reporting circuit 210 provides, to the external device, at least portion of data collected in response to the data collection command. Example and non-limiting automation commands 214 include a calibration adjustment for one of a flow, an application, or a service of a vehicle having the controller 202. An example automation management circuit 206 further structured to determine an authorization of the external device to provide the automation description 212. Example operations of the controller 202 may be responsive to vehicle operating parameters 218, for example as set forth in relation to FIG. 8 and the related description.

Figure 5:
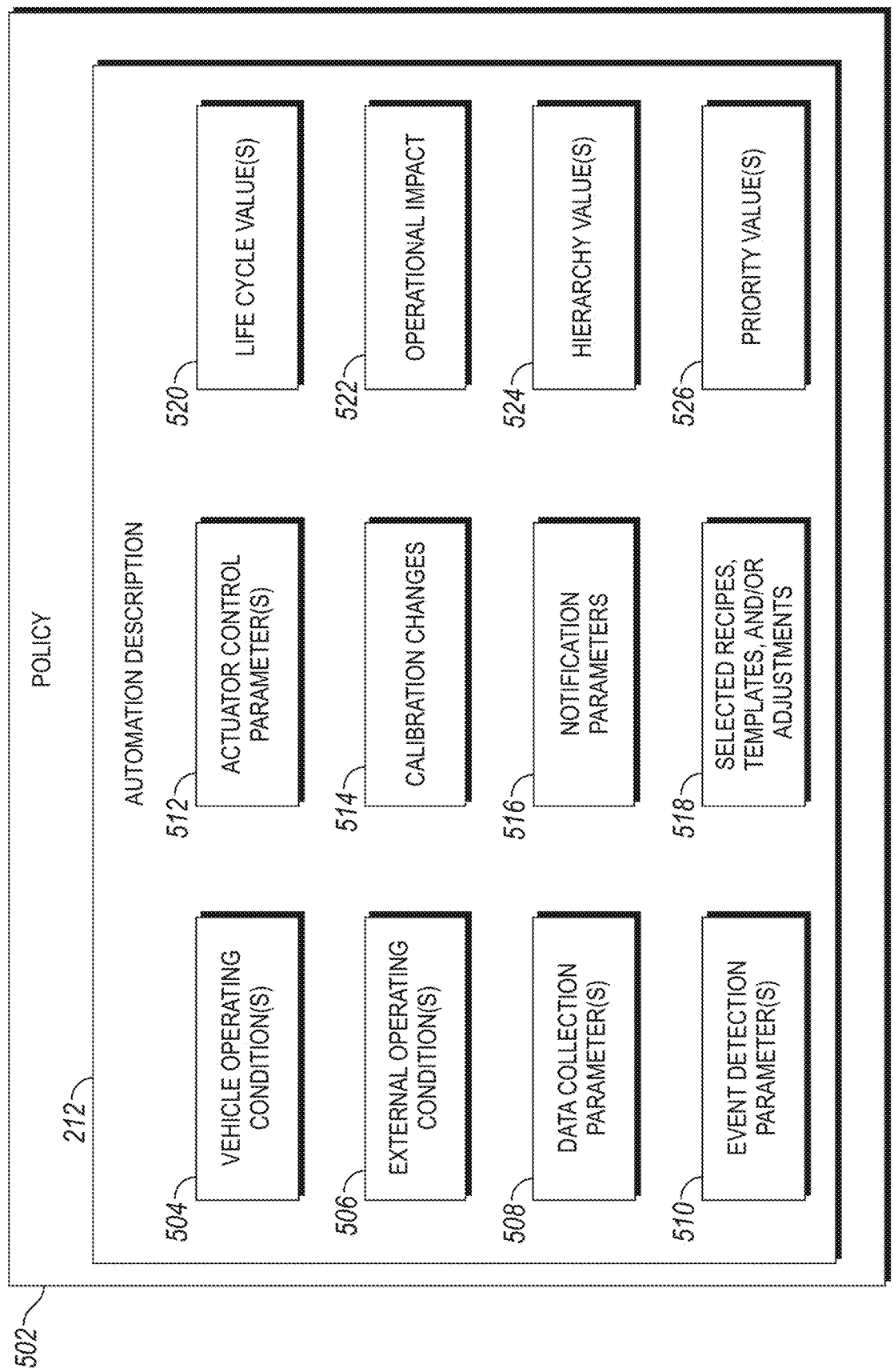
FIG. 5 is a schematic diagram of an example automation description according to certain embodiments of the present disclosure.

Referencing FIG. 5, an example automation description 212 is provided as a portion of a policy 502 for the vehicle, for example a policy defining rules, priority information, hierarchy information, or the like for inter-network communications, intra-network communications, extra-vehicular communications, or the like. In certain embodiments, the policy 502 is utilized by a CND or other network control device to implement permissions, facilitate communications between end points, or the like to ensure that network utilization, data security, data transmission resource utilization, vehicle operational impact, and other aspects of vehicle operations related to the network are performed within designated parameters, and to ensure that end points and/or external devices can access allowed data, flows, end points, applications, and the like without requiring individualized knowledge of communication protocols, network addresses, network location, data units, data resolution, and/or data sampling rates associated with other end points, flows, applications, etc. Example parameters that may be a part of the automation description 212 include parameters such as: vehicle operating conditions 504 (e.g., operating conditions associated with commencing, continuing, or performing operations, including operating conditions to be utilized as trigger evaluation parameters associated with the automated vehicle response activity); external operating conditions 506 (e.g., operating conditions associated with commencing, continuing, or performing operations, including operating conditions to be utilized as trigger evaluation parameters associated with the automated vehicle response activity, where external operating conditions include off-vehicle operating conditions such as weather, traffic, ambient conditions, an indication from the cloud server such as an update indication and/or a recall indication, etc.); data collection parameters 508 (e.g., parameters to be collected as a part of the automated operations, to prepare for automated operations, to verify automated operations, and/or any of these related to trigger evaluation); event detection parameters 510 (e.g., parameters utilized to evaluate, confirm, and/or verify that an event has occurred); actuator control parameters 512 (e.g., parameters associated with actuators that may be utilized in automated operations, such as actuator identifiers, actuator command values, actuator threshold values, etc.); calibration changes 514 (e.g., parameters associated with changes made to calibrations as a part of automated operations, such as identifiers of the associated flow, application, end point, vehicle function, or the like, identifiers of the calibration parameters to be changed, and/or values associated with the calibration changes to be applied, including for example conditions detected to implement, adjust, or revert calibration changes, and/or including storage of previous calibration values, for example to support a system restore or rollback operation); notification parameters 516 (e.g., content and/or location information for notifications, alerts, or the like, such as network addresses, entity names, communication header information, as well as data to be included in the notification or alert); selected recipes, templates, and/or adjustments to these (e.g., identification and/or content of a recipe and/or template utilized for an automated operation, and/or adjustments from a baseline of the recipe and/or template to be utilized for the automation description 212, and/or selected recipes, templates, and/or adjustments 518); life cycle values 520 (e.g., data retention for collected data, the relevant time period for the automation description 212 such as "perform a single time", "perform continuously", "perform within a selected time window", etc., and which may include priority values associated with the automation description 212 and/or related data, etc.); operational impact 522 (e.g., to limit utilization of network communication resources, processing resources, data storage resources, or the like, and/or to limit interference or interruption of vehicle functions, applications, or flows—for example limiting the utilization of vehicle controllers that perform critical functions such as motive power operation, an engine controller, transmission controller, etc.); hierarchy values 524 (e.g., utilized to control prioritization, scheduling, and/or implementation of multiple automated operations, multiple blocks of stored data, or the like); and/or priority values 526 (e.g., priority of an event detection, a trigger evaluation, the automated operations associated with the automation description 212, data collected pursuant to the automated operations, and including interactions or relationships among these—for example a first priority associated with the automation description 212 before a specific event is detected, and a second priority associated with the automation description 212 after the specific event, for example increasing the priority of the automated description 212 for an event such as a determination that an anomalous vehicle condition is present, or decreasing the priority of the automated description 212 for an event such as confirming that a component of the vehicle is operating properly). Limits to utilization, for example from the operational impact 522, may include calculated limits (e.g., determining a network communication rate resulting from the automated action plan 222 and/or the vehicle generally, for example from historical utilization information and/or previously estimated utilization information, and which may further include determining utilization impact due to the actual distribution of end points on the vehicle—for example considering CND traffic to support inter-network communications and the like), rules based limits (e.g., limiting an automated action plan 222 to a data storage cap, network utilization cap, etc., which may further be determined according to a priority of the automated action plan 222, and/or a permissions value associated with the requestor or other entity associated with the automated action plan 222), and/or flexible limits (e.g., allowing all automated action plans 222 until a utilization limit is reached, and then prioritizing between automated action plans 222 in a selected manner, which may be set by a policy or by any other prioritization scheme set forth herein). In certain embodiments, for example when an automated action plan 222 is not implemented and/or is modified due to a utilization limit, an example controller 202 provides a notification or alert to indicate that an automated action plan 222 has been refused, discontinued, and/or modified. The notification or alert may be communicated to the requestor, an administrator (e.g., of a cloud server 110 or application running on controller 112), a vehicle manufacturer, or any other entity associated with the system 100.

Figure 3:
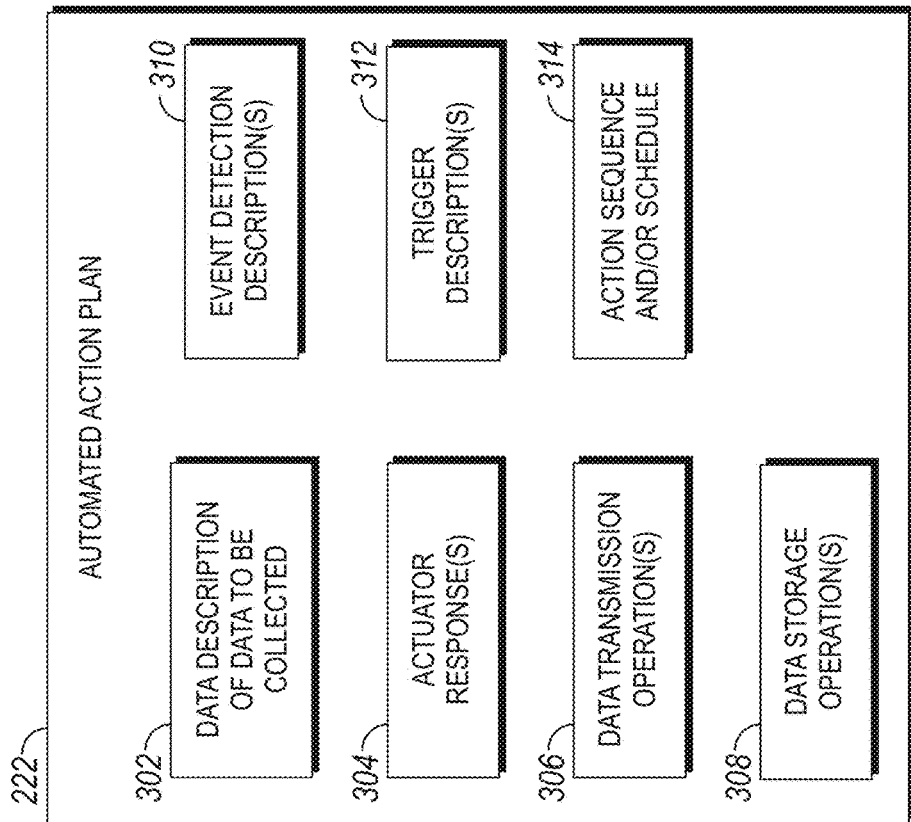
FIG. 3 is a schematic diagram of an example automated action plan according to certain embodiments of the present disclosure.

Referencing FIG. 3, an example automated action plan 222 includes aspects of the automated description 212 that are configured for the specific vehicle, such as: a data description of data to be collected 302 (e.g., including network addresses, end point identifiers, data processing values, etc.); actuator responses 304 (e.g., including network addresses, end point identifiers, actuator command values, etc.); data transmission operations 306 (e.g., including transmission timing, priority, loss of transmission responses, etc.); data storage operations 308 (e.g., including data storage locations, data storage format, data storage life cycle, etc.); event detection descriptions 310 (e.g., events to be detected relevant to the automated vehicle response activities, for example utilized to initiate actions, to modify actions, to initiate or set timer values, to set state values, or the like); trigger descriptions 312 (e.g., triggers utilized to initiate an action or workflow, to initiate data collection, to initiate a timer or other delay operation, etc.); and/or action sequences or schedules 314 (e.g., providing a description of actions sequenced in a workflow—e.g., reference FIG. 25-27 or 31, and the related descriptions, providing a description of timing to initiate actions and/or delay periods between actions, schedules of actions based on events, triggers, state values, or operating conditions, etc.). In certain embodiments, the automated action plan 222 further includes data descriptions setting forth data processing, units, resolution, sampling rates, and/or other information related to data utilized during automated vehicle response activities, and/or data stored, communicated, or transmitted during automated vehicle response activities.

Figure 4:
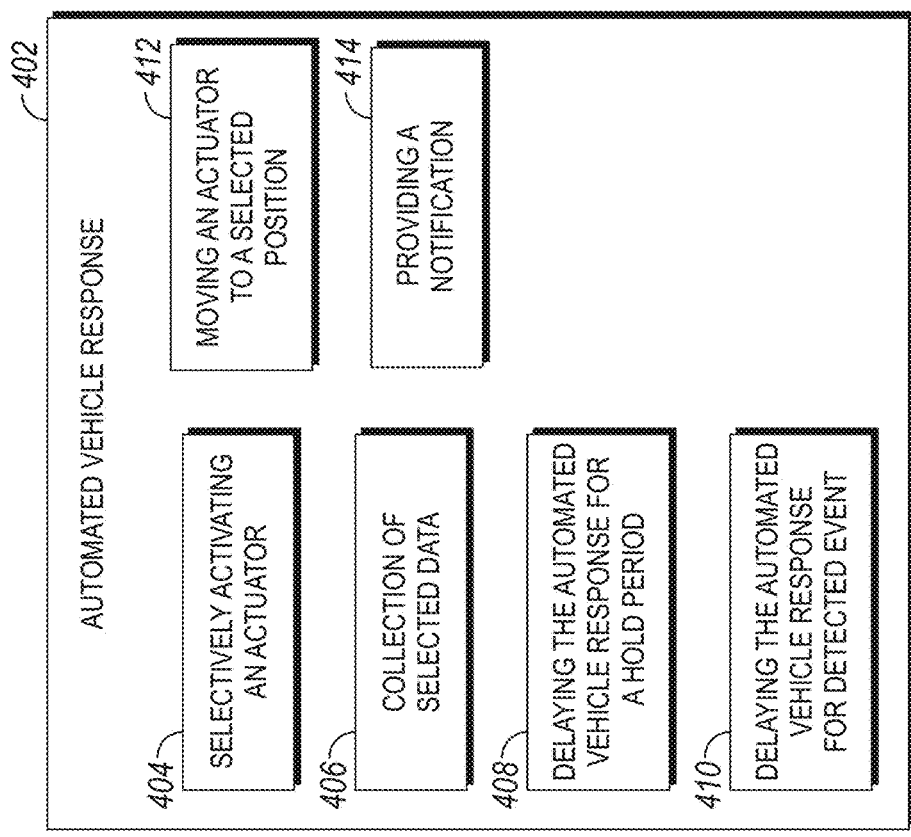
FIG. 4 is a schematic diagram of an example automated vehicle response system according to certain embodiments of the present disclosure.

Referencing FIG. 4, example automated vehicle responses 402, for example setting forth actions to be performed as an automated vehicle response activity, are schematically depicted. The example automated vehicle responses 402 are not values that will appear, typically, as a data value in a system, but are rather high level descriptions that may be the target of a procedure (e.g., reference FIGS. 36-55 and the related descriptions), that are the intended target activities by a user providing an automation request 1506 and/or an automation description 212, and/or may be provided as a description related to a template or recipe, for example to be provided on a user interface. Example and non-limiting automated vehicle responses 402 include responses such as: selectively activating an actuator 404 (e.g., commanding the actuator to open or closed, commanding the actuator to a selected position, and/or commanding an outcome for the actuator—for example a set point for a control algorithm that utilizes the actuator); collection of selected data 406 (e.g., data collected relating to an event detection, a trigger evaluation, during operations of the automated commands, confirmation data related to the automated commands, and/or alerts or notifications related to the automated commands); delaying the automated vehicle response for a hold period 408 (e.g., detecting that a trigger evaluation indicates that the automated vehicle response activity is to be performed, and delaying to perform the activity for a predetermined period, until another condition is detected, and/or according to an operating condition of the vehicle, such as waiting until the vehicle is stopped, moving at a threshold speed, below a set fuel or battery level, in a shutdown condition, etc.); delaying the automated vehicle response for a detected event 410 (e.g., a vehicle accident event, a fault code event, an off-nominal operation event, and/or any other event detection as set forth throughout the present disclosure); moving an actuator to a selected position 412; and/or providing a notification 414 (e.g., a notification that an automated vehicle response activity has been performed, that a trigger evaluation has been confirmed, that an event has been detected and/or information related to the event detection, that an automated vehicle response activity has not been, or will not be performed, etc.). The automated vehicle responses 402 are a non-limiting example of a few operations that may be performed by an automation command 214. In certain embodiments, a given automated vehicle response activity may include a number of automated vehicle responses 402. In certain embodiments, an automated vehicle response 402 may be performed as a task in a workflow, such as set forth in relation to FIGS. 25-27 and 31).

An example system includes the end point responsive to the automation command 214 as a second controller (e.g., where the automation command 214 is a communication to the second controller) separate from the controller 202. An example system includes the second controller providing a selected data value (e.g., requested data for collection) or a selected actuator command value (e.g., commanding an actuator responsive to the automation command 214) in response to the automation command 214. In certain embodiments, the second controller further provides a confirmation value 216 to the controller 202, for example to confirm that the automation command 214 was received, to confirm that the actuator has been commanded, and/or to confirm that the actuator has responded to the command. In certain embodiments, the second controller provides the confirmation value 216 in response to implementing the automated vehicle response, for example in response to the automation command 214 being provided to the second controller, in response to a detected event, and/or in response to a trigger evaluation determining that the automated vehicle response is active. In certain embodiments, the second controller provides the confirmation value 216 as a task of a workflow performed as a part of the automated vehicle response. An example system includes a second end point, for example, a sensor or an actuator, that is responsive to a command from the second controller. In certain embodiments, an end point responsive to the automation command 214 may be a sensor or an actuator that performs an action in accordance with the automation command 214. In certain embodiments, more than one end point is involved with various automation commands 214, where each end point may be on any network zone of the vehicle, including with end points distributed across more than one network zone of the vehicle. In certain embodiments, the controller 202 provides an automation command 214 to each relevant end point, for example passing commands through a CND that configures and communicates the automation commands 214, confirmation values 216, and/or any other communications provided between the controller 202 and responsive end points, including providing communications according to the relevant network protocols, messaging paradigm, etc., for each end point and the controller 202. Network zones in the vehicle may be of distinct types (e.g., ethernet vs. CAN), utilize different communications protocols, or the like. End points of network zones of the vehicles may utilize different network communication rates or schemes, different data types or resolutions (e.g., 2-byte fixed point data versus 4-byte floating point data), or have any other differences that are managed by a CND, edge gateways, and/or a policy engine or policy manager, as set forth herein and in U.S. application Ser. Nos. 17/027,167, 17/027,187, and/or U.S. Ser. No. 17/195,589, which have previously been incorporated herein by reference.

An example automation execution circuit 208 detects an event in response to an event detection description 224 of the automated action plan, and implements the automated vehicle further in response to the detected event. An example automation management circuit 206 provides the automated action plan 222 in response to an external operating condition of the automation description 212, and the automation execution circuit 208 receives the external operating condition from an external device (e.g., a device at least intermittently in communication with controller 202 and/or the vehicle, for example a web based service operating on an external device). An example automation definition circuit 204 receives the automation description 212 from an external device, for example by operations such as: receiving the automation description 212 from a cloud server as an automation workflow to be performed on the vehicle; as a policy including the automation description 212; as a portion of a policy including the automation description 212 (e.g., to be appended to a main policy, and/or to be performed as a second policy where the system implementation allows for multiple policies to be serviced); and/or as a remote command (e.g., provided by a data file having the automation description 212, and formatted to be recognized and implemented by controller 202) by any external device such as a service tool, an application on the cloud server in communication with the vehicle, a web portal in communication with the vehicle, and/or a mobile application such as an application on a mobile device of an operator of the vehicle.

Figure 6:
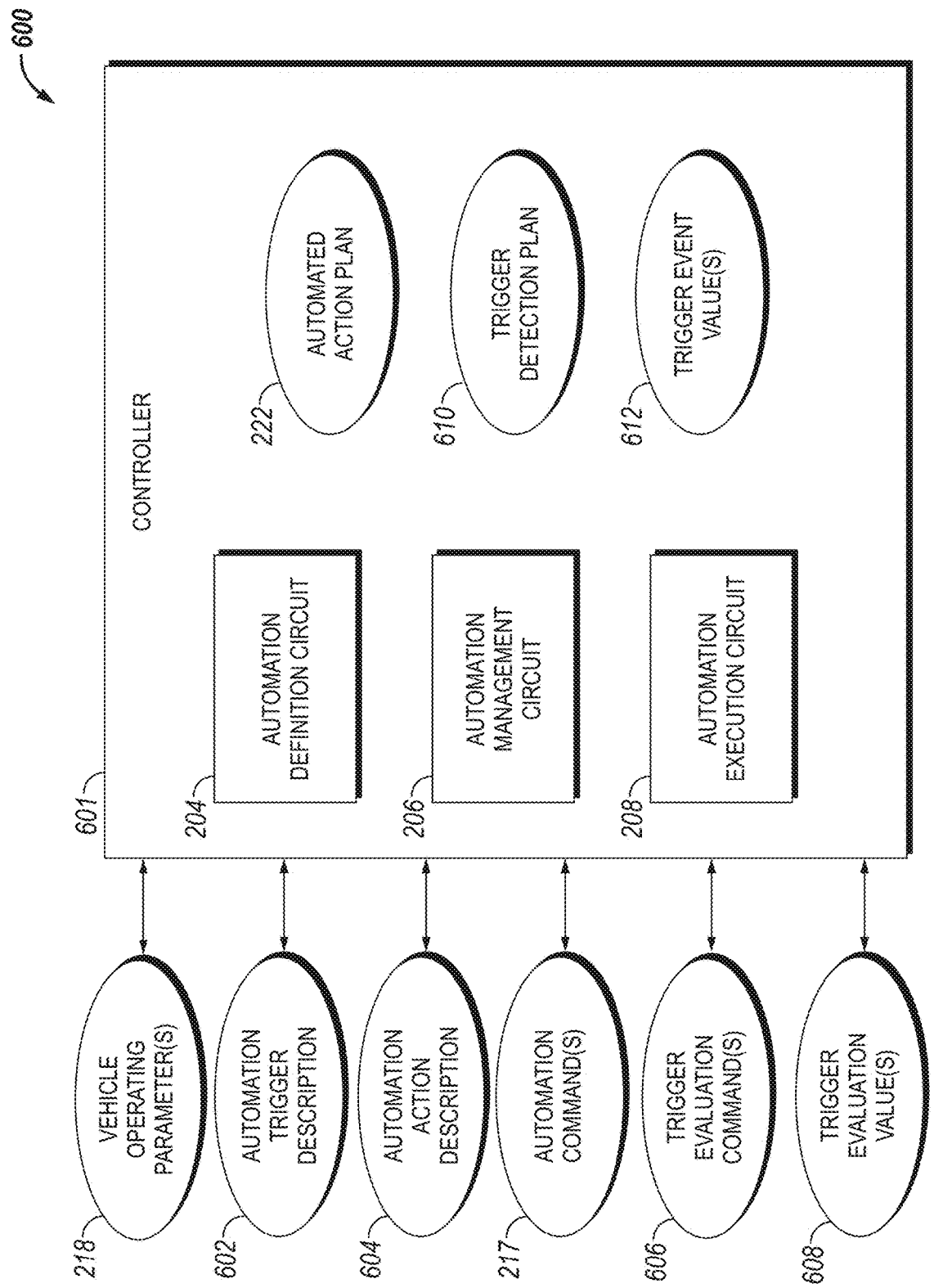
FIG. 6 is a schematic diagram of an example controller system according to certain embodiments of the present disclosure.

Referencing FIG. 6, an example apparatus 600 depicts a controller 601 including the automation definition circuit 204 that interprets an automation trigger description 602 (e.g., describing criteria to initiate, continue, discontinue, and/or move between tasks or states of a workflow associated with an automated vehicle response activity), and an automation action description 604 (e.g., describing operations performed as a part of a workflow associated with an automated vehicle response activity). The example controller 601 includes the automation management circuit that provides a trigger detection plan 610 and an automated action plan 222 in response to the automation trigger description 602 and the automation action description 604 (e.g., providing vehicle specific parameters to implement the descriptions 602, 604, appending within a policy, and/or performing any other operations to implement the automated vehicle response activity as set forth herein). The example controller 601 includes the automation execution circuit 208 that determines a trigger event value 612 (e.g., checking current vehicle conditions or other relevant data to determine whether criteria for a trigger of the trigger detection plan 610 have been met), and provides an automation command 214 in response to the trigger event value 612 (e.g., beginning execution of automation commands 214 after the trigger is confirmed) and the automated action plan 222 (e.g., executing the selected automation operations).

An example automation execution circuit 208 further provides a trigger evaluation command 606 in response to the trigger detection plan 610, for example allowing for serial trigger conditions (e.g., check for condition A to exist before beginning to check for condition B). End point(s) responsive to the trigger evaluation commands 606 may be distinct from end points performing the automation commands 214, and further end points supporting each trigger level (e.g., where serial trigger conditions are considered) may be distinct from end points supporting other trigger levels (e.g., the check for condition A versus condition B may use a distinct set of sensors, vehicle data, etc. to determine whether the trigger conditions for each one are met). An example automation execution circuit 208 is responsive to a trigger evaluation value 608 determined from the trigger evaluation commands 606, for example where the trigger evaluation value 608 includes data from end points utilized to check whether the related trigger condition has been met (e.g., a temperature from a sensor, a position feedback from an actuator, and/or a state parameter from a controller of the vehicle such as "door ajar"), where the automation execution circuit 208 executes the appropriate aspects of the automated action plan 222 and/or trigger detection plan 610 in response to the trigger evaluation data 608.

Figure 7:
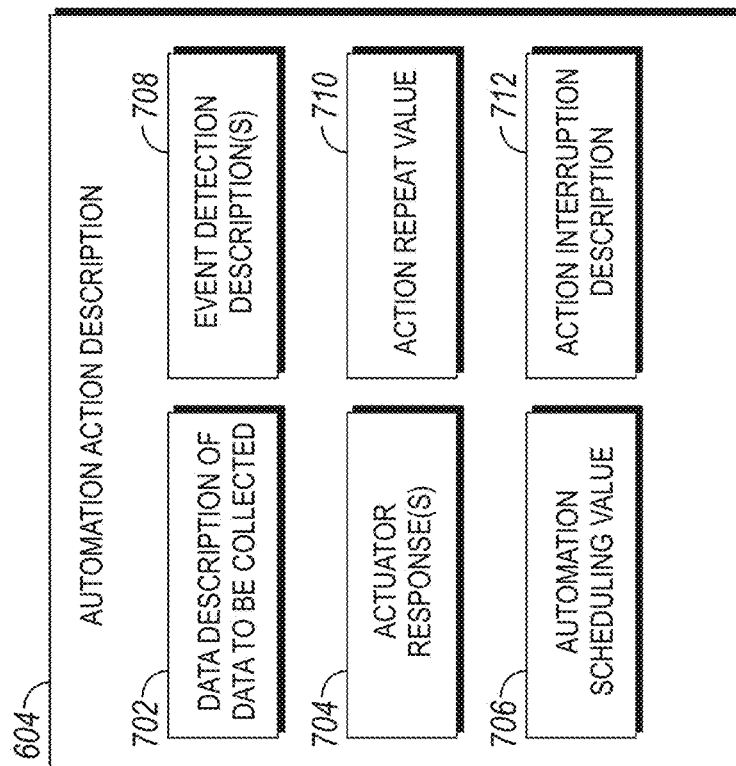
FIG. 7 is a schematic diagram of an example automation action description according to certain embodiments of the present disclosure.

Referencing FIG. 7, an example automation action description 604 includes an automation scheduling value 706 (e.g., times and/or sequencing of tasks of a workflow). Example aspects of the automation action description 604 include one or more of: a data description of data to be collected 702; an actuator response 704 of actuators to be controlled; an event detection description 708 (e.g., for events to be detected as part of a workflow); an action repeat value 710 (e.g., a number of times for an action to be repeated, a repeating schedule, a time window during with the repeating behavior is adjusted, etc.); and/or an action interruption description 712 (e.g., describing criteria such as operating conditions, response times, state values, etc., at which an action should be considered to be interrupted; and/or a description of actions that should be performed in the event of an interruption, such as data deletion or management, setting of state values or other stored parameters, and/or a description of whether the action should be resumed and/or related criteria for resumption).

Figure 8:
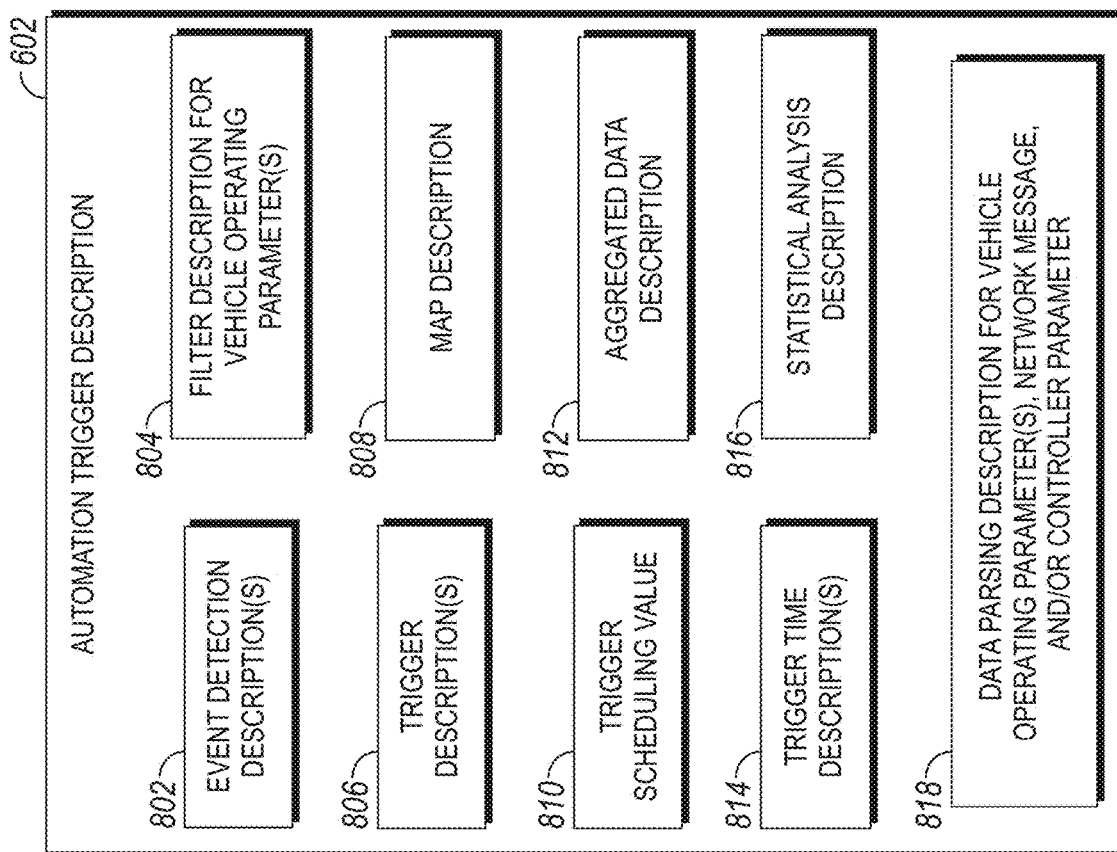
FIG. 8 is a schematic diagram of an example automation trigger description according to certain embodiments of the present disclosure.

Referencing FIG. 8, an example automation trigger description 602 includes a trigger scheduling value 810 (e.g., times and/or sequencing of various trigger determinations for a workflow). Example aspects of the automation trigger description 602 include one or more of: an event detection description 802 (e.g., for events relevant to trigger determinations); a trigger description 806 (e.g., criteria to be evaluated to determine the trigger event value 612); a trigger time description 814 (e.g., relevant time frames for the trigger check, including delay periods relative to other values, such as 10 minutes after vehicle start, and 5 seconds after engine speed exceeds 1000 rpm, and continue for 30 seconds); a filter description for vehicle operating parameter(s) 804 (e.g., allowing for a change in response time and/or real-time accuracy for operating parameters, for example to hide system dynamics from an observer of the related data, or to increase the difficulty of reverse engineering an aspect of the vehicle, while providing sufficient data for the purpose of the trigger and action of the workflow); a map description 808 (e.g., allowing for geographic and/or jurisdictional trigger detection, for example to implement a different set of display units in a different country, to adjust engine performance or emissions for compliance with each country, etc.); an aggregated data description 812 (e.g., allowing trigger determination from a summation, moving average, integration, etc. of various data elements); a statistical analysis description 816 (e.g., allowing trigger determination from anomalous data such as: a temperature value outside a range expected by a temperature model, a data value that is several standard deviations outside of an expected value, and/or a metadata statistic, such as a number of times a value is communicated that exceeds or falls below an expected frequency or distribution of frequencies); and/or a data parsing description 818 for vehicle operating parameters, network messages, and/or controller parameters (e.g., allowing the automation execution circuit 208 to: provide or utilize only data of interest such as data within selected time windows and/or data associated with a detected event or trigger; to adjust reported data according to a selected formatting, message protocols, or the like, and/or providing reporting utilizing the payload (e.g., the data values) with full or partially removed headers (e.g., network addresses, etc., which may depend upon the network type and protocols for the end point providing the data). In certain embodiments, information about the message apart from the payload, such as time stamps, network addresses, etc., may be removed from the data—for example due to permissions values (e.g., a requestor providing an automation request 1506 that is not authorized to see certain aspects of the data), to reduce utilization (e.g., providing only the payload with message headers removed reduces network communications and data storage utilization), and/or to normalize data (e.g., an end point utilizing the wrong system time may have time corrected data, for example to allow for later synchronization of data).

Figure 9:
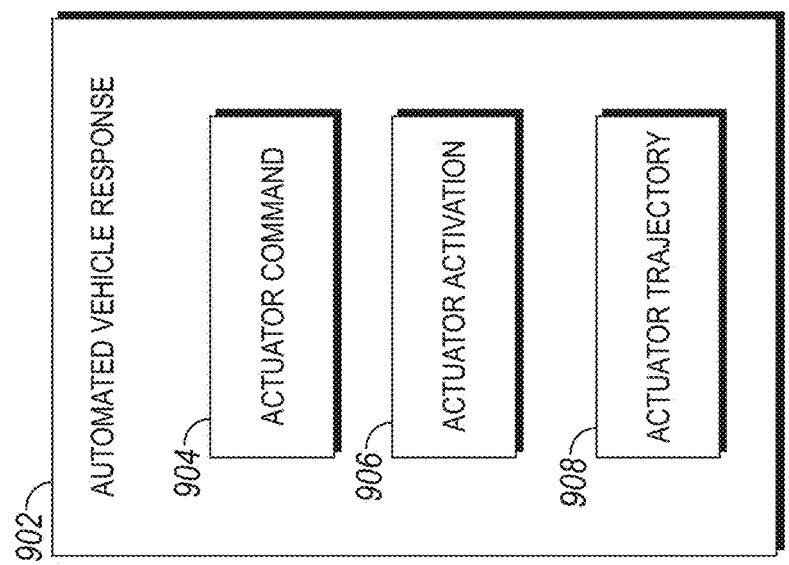
FIG. 9 is a schematic diagram of example automated vehicle responses according to certain embodiments of the present disclosure.

Referencing FIG. 9, example automated vehicle responses 902 include one or more of: providing an actuator command 904, providing an actuator activation 906 (e.g., blocking or allowing the use of an actuator, for example enabling or disabling a feature of the vehicle such as a cruise control system, door lock actuator, or steering wheel); and/or an actuator trajectory 908 (e.g., controlling a rate of the actuator response, commanding the actuator through a series of time-position commands; commanding the actuator through a series of time-set point commands; etc.). An automated vehicle response 902, as utilized herein, includes actions provided by any controller herein that performs operations to: complete an automated vehicle response activity, execute an automated workflow, to perform an automated vehicle response, or any other similar automation operations described herein.

Figure 10:
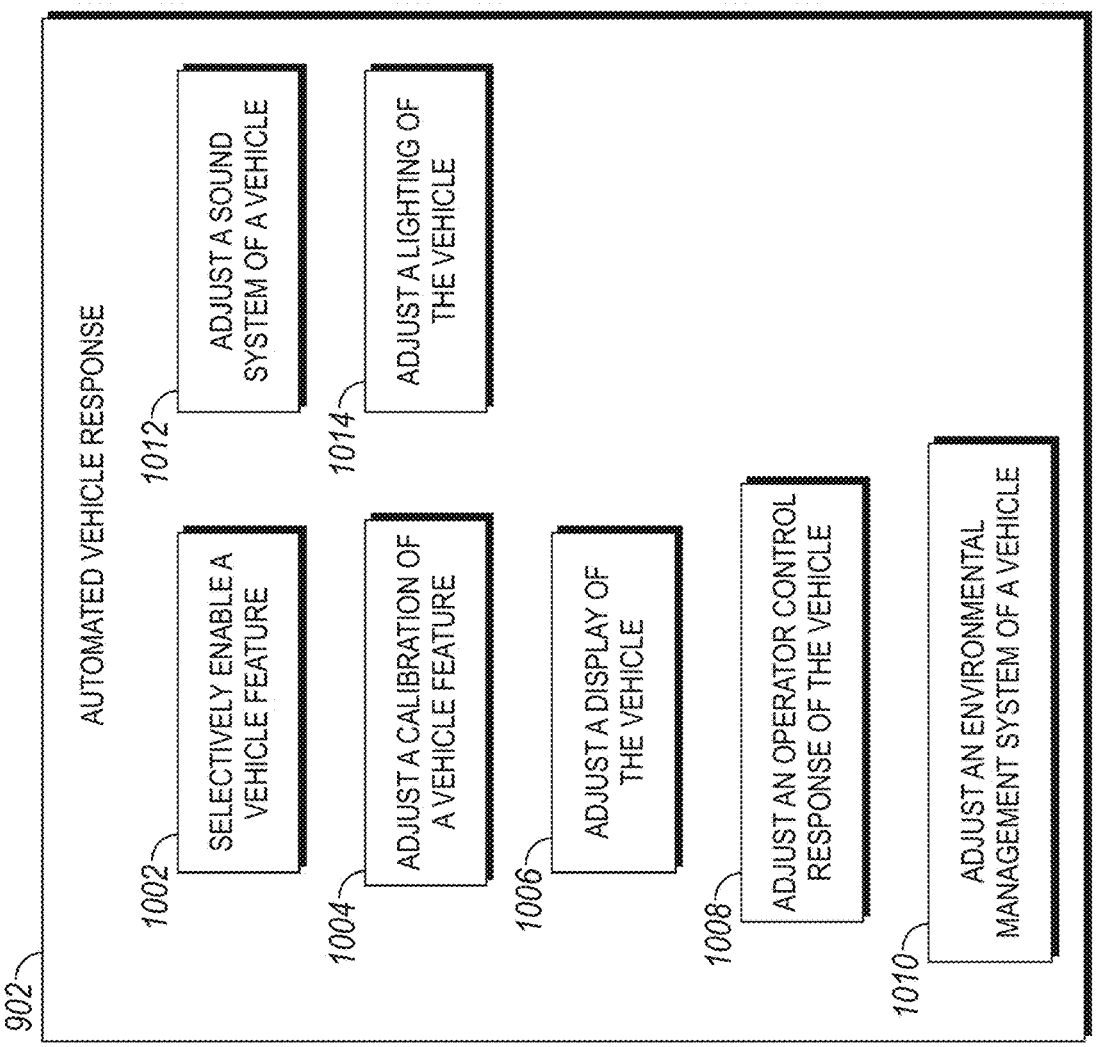
FIG. 10 is a schematic diagram of example automated vehicle responses according to certain embodiments of the present disclosure.

Referencing FIG. 10, example automated vehicle responses 902 include one or more of: selectively enabling a vehicle feature 1002 (e.g., turning on or off a vehicle capability); adjusting a calibration of a vehicle feature 1004 (e.g., adjusting a maximum speed, limiting a radio volume to selected values, and/or adjusting any other feature of the vehicle); adjusting a display of the vehicle 1006 (e.g., providing a selected camera to a screen; providing a light or notification to the operator; and/or changing which values are displayed on a screen or dashboard); adjusting an operator control response of the vehicle 1008 (e.g., switching to an economy or performance mode; adjusting a maximum speed or power; and/or adjusting a transmission shifting scheme); adjusting an environmental management system of a vehicle 1010 (e.g., adjusting a temperature, blower level, blower scheme, etc., for example allowing a response according to the operator identity, time of day, weather information, etc.); adjusting a sound system of the vehicle 1012 (e.g., setting volume, station, presets, allowed values, etc.); and/or adjusting a lighting of the vehicle 1014 (e.g., interior lighting, headlight thresholds such as high beam oncoming distance, headlight aim location, and/or headlight light level activation thresholds, which may be configured for the driver, time of day, season, etc.).

An example automation action description 604 includes an action repeat value, and the automation management circuit 206 further provides the automated action plan 222 in response to the action repeat value. For example, an action may be repeated as a part of a workflow (e.g., reference FIGS. 25-27, and 31), or a given action may be repeated multiple times (e.g., which may be treated together as a single task in a workflow such as in FIGS. 25-27, and 31), depending upon the organization of the automation description 212, automation trigger description 602, and/or automation action description 604, and/or the implementation scheme for a workflow for a particular system.

An example automation description 604 includes an action interruption description, where the automation management circuit 206 further provides the automated action plan 222 in response to the action interruption description. Example and non-limiting action interruption descriptions include one or more of: an action response description for a vehicle off event (e.g., actions to be taken when a vehicle off event is detected, for example in response to an operator requested state, key removal, etc.); an action response description for a vehicle fault event (e.g., actions to be taken when a fault disrupts the action, for example when a commanded actuator indicates a fault has occurred); an action response description for a vehicle operation interruption (e.g., the action requires 10 seconds at 60 mph, and the vehicle has just reduced speed to 55 mph after 6 seconds; in another example a network communication dropout for selected parameters has exceeded a threshold value); and/or a timeout event such as an amount of time for an interruption (e.g., loss of a parameter, loss of a trigger condition, failure to progress to a task stage, etc.) of task progress is deemed to be an interruption of the action. Example interruption descriptions include determinations of whether to pause or cancel operations (e.g., of a related workflow), whether to reinstate trigger conditions before proceeding or restarting, whether to count the action as complete or incomplete, whether and where to provide a notification or alert of the action interruption, and/or treatment of stored data pursuant to the action (e.g., hold the data, delete the data, move the data, etc.).

Figure 11:
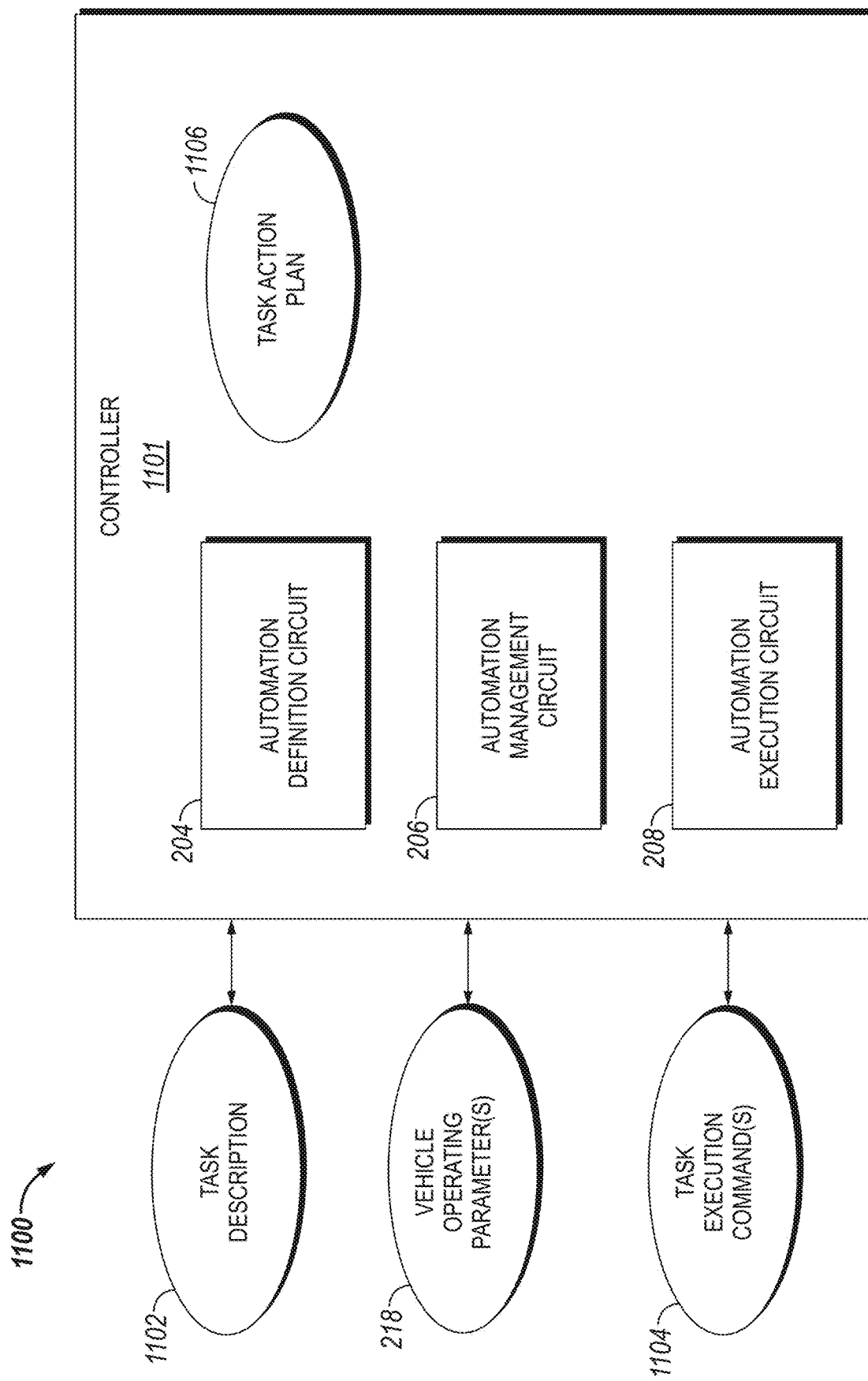
FIG. 11 is a schematic diagram of an example controller apparatus according to certain embodiments of the present disclosure.

Referencing FIG. 11, an example apparatus 1100 includes a controller 1101 having an automation definition circuit structured to interpret a task description 1102 (e.g., for a task provided by a requestor that may not have knowledge of the vehicle, end point configurations, and/or parameter names), an automation management circuit 206 that provides a task action plan 1106 in response to the task description 1102 (e.g., where the task is converted into vehicle specific parameters and configured into a workflow or other organizing scheme for tasks as set forth throughout the present disclosure), and an automation execution circuit 208 that provides task execution command(s) 1104 in response to the task action plan 1106 (e.g., providing network communications, actuator commands, and/or collecting data pursuant to the task action plan 1106). An example system 100 includes one or more end points responsive to the task execution command(s) 1104 to implement a task for the vehicle.

Referencing FIG. 12, an example task description 1102 includes one or more of: a task scheduling value 1206 (e.g., setting time values and/or command sequences associated with the task); a task initiation value 1208 (e.g., setting criteria for the task to begin); actuator response(s) 1204 (e.g., actuator commands to be provided during execution of the task); and/or a data description of data to be collected 1202 (e.g., setting criteria, parameters, etc., for data to be collected pursuant to execution of the task).

Referencing FIG. 13, example and non-limiting tasks 1302 are provided. In certain embodiments, a task may be any automated vehicle response activity, automated workflow, or automated vehicle response, and/or an operation within any one or more of these. The example tasks 1302 include operations such as: monitoring a vehicle operating condition 1304 (e.g., speed, fuel economy, alarm system, etc.); selectively activating an actuator 1306 (e.g., disabling or enabling any actuator, feature, or other aspect of the vehicle); moving an actuator to a selected position 1308 (e.g., open the trunk; and/or set an actuator rate limit or target, move the actuator through a time-position or time-value trajectory, etc.); transmitting task data (e.g., any data associated with the task, for example data confirming the task, verification data, and/or data collected as an operation of the task) in response to a task execution command (e.g., if the task was attempted) and/or an end point response (e.g., if the task was completed) 1310; storing task data in response to a task execution command and/or an end point response 1312; providing a report (e.g., with selected data, formatting, verification data, headers, metadata, etc.) in response to a task execution command and/or an end point response (e.g., providing the report accessible on an automation user interface 1504) 1314; and/or providing a notification (e.g., an alert that the task has commenced and/or completed, which may include summary information of the task outcome—e.g., maximum temperature, fault codes, etc.) in response to a task execution command and/or an end point response 1316. In certain embodiments, example tasks for the vehicle 1302 include collecting selected data for the vehicle 1318, determining whether an event has occurred 1320, and/or monitoring an external operating condition 1322.

Figure 14:
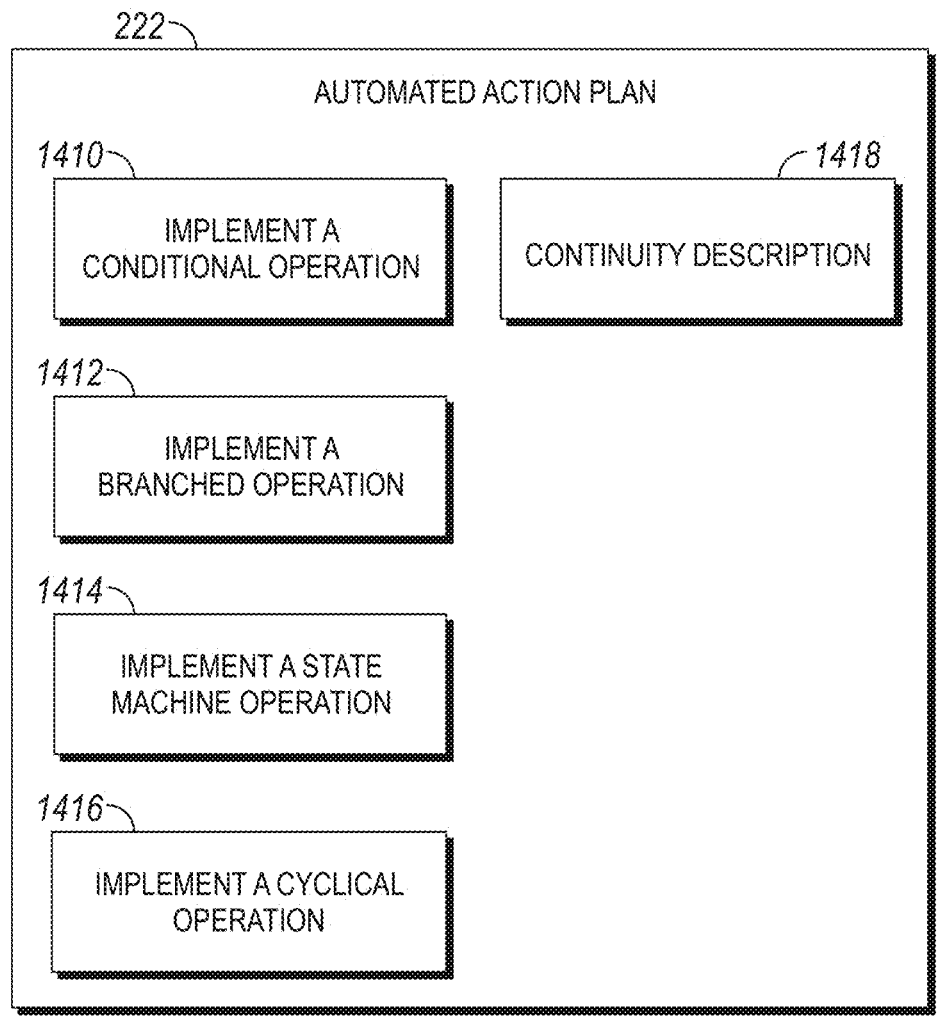
FIG. 14 is a schematic diagram of an example automation action plan according to certain embodiments of the present disclosure.

Referencing FIG. 14, an example automated action plan 222 is schematically depicted. The example automated action plan 222 includes one or more actions such as: implementing a conditional operation 1410 (e.g., performing a task based on the completion of another task, the detection of an event, and/or a trigger evaluation); implementing a branched operation 1412 (e.g., performing more than one task based upon a single completion of another task, detected event, and/or trigger evaluation); implementing a state machine operation 1414 (e.g., any state machine based workflow, for example moving between operating modes based upon selected trigger conditions, where each operating mode has a distinct task set from other operating modes); and/or implementing a cyclical operation 1416 (e.g., allowing for looping and/or repeating behavior for one or more tasks). An example automated action plan 222 includes a continuity description 1418, for example describing interruption parameters (e.g., to determine whether an interruption of a task, workflow, automated vehicle response activity, etc., has occurred) and continuity parameters (e.g., treatment of data, resumption criteria, etc., for the interrupted task, workflow, and/or automated vehicle response activity). In certain embodiments, aspects of the action interruption description 712 are applicable to embodiments of the automated action plan 222.

Figure 15:
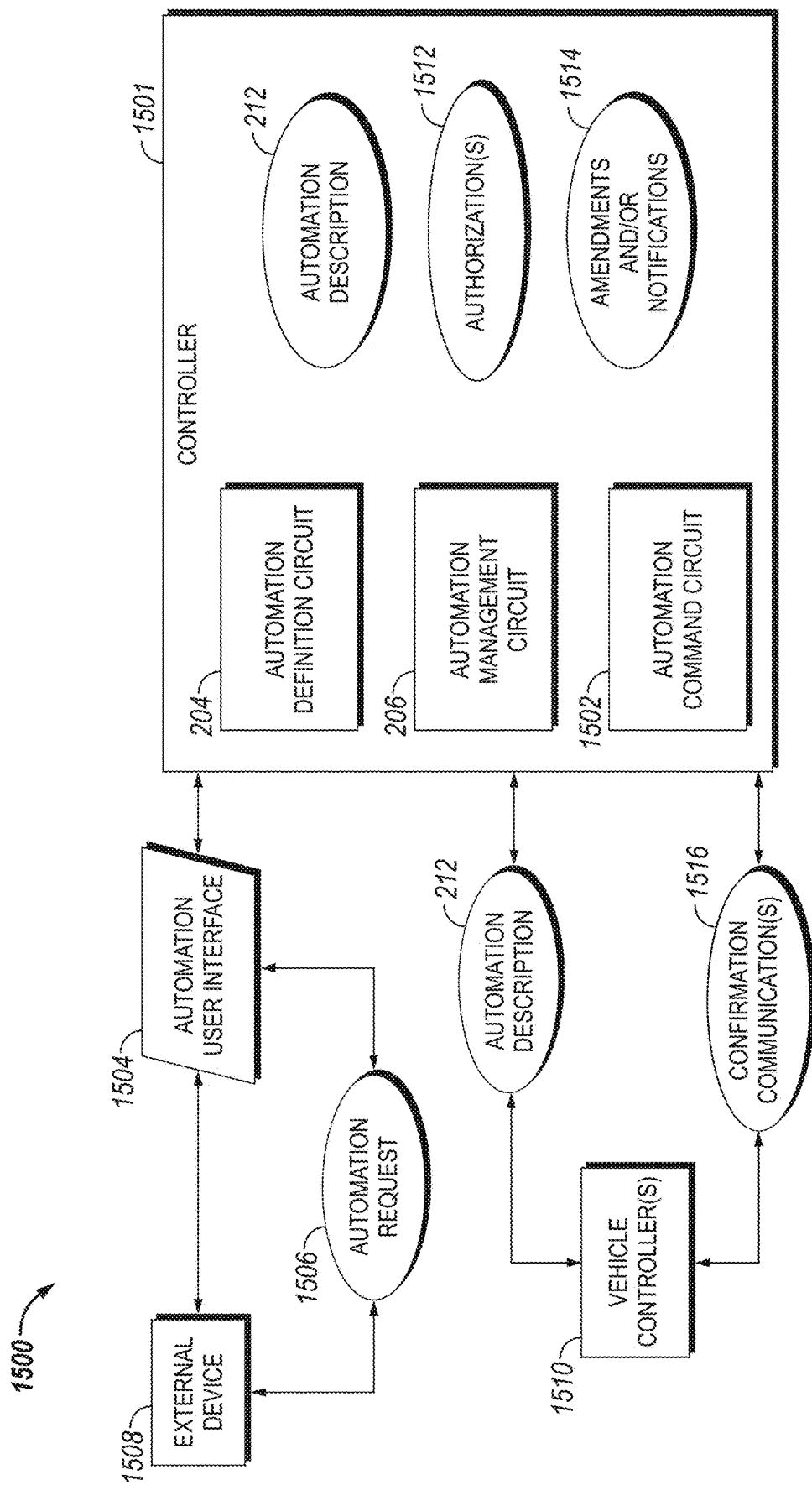
FIG. 15 is a schematic diagram of an example controller configured to provide an automation description according to certain embodiments of the present disclosure.

Referencing FIG. 15, an example apparatus 1500 includes a controller 1501 to provide an automation description 212 to a vehicle controller 1510 is schematically depicted. The example controller 1501 includes an automation definition circuit 204 that implements an automation user interface 1504, and interprets an automation request 1506 in response to user communications with the automation user interface 1504. The automation user interface 1504 may include any interface, such as an interactive user interface allowing a user to build a task, workflow, or the like, a coding interface allowing a user to insert a code element into a file that is utilized to generate the automation request 1506, and/or an API where exercising the API is utilized to submit automation requests 1506 to the controller 1501. In certain embodiments, a user accesses the automation user interface 1504 using an external device 1508, for example by accessing a web portal, mobile application, cloud server, and/or by direct vehicle access such as using a tool, laptop, mobile device, or the like (which access may be supported by a cloud server having at least a portion of the controller 1701, and/or with the controller 1701 positioned on the vehicle).

The example controller 1501 includes an automation management circuit 206 that determines an automation description 212 in response to the automation request 1506. In certain embodiments, the automation request 1506 and the automation description 212 may be the same, for example where the automation user interface 1504 allows for the user to provide an automation description 212 directly. In certain embodiments, the automation request 1506 and the automation description 212 may be distinct, for example where the automation request 1506 references a recipe by reference (e.g., Recipe 178, or "Rapid warm-up recipe"), and/or where the automation request 1506 utilizes shorthand parameters (e.g., Task A, rather than the steps executed in Task A) or abbreviations. In certain embodiments, allowing the automation request 1506 and automation description 212 to be distinct allows for a reduction in resource utilization to support embodiments herein, and/or allows for convenient implementation for a user (e.g., allowing the user to simply select recipes or templates, and/or to modify those). In certain embodiments, allowing the automation request 1506 and automation description 212 to be the same provides for a simplified implementation, and/or ease of troubleshooting and/or debugging of the system. The example controller 1501 includes an automation command circuit 1502 that provides the automation description 212 to the vehicle controller 1510, where the vehicle controller 1510 is configured to implement an automated vehicle response that is responsive to the automation description 212. In the example of FIG. 15, the controller 1501 may be positioned, at least in part, on the vehicle (e.g., determining all or a portion of the automation description 212 on a vehicle side controller). The vehicle side portion of the controller 1501, where present, may be positioned on a same substrate (e.g., board, memory, processor) as vehicle controller 1510, or on another controller in the vehicle (not shown). In certain embodiments, the controller 1501 is positioned completely apart from the vehicle. In certain embodiments, the controller 1501 is positioned on a cloud server, and/or implemented as a web portal.

An example automation management circuit 206 confirms an authorization 1512 of the user for the automation request 1506, and determines the automation description 212 in response to the authorization 1512. For example, where the automation request 1506 includes an aspect such as a parameter value, parameter characteristic (e.g., resolution, sampling rate), operation request (e.g., specific actuators affected), data storage request (e.g., explicit, such as data storage to support data collection operations, or implicit, such as data storage to support event detection, trigger evaluation, data processing operations, or the like to support the task, workflow, etc.), or the like that requires a specific authorization to access, the example automation management circuit 206 compares an authorization 1512 associated with the user (e.g., for the user personally, according to an entity associated with the user, according to an access location of the user, etc.) to the required authorization for the aspect. Depending upon the type of lack of authorization, design selection for the system, and the organization of tasks, workflows, and the like, the automation management circuit 206 may refuse the automation description 212 (e.g., prohibit the automation description 212 from including the automation request 1506, for example by providing an automation description 212 including only other—authorized—requests, and/or omitting the automation description 212 altogether), and/or provide an adjusted automation description 212 (e.g., removing the aspects that are not authorized, such as parameters, tasks, data storage, etc.). In certain embodiments, where the automation description 212 is adjusted, an example automation management circuit 206 provides an amendment and/or notification communication 1514 to the automation user interface 1504, which may be provided to the requesting user (e.g., an amendment to the automation request 1506, and/or including information about the amendment), and/or to another user (e.g., allowing the other user to monitor access to sensitive parameters, to adjust the authorization of the requesting user, to improve interface elements of the automation user interface 1504, and/or to assist other users through direct communications and/or training about the automation user interface 1504). In certain embodiments, where the automation description 212 is refused, an example automation management circuit 206 provides a refusal communication to the automation user interface 1504, which may be provided to the requesting user (e.g., a rejection of the automation request 1506, and/or including information about the rejection) and/or to another user. An example automation command circuit 1502 provides the automation description 212 as a policy and/or a policy update. An example automation command circuit 1502 receives a confirmation communication 1516 from the vehicle controller 1510, where the confirmation communication 1516 confirms one or more aspects, such as: a confirmation the automation description was received; a confirmation the automation description is approved (e.g., based on availability of parameters, actuators, etc. to support the task, and/or authorization of the requesting user and/or of the controller 1501—such as an identity of an entity associated with the controller 1501, login information provided by the controller 1501, encrypted communication operations between the controller 1501 and the vehicle controller 1510, etc.); a confirmation the vehicle has capability to perform the automation description (e.g., memory storage, transmission capability, network support capability, etc.); a confirmation that one or more tasks have been executed (and/or execution statistics related thereto); and/or a confirmation that data related to one or more tasks is available. In certain embodiments, the automation definition circuit 204 is further structured to provide a confirmation communication, which may be the same as, or based upon, the confirmation communication 1516, to the automation user interface 1504. In certain embodiments, the confirmation communication 1516 is provided to the same or a distinct user than a requesting user (e.g., where a first user is responsible to set up the task, and a second user utilizes data from the task).

Figure 16:
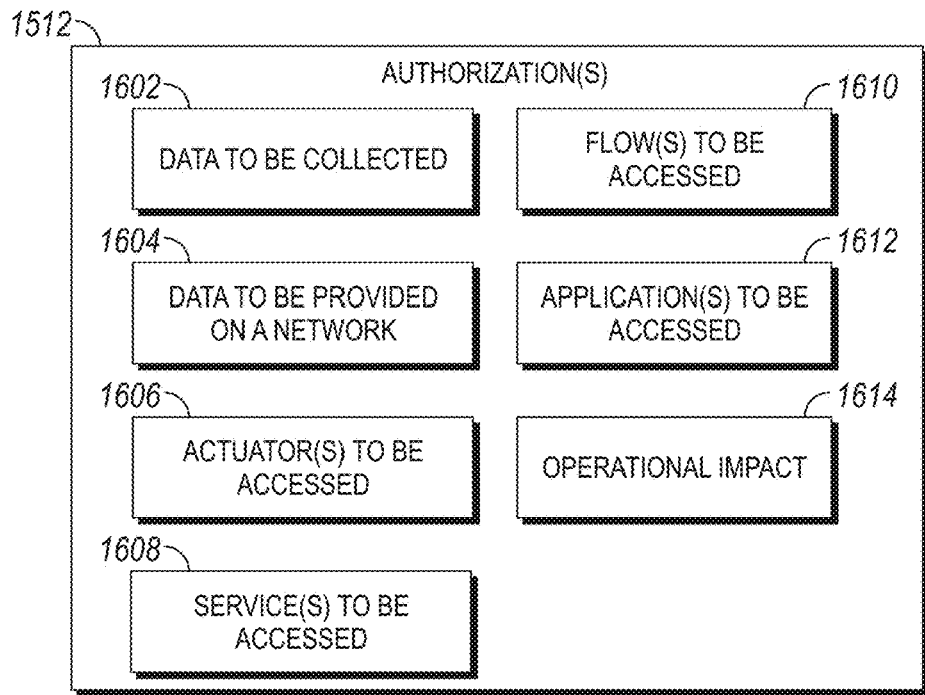
FIG. 16 is a schematic diagram of example authorizations according to certain embodiments of the present disclosure.

Referencing FIG. 16, example authorizations 1512 may relate to one or more of: data to be collected 1602 for the automated vehicle response; data to be provided on a network 1604 of the vehicle for the automated vehicle response (e.g., including an impact to network traffic to support the task, and/or to support inter-network traffic such as by a CND to connect end points on distinct network zones); an actuator to be accessed 1606 for the automated vehicle response; a service to be accessed 1608 for the automated vehicle response; a flow to be accessed 1610 for the automated vehicle response; an application to be accessed 1612 for the automated vehicle response; and/or an operational impact 1614 associated with the automated vehicle response (e.g., fuel economy impact, data storage impact, network utilization impact, etc.). Aspects of the authorization 1512 may be binary (e.g., the user has permission or does not have permission) or graduated (e.g., the user has authorization for a selected amount of memory storage).

Figure 17:
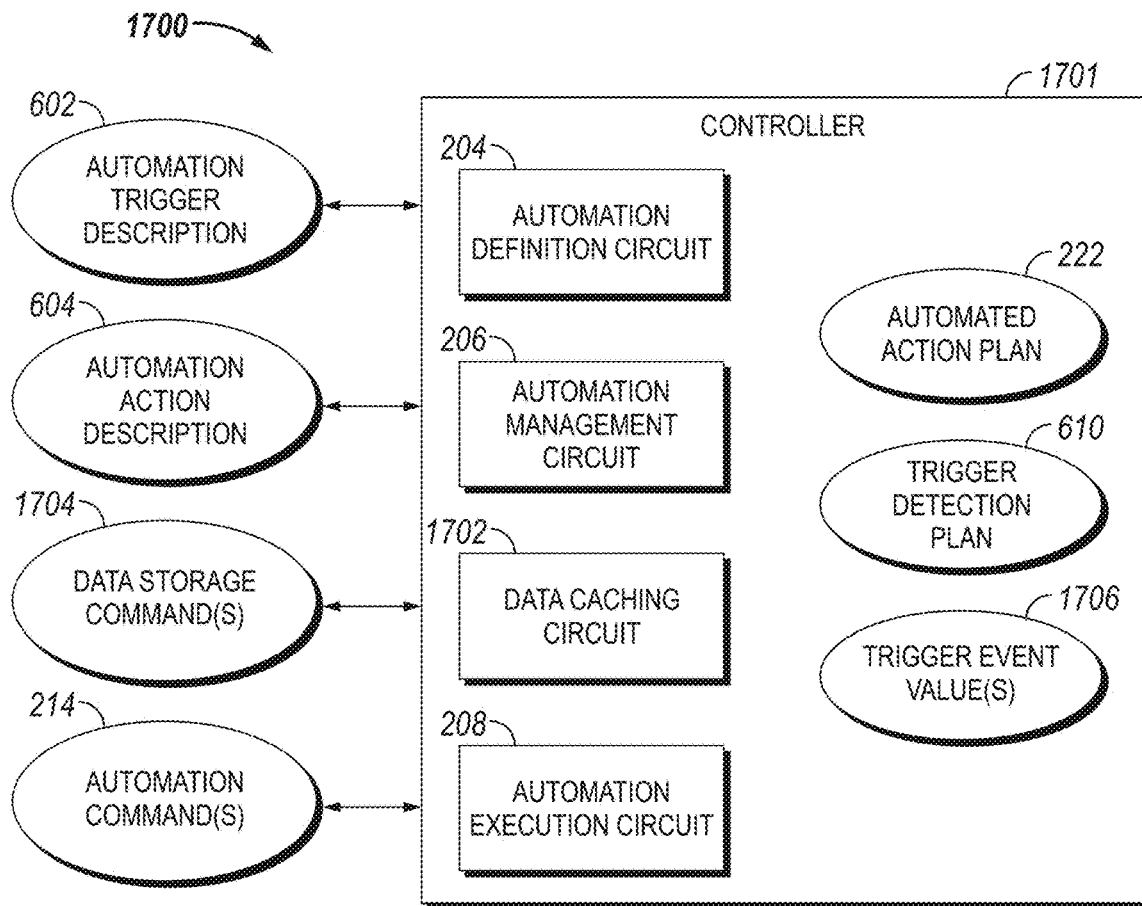
FIG. 17 is a schematic diagram of example triggered automated actions according to certain embodiments of the present disclosure.

Referencing FIG. 17, an apparatus 1700 includes a controller 1701 for performing triggered automated actions for a vehicle. The example controller 1701 includes an automation definition circuit 204 that interprets an automation trigger description 602 and an automation action description 604, and an automation management circuit 206 that provides a trigger detection plan 610 and an automated action plan 222 in response to the automation trigger description 602 and the automation action description 604. The example automation management circuit 206 further provides a data storage command 1704 in response to the trigger detection plan 610 (e.g., providing sufficient storage to perform trigger operations, including trigger evaluation, support for rolling buffers of data, and/or support for data collection operations instructed as part of the trigger detection plan 610). The example controller 1701 includes a data caching circuit 1702 that confirms available data storage on a data storage device, and/or reserves storage on a data storage device, in response to the data storage command(s) 1704. In certain embodiments, the availability of data storage (e.g. whether current available storage, reservable storage, or a combination) may be a part of approval, amendment, or refusal of an automation trigger description, an automation action description, and/or an automation description 212. In certain embodiments, the availability of data storage may be a part of determining an event detection, such as an interruption of a task, workflow, or automated vehicle response activity (e.g., deciding a task is interrupted when memory storage to complete the task is determined to be unavailable). The example controller 1701 includes an automation execution circuit 208 that determines a trigger event value 1706 (e.g., whether a trigger event has occurred) in response to the trigger detection plan 610, and stores trigger evaluation data in response to the trigger event value 1706 and the automated action plan 222 (e.g., as data storage commands 1704 storing the trigger evaluation data). The example automation execution circuit 208 further provides an automation command 214 in response to the trigger event value 1706 (e.g., providing the automation command 214 after the trigger event has occurred, which may further include a delay period). An example system includes one or more end points responsive to the automation command(s) 214 to thereby implement an automated vehicle response. An example data caching circuit 1702 reserves and/or confirms data storage on a memory storage associated with at least one vehicle controller, which may be the controller 1701 including the data caching circuit 1702, or another controller on the vehicle.

Figure 18:
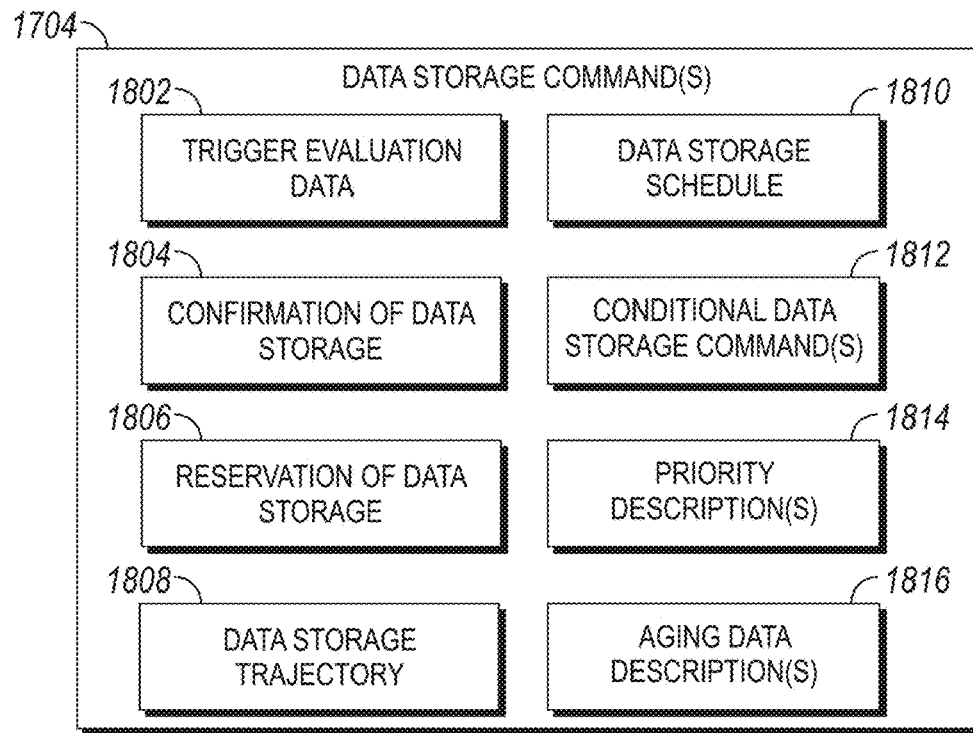
FIG. 18 is a schematic diagram of example data storage command(s) according to certain embodiments of the present disclosure.
Figure 19:
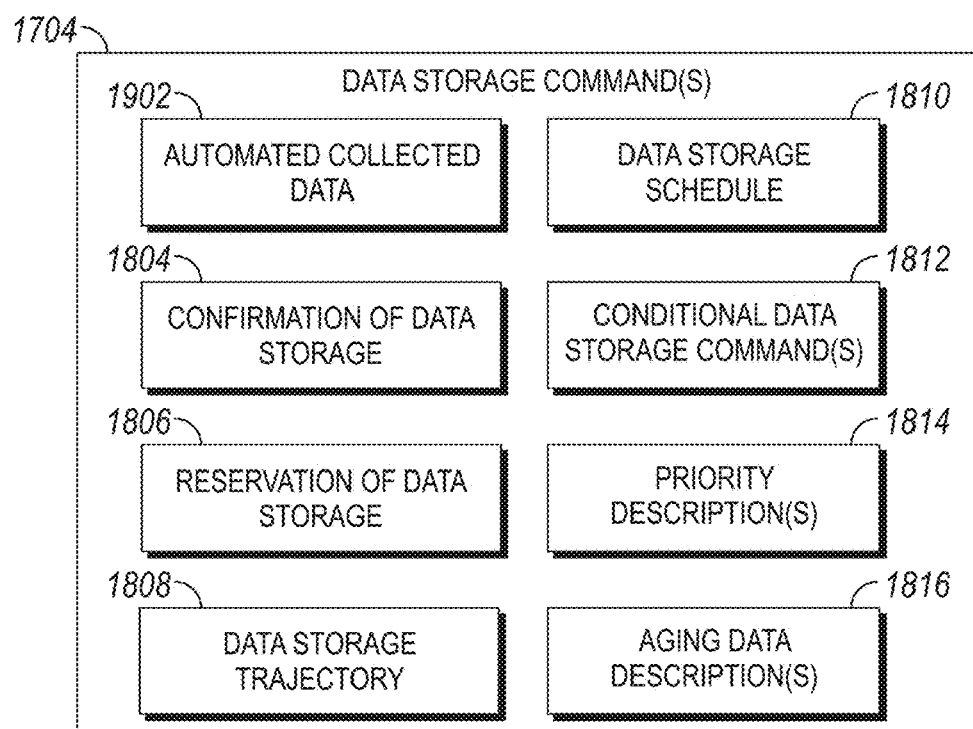
FIG. 19 is a schematic diagram of example data storage command(s) according to certain embodiments of the present disclosure.

Referencing FIG. 18, example data storage command(s) 1704 provided by the automation manager circuit 206 include one or more of: a data storage schedule 1810 of the trigger evaluation data 1802 (e.g., a data retention time, priority information related to the data or portions thereof, etc.); a data storage trajectory 1808 of the trigger evaluation data 1802 (e.g., storage amount over time); a conditional data storage command 1812 (e.g., data storage based upon detected events, triggers that are met, etc., for example allowing for statistical estimation of a data storage amount to support a number of tasks, workflows, automated vehicle responses, or the like, for example based upon the likelihood of simultaneous trigger events for a number of tasks, workflows, automated vehicle responses, etc.); a priority description 1814 for at least one data element of the trigger evaluation data 1802 (e.g., allowing for a prioritization within the data, differential treatment for aging data, and the like); an aging data description 1816 for at least one data element of the trigger evaluation data 1802 (e.g., residence time, transmission priority, activities to be performed to compress, summarize, aggregate, or otherwise reduce the data, and/or deletion aspects such as notifications, alerts, or residual data to be sent upon the deletion of the data); a confirmation of data storage 1804 (e.g., a confirmation that data storage is reserved, and/or that responsive data is stored); and/or a reservation of data storage 1806 (e.g., an amount of data storage to support the tasks, workflows, automated vehicle responses, or the like). The example of FIG. 19 is similar to the example of FIG. 18, with commands related to automated collected data 1902 rather than trigger evaluation data 1802. In certain embodiments, data storage commands 1704 may be present to support both trigger evaluation data 1802 and automated collected data 1902.

An example data caching circuit 1702 performs memory management operations in response to the aging data description 1816, such as: performing a scheduled deletion of at least a portion of the trigger evaluation data 1802; performing a compression operation of at least a portion of the trigger evaluation data 1802; performing a summarization operation of at least a portion of the trigger evaluation data 1802; confirming available storage on a shared data storage device; and/or reserving and/or confirming the reservation of data storage on a shared data storage device. Example embodiments herein utilizing shared storage may include a shared storage controller and/or any aspects thereof, for example as described in U.S. patent application Ser. No. 17/195,589 (SONA-0010-U01), for example at FIG. 16 of the '589 application, and the related descriptions.

Again referencing FIG. 17, an example automation management circuit 206 provides a data storage command 1704 in response to the automation action description 604. All preceding operations and aspects set forth in relation to FIG. 17, which were described in relation to trigger evaluation data 1802, are also applicable to data collected as a part of the task, workflow, and/or automated vehicle response, determined from the automation action description 604. Example operations include confirming and/or reserving data storage, management of aging data, confirmation communications, conditional data storage, and/or any data storage command 1704 examples, including for example those depicted in relation to FIG. 18 or 19.

Figure 20:
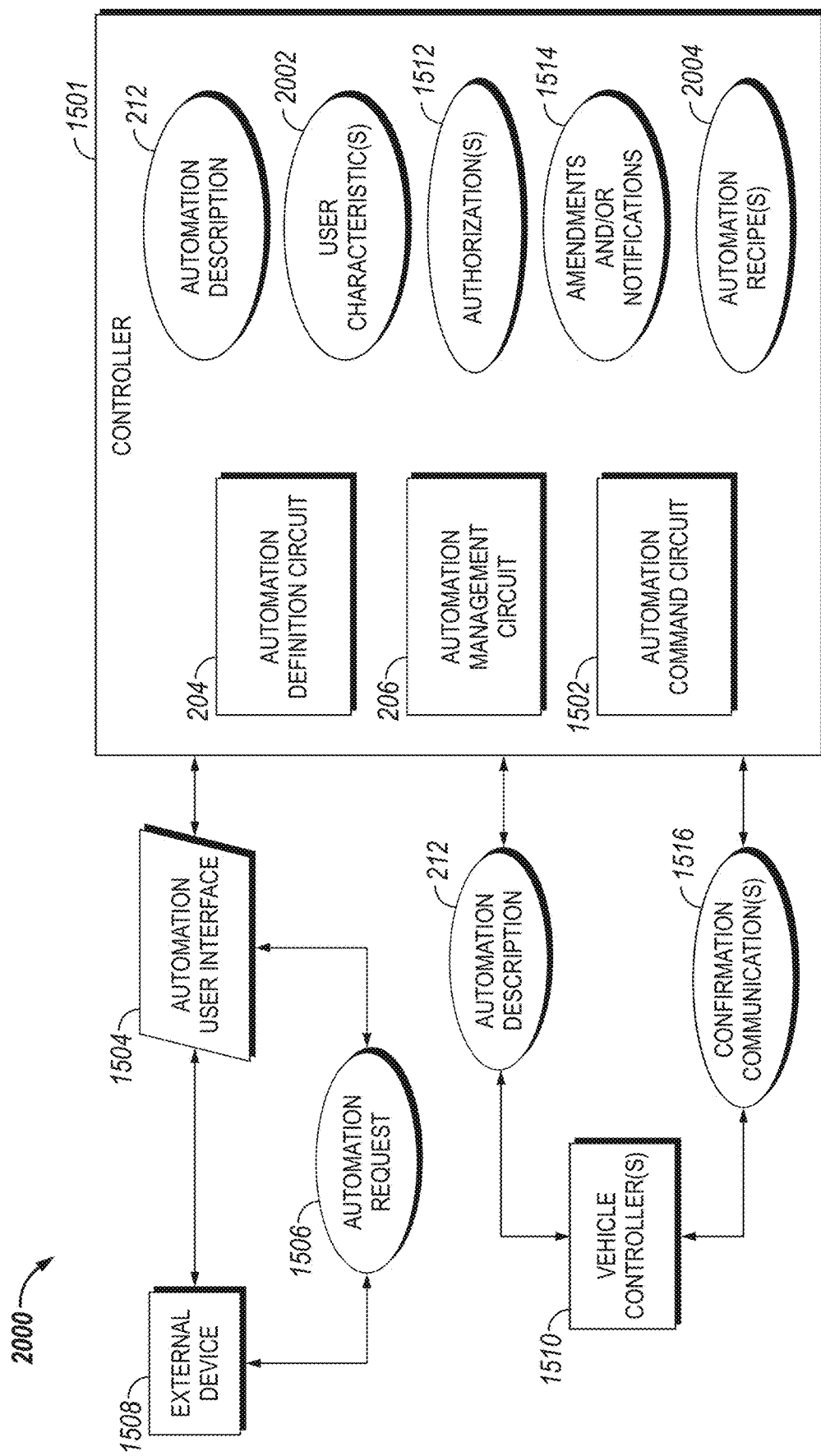
FIG. 20 is a schematic diagram of an example controller configured to provide an automation description apparatus according to certain embodiments of the present disclosure.

Referencing FIG. 20, an example apparatus 2000 includes a controller 2001 configured to provide an automation description 212 to a vehicle controller 1510. The example controller includes an automation definition circuit 204 that implements an automation user interface 1504, and provides at least one automation recipe 2004 to the automation user interface 1504, and interprets an automation request 1506 in response to user communications with the automation user interface 1504. In certain embodiments, the automation request 1506 may include one or more selected recipes from the automation recipes 2004, a modified or adjusted version (e.g., by the user) of one or more selected recipes, and/or may be generated independently of the automation recipes 2004 (e.g., through a task or workflow builder, such as depicted in FIGS. 25-27, and 31). An example automation definition circuit 204 selects a group of automation recipes 2004 in response to a user characteristic 2002 of the user, and provides the at least one automation recipe to the automation user interface 1504 in response to the selected group (e.g., provide all of the selected recipes, provide the top 10 selected recipes, etc.). The selection of recipes from the automation recipes 2004 based on the user characteristic 2002 includes selecting recipes for which the user has authorization, and/or selecting recipes that may be of interest to the user (e.g., based on a role of the user, and tags for the recipes, and/or recipes utilized by users having a similar role, and/or based on another aspect of the user such as an entity type—e.g., manufacturer, OEM, dealer, fleet owner, operator, etc.). Example and non-limiting user characteristics 2002 include one or more of: a user role, an entity associated with the user, a user authorization, or a user historical activity with the automation user interface 1504. In certain embodiments, each of the automation recipes 2004 includes operations for one or more of: an automated operation of the vehicle; a portion of an automated operation of the vehicle (e.g., with portions to be completed by the user); and/or a template for an automated operation of the vehicle (e.g., a recipe built to be a good starting point for a range of potential automated operations). An example automation request 1506 includes at least one parameter description that is an agnostic parameter description, or a parameter description that is not vehicle-specific, for example including parameter naming, units, resolution, sampling rate, etc. that is consistent with an industry standard, a standard for an entity (e.g., a company employing the user), a parameter description for a different vehicle (e.g., a prior year model compared to the target vehicle, a similar vehicle having a different component and/or network configuration from the target vehicle, or another vehicle unrelated to the target vehicle, for example a parameter consistent with a vehicle recently accessed by the user). In certain embodiments, the automation description 212 includes vehicle specific parameters. In certain embodiments, the automation description 212 includes normalized parameters, where vehicle specific parameters are determined on the vehicle controller 1510, for example by a CND, policy engine, or the like.

Figure 21:
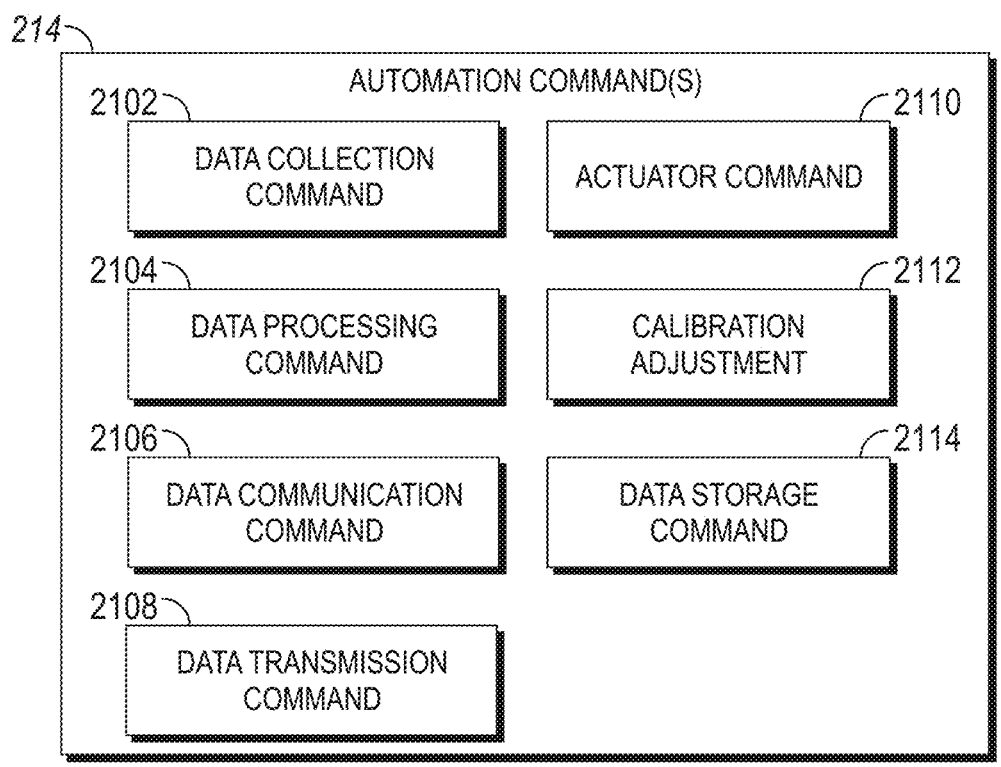
FIG. 21 is a schematic diagram of example automation command(s) according to certain embodiments of the present disclosure.

Referencing FIG. 21, a number of aspects of an example automation command 214 are schematically depicted. The example automation commands 214 may each include one or more aspects depicted in FIG. 21, and an automation command 214 may include other aspects that are not depicted in the example of FIG. 21. An example automation command 214 includes one or more of a data collection command 2102 (e.g., data to be collected for trigger evaluation, event detection, and/or as a part of a task, workflow, automated vehicle response, etc.); a data processing command 2104 (e.g., parameter naming; unit selection; resolution such as byte depth, display resolution, or the like; sampling rates including up-sampling and/or down-sampling operations; synchronizing or time spacing processing of sequential data values; a data communication command 2106 (e.g., which elements of data are to be communicated on a network, to which end points, as a multi-cast, etc.); a data transmission command 2108 (e.g., which elements of data are to be transmitted, including potentially related time frames, priority, etc.); an actuator command 2110; a calibration adjustment 2112; and/or a data storage command 2114 (e.g., including data reservation, aging data treatment, storage priority, etc.).

Again referencing FIG. 2, an example automation definition circuit 204 interprets a number of automation requests 1506 and/or automation descriptions 212, where the automation management circuit 206 provides an automated action plan 222 in response to the automation requests 1506 and/or automation descriptions 212. In certain embodiments, the automation requests 1506 and/or automation descriptions 212 further include corresponding priority values, and to provide the automated action plan 222 in response to the priority values. In certain embodiments, the automation requests 1506 and/or automation descriptions 212 further include corresponding hierarchy values, and to provide the automated action plan 222 in response to the hierarchy values. A hierarchy value may relate to an ordering of automation descriptions, tasks, workflows, or the like, and/or may relate to an entity associated with the automation descriptions, tasks, workflows, or the like. An entity associated with an automation descriptions, tasks, workflows, or the like may relate to any entity requesting information (e.g., a user, user role, and/or entity role such as of a company for the user), any entity providing information (e.g., a vehicle controller, end point, flow, application, vehicle function, or the like that provides information as a part of the automation description, task, workflow, or the like), and/or any entity significantly affected by the automation description, task, workflow, or the like (e.g., due to related network zone traffic, controller processing operations to support the task, and/or data storage operations to support the task). The utilization of a hierarchy value allows for granular response to different users, entities, roles, and application types on the vehicle (e.g., improving support for a fuel system function of the vehicle versus an entertainment display function of the vehicle). An example automation management circuit 206 determines a dependency value between at least two of the automation descriptions 212 (e.g., based on parameter determination and/or ordering, an indicated dependency in the automation descriptions 212, and/or based on enforced execution schedules of related functions of the vehicle that provide or respond to data affected by the automation description, task, workflow, or the like). An example automation management circuit 206 determines an operation impact for at least one of the automation descriptions 212, and provides the automated action plan 222 in response to the operation impact. In certain embodiments, the automation management circuit determines a life cycle value for an automation recipe and/or for an automation description 212, and stores the automation recipe and/or an automation description 212 in response to the life cycle value. For example, the life cycle value may indicate that the automation description 212 (and/or an automation recipe) should be performed one time, should be performed a selected number of times, should be performed persistently, should be performed over a selected time period (e.g., for the next six months), and/or should be performed while another condition is true or false (e.g., ending the life cycle of the automation description 212 and/or automation recipe, for example when the condition changes). An example automation management circuit 206 deprecates at least one of the automation descriptions 212, for example by marking a description for removal, by deleting a description, and/or by ceasing operations to support a description (e.g., including stopping trigger evaluation, data storage, data storage reservation, etc.). Example and non-limiting operations to deprecate an automation description 212 and/or an automation recipe include one or more of: updating the automated action plan 222 to remove deprecated automation descriptions; deleting stored data responsive to the deprecated automation descriptions; deleting a stored recipe corresponding to the deprecated automation descriptions; and/or adjusting at least one of a priority value or a hierarchy value corresponding to the deprecated automation descriptions.

Figure 22:
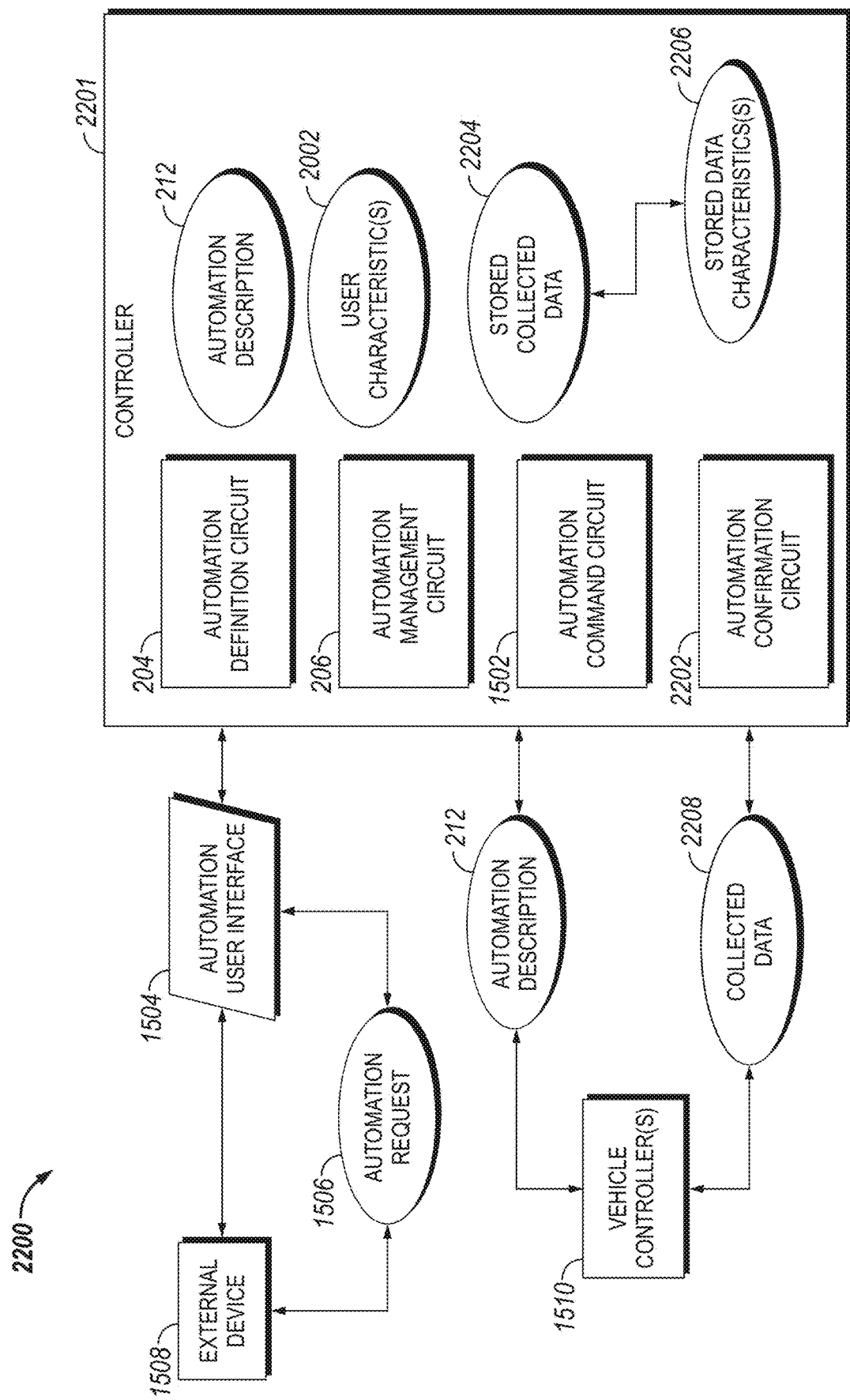
FIG. 22 is a schematic diagram of an example controller configured to store collected data apparatus according to certain embodiments of the present disclosure.

Referencing FIG. 22, an example apparatus 2200 includes a controller 2201 configured to store collected data related to a task, workflow, automated vehicle response, or the like. The example controller 2201 includes an automation definition circuit 204 that implements an automation user interface 1506 includes at least one available input parameter (e.g., a data parameter that is available on the vehicle, and/or that can be made available on the vehicle), at least one available actuation parameter (e.g., an actuator that is available for at least partial manipulation; and/or a feature that is available for at least partial manipulation, such as having available calibration adjustments, and/or feature enable/disable operations), and at least one responsive data selection, such as data available for collection, confirmation data that can be provided, verification data that can be provided, and/or confirmation communications that can be provided. The example controller 2201 includes an automation confirmation circuit 2202 that receives collected data 2208 from the vehicle in response to the automated vehicle response (e.g., the performance of tasks, workflows, automated vehicle response activity, etc.), and to store the collected data 2204 for asynchronous access. In certain embodiments, for example where the automation confirmation circuit 2202 is positioned at least partially on the vehicle, receiving the collected data 2208 from the vehicle includes receiving the collected data 2208 from an end point of the vehicle that may be a separate end point from an end point hosting the portion of the automation confirmation circuit 2202. The stored collected data 2204 may be stored on the vehicle, on a cloud server, and/or on a shared data store. In certain embodiments, the stored collected data 2204 is made available for a vehicle function, flow, application, or end point to access at a later time. In certain embodiments, the stored collected data 2204 is stored on a cloud server, and accessed by a vehicle function, flow, application, or end point at a later time, where at least a portion of the stored collected data 2204 is brought back to the vehicle at a later time (e.g., when requested). In certain embodiments, the stored collected data 2204 is made available for an external device, for example a cloud server application, fleet manager application, manufacturer application, or the like, for example to allow access to data for a number of vehicles together, for a fleet of vehicles, and/or for a machine learning process that performs an iterative improvement operation for the vehicle using the stored collected data 2204. In certain embodiments, a portion of the stored collected data 2204 is provided, for example by the automation confirmation circuit 2202, to the automation user interface 1504 in response to a user request (e.g., a request for the data, and/or a request by an application operated by the user for the data). In certain embodiments, a user receiving and/or requesting the stored collected data 2204 may be a distinct user from the user providing the automation request 1506. In certain embodiments, a redacted portion of the stored collected data 2204 is provided to a vehicle function, flow, application, or end point, to an application operating on an external device, and/or to the automation user interface 1504. In certain embodiments, the redacted portion of the data to be supplied, and/or the portion of the data to be supplied otherwise, may be stored on a separate data store (e.g., data store 116 versus data store 114) from the stored collected data 2204, which may include separate encryption and credentials. Operations to redact the stored collected data 2204 and/or to utilize segregated storage and/or credentials, allows for a convenient mechanism to limit exposure of users to certain data types (e.g., proprietary data, personally identifiable information, etc.), as well as protect the stored collected data 2204 from a security breach of the requesting user or device for the stored collected data 2204. In certain embodiments, the automation confirmation circuit 2202 determines the redacted portion of the stored collected data 2204 in response to information such as: a characteristic 2206 of the stored collected data 2204 (e.g., proprietary information in the stored collected data 2204, personally identifiable information in the stored collected data 2204, and/or metadata in the stored collected data 2204). In certain embodiments, a responsive data selection for display and/or selection on the automation user interface 1504 include one or more of: a confirmation value associated with the automated vehicle response, data collected pursuant to the automated vehicle response, and/or a modification value associated with the automated vehicle response.

An example automation definition circuit 204 provides available input parameters in a menu of available input parameters. An example automation definition circuit 204 determines available input parameters in response to a user characteristic 2002, such as a user role, user authorization, and/or an entity associated with the user. An example automation definition circuit 204 provides automation recipe(s) to the automated user interface 1504, and may further determine the automation description 212 in response to selection(s) and/or modification(s) of the automation recipe(s) by the user.

Figure 23:
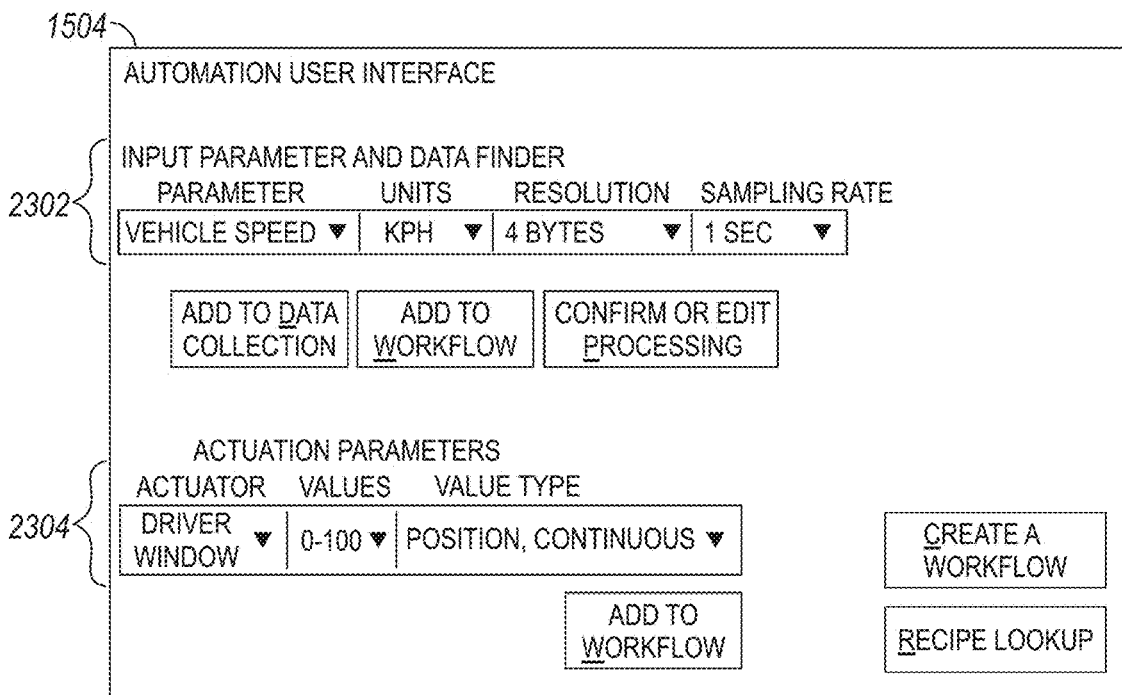
FIG. 23 is a schematic diagram of an example automated user interface according to certain embodiments of the present disclosure.

Referencing FIG. 23, an example automated user interface 1504 is depicted, which may be utilized to help users determine available parameters, to provide parameters to a workflow, to request specific parameter formatting, processing, and the like. The example automated user interface 1504 is depicted to illustrate certain aspects of the present disclosure, but is not limiting to embodiments herein. The example automated user interface 1504 includes an input parameter portion 2302, allowing the user to confirm or select a parameter name, parameter units, parameter resolution (e.g., byte depth, but may instead be a precision description or the like), and/or a sampling rate for the parameter. In the example of FIG. 23, optional action buttons are provided to allow the user to convenient set the parameter for data collection, to make the parameter available to a workflow, and/or to confirm or edit the data processing to be applied to the parameter. Some selections may not be available to the user based on permissions, authorizations, user characteristics, or the like—for example certain parameters, resolution values, sampling rate values, or the like. In certain embodiments, unavailable selections may be hidden from the automated user interface 1504, and/or may be displayed in a distinct manner (e.g., grayed out values that cannot be selected in a menu). The example automated user interface 1504 includes an actuator parameter portion 2304, including an actuator parameter name, available values, and/or a value type (e.g., Boolean, integer, etc.). The example actuator parameter portion 2304 allows a user to convenient confirm proper parameter notation in a workflow, and to make an actuation parameter available to a workflow. In the example of FIG. 23, an action button is provided to allow a user to conveniently open a workflow creation window, and/or to review a list of available recipes.

Figure 24:
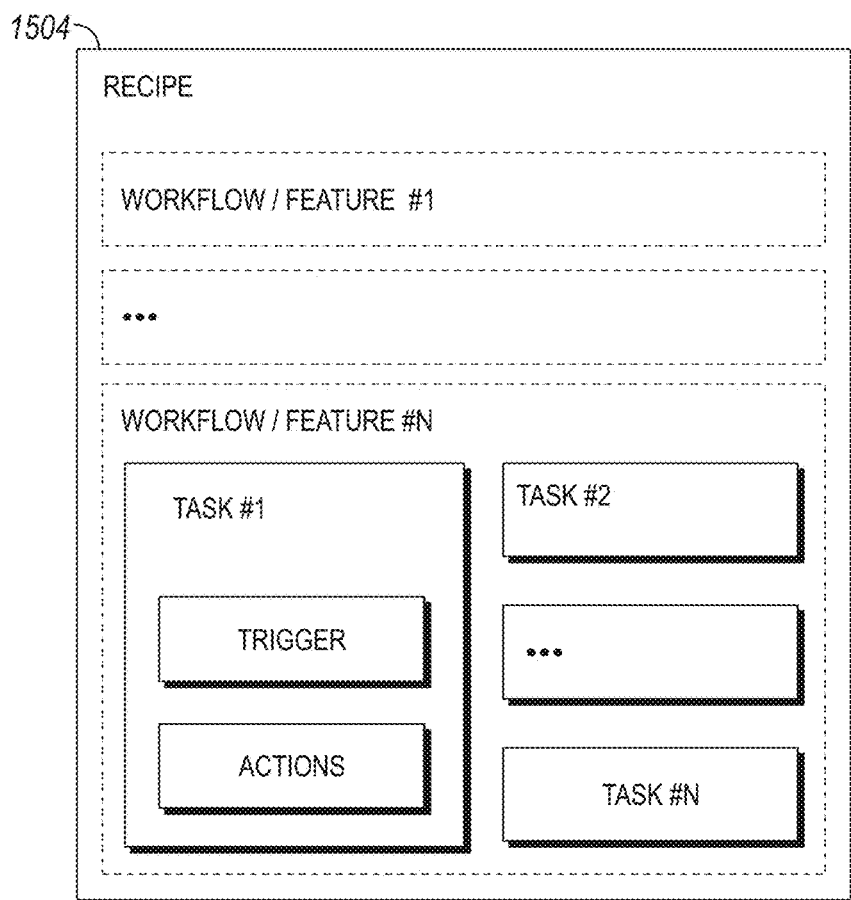
FIG. 24 is a schematic diagram of an example recipe access interface according to certain embodiments of the present disclosure.

Referencing FIG. 24, an example recipe access interface, which may be a part of an automated user interface 1504, is schematically depicted. The example of FIG. 24 depicts which workflow and/or features are related to the recipe (e.g., which workflows use the recipe, and/or which workflows are included in the recipe), where each workflow includes one or more actions to be performed, and/or one or more triggers associated with the workflow.

Figure 25:
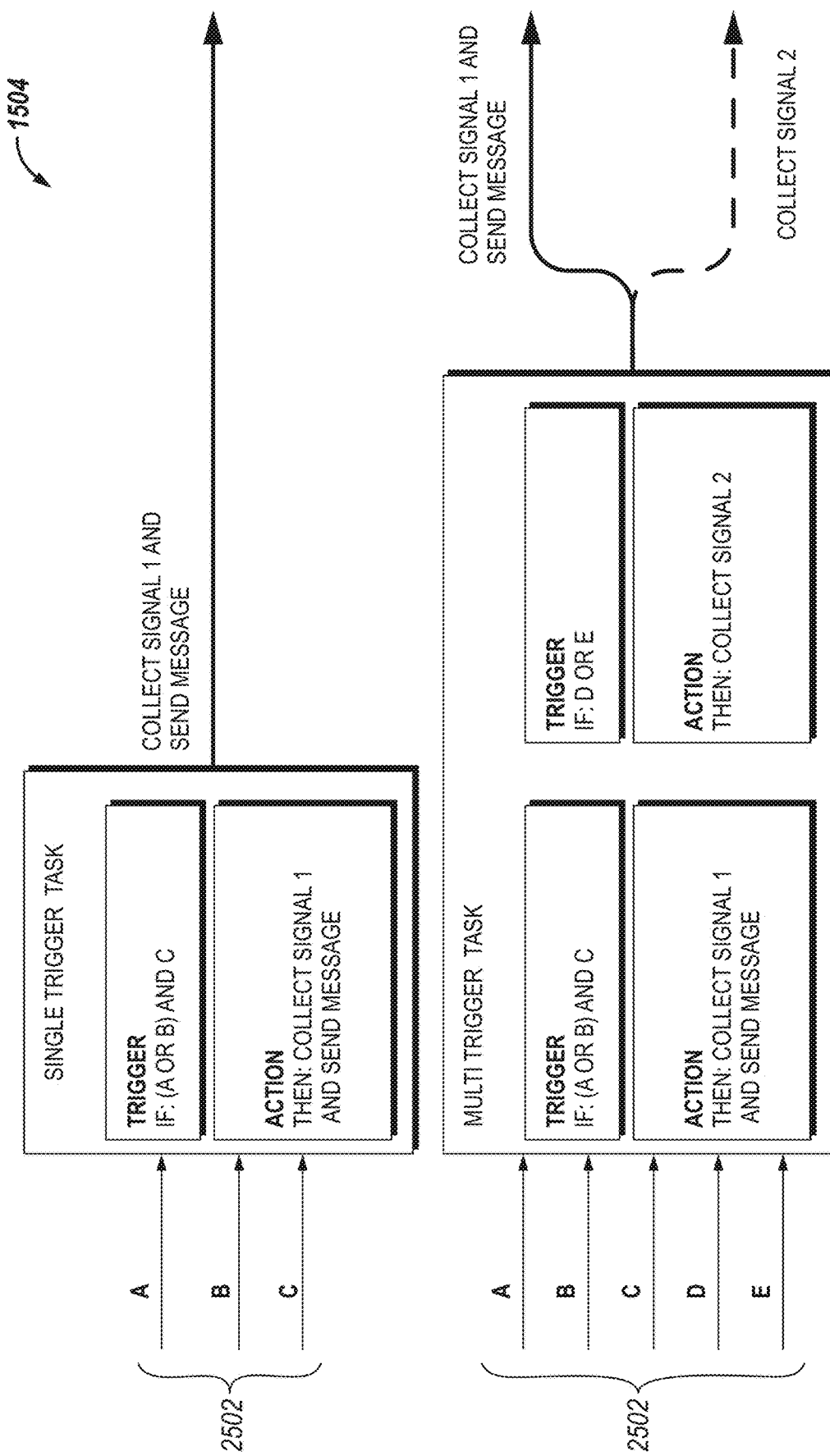
FIG. 25 is a schematic diagram of an example trigger workflows according to certain embodiments of the present disclosure.
Figure 26:
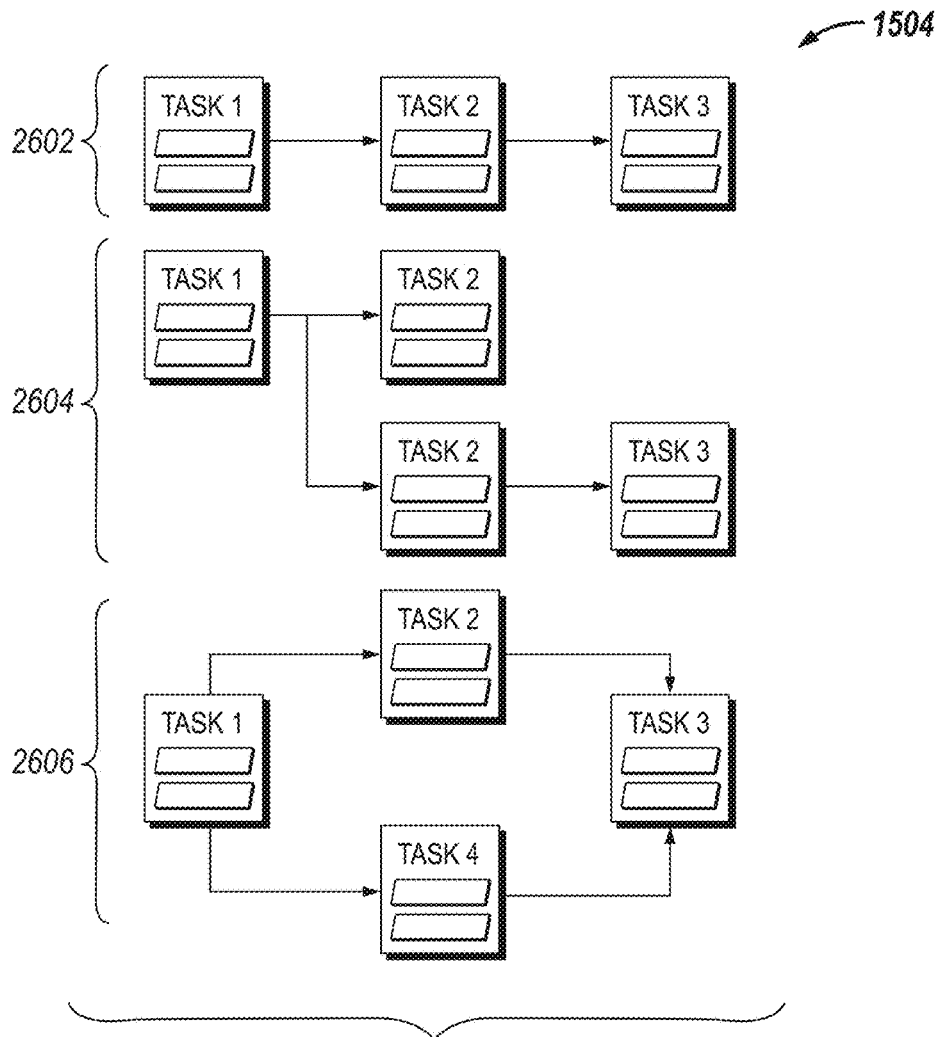
FIG. 26 is a schematic diagram of an example workflows according to certain embodiments of the present disclosure.
Figure 27:
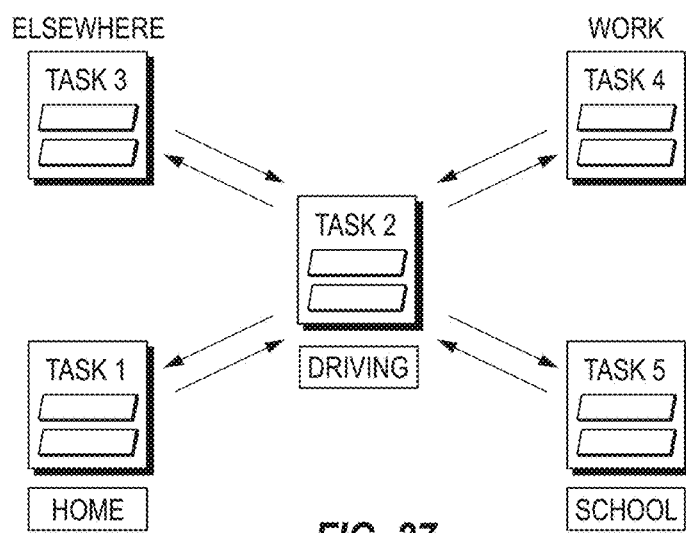
FIG. 27 is a schematic diagram of an example workflow according to certain embodiments of the present disclosure.

Referencing FIG. 25, two example workflows are schematically depicted. A first workflow 2502 includes a single trigger and an action associated with the trigger. The example workflow 2502, which may be a collection recipe, provides a convenient data collection format based on a trigger of interest. A second workflow 2504 includes a two-task sequence, with a trigger associated with each task, providing a convenient conditional data collection format based on triggers of interest. Referencing FIG. 26, three example workflows 2602, 2604, 2606 are schematically depicted. The example of FIG. 26 illustrates the flexibility of workflow creation of embodiments herein, including allowing for sequenced tasks (workflow 2602), branched tasks (workflow 2604), and/or cyclical tasks 2606. Referencing FIG. 27, an example workflow is depicted as a state machine, with tasks associated with each state, and with transition conditions provided for transitioning between states. The displays of FIGS. 25-27 may be provided to an automated user interface 1504, for example to allow a user to visualize, arrange, and edit workflows.

Figure 28:
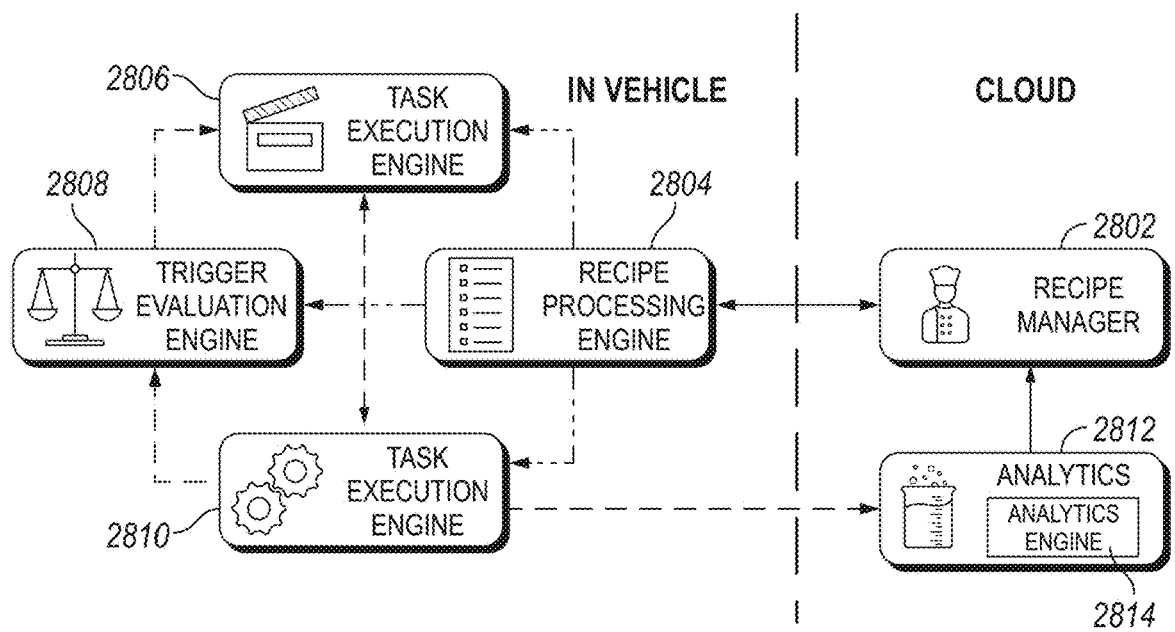
FIG. 28 is a schematic diagram of an example implementation of an automated vehicle response activity according to certain embodiments of the present disclosure.

Referencing FIG. 28, an example system 2800 is schematically depicted to support implementation of automated vehicle response activity, for example including aspects of, and/or embodied in whole or part, by controllers and/or circuits herein that are configured to perform operations associated with the components depicted in the example of FIG. 28. The example system 2800 includes a recipe manager 2802 configured to create a recipe (e.g., through interaction with a user exercising the automated user interface 1504, and/or to create an auto-generated recipe to detect certain conditions, data elements, and/or to support data collection for machine learning operations designed to improve vehicle operations, detect fault conditions, or the like). The example system 2800 includes an analytics component including an analytics engine 2814 configured to determine analytics 2812 such as trends, predict future failures, identify anomalous data (e.g., for a vehicle, a vehicle component, and/or related to an associated group of vehicles such as a model year, specific fleet, vehicles have a related role or duty cycle, etc.), which may be utilized to determine recipes, to suggest recipes (or tasks, workflows, or data collection activities), and/or to assist a user in determining whether a recipe (or task, workflow, or data collection activity) is likely to develop more information about a particular condition, and/or to provide useful information for a specific goal of the user.

The example system 2800 includes a recipe processing engine 2804, for example processing the recipe as an automation description 212, and determining a trigger detection plan 610 and an automated action plan 222. In the example system 2800, the trigger detection plan 610 is provided to a trigger evaluation engine 2808, and the automated action plan 222 is provided to a task execution engine 2806. The example trigger evaluation engine 2808 processes the trigger detection plan 610 to determine when a task is indicated, and the example task execution engine 2806 processes the automated action plan 222 to perform the operations of the task described therein. The example system 2800 includes a data preparation engine 2810 that collects data related to the trigger evaluation and/or task execution, storage and/or caching associated with the data, processing associated with the data, and transmission of the data off-vehicle (e.g., back to the analytics engine 2814 in the example of FIG. 28).

Figure 29:
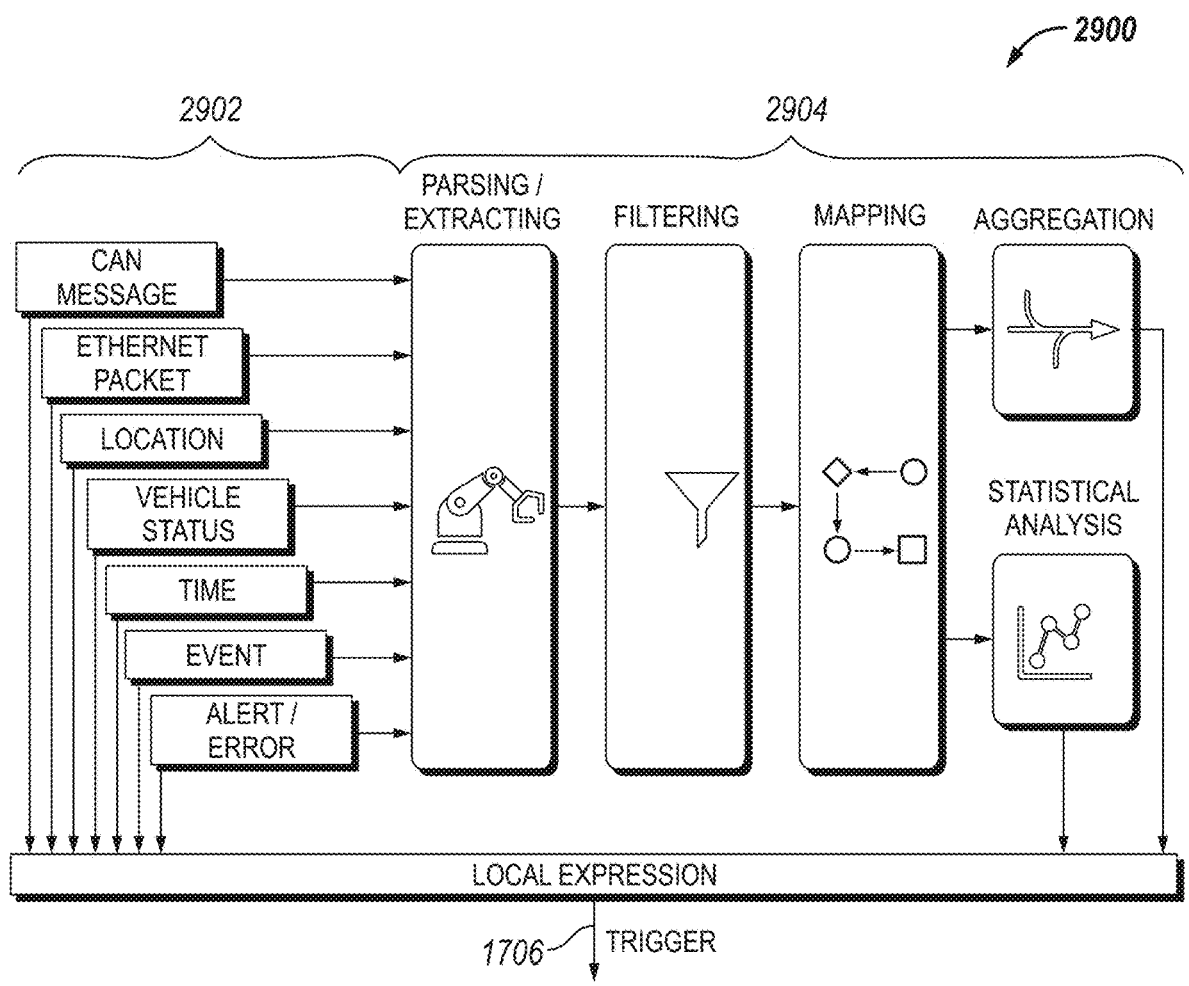
FIG. 29 is a schematic diagram of an example trigger evaluation engine according to certain embodiments of the present disclosure.

Referencing FIG. 29, an example trigger evaluation engine 2900 is schematically depicted. The example trigger evaluation engine 2900 may be utilized in a system 2800, and/or may be embodied, in whole or part, by one or more circuits or controllers described herein and configured to perform operations of the trigger evaluation engine 2900.

The example trigger evaluation engine 2900 includes a support layer 2902, which in the example of FIG. 29 manages communications, retrieving external data, configuring messages to a network zone, and the like. the example trigger evaluation engine 2900 includes an analysis layer 2904 configured to parse and/or extract relevant data, for example data utilized to determine whether the trigger condition is TRUE or FALSE. The example analysis layer 2904 is further configured to filter the data, for example utilizing a sampling of data, aspects of the data (e.g., maximum or minimum values, or the like), perform mapping of the data (e.g., comparing the data to relevant criteria and/or task operations for the data), and/or may further be configured to aggregate the data (e.g., summarization, moving averages, bucketed data, state values based on the whole of the data or aggregated subsets of the data, or the like), and/or to perform statistical analysis of the data (e.g., where statistical values are related to trigger thresholds, to determine outlier data, and/or to support heuristic triggers such as heuristics based on certain data effects, dynamics, likelihood that the data is meaningful, etc.). In the example of FIG. 29, the trigger evaluation engine 2900 provides a trigger event value 1706, for example providing an indication of whether the trigger condition has been met.

Figure 30:
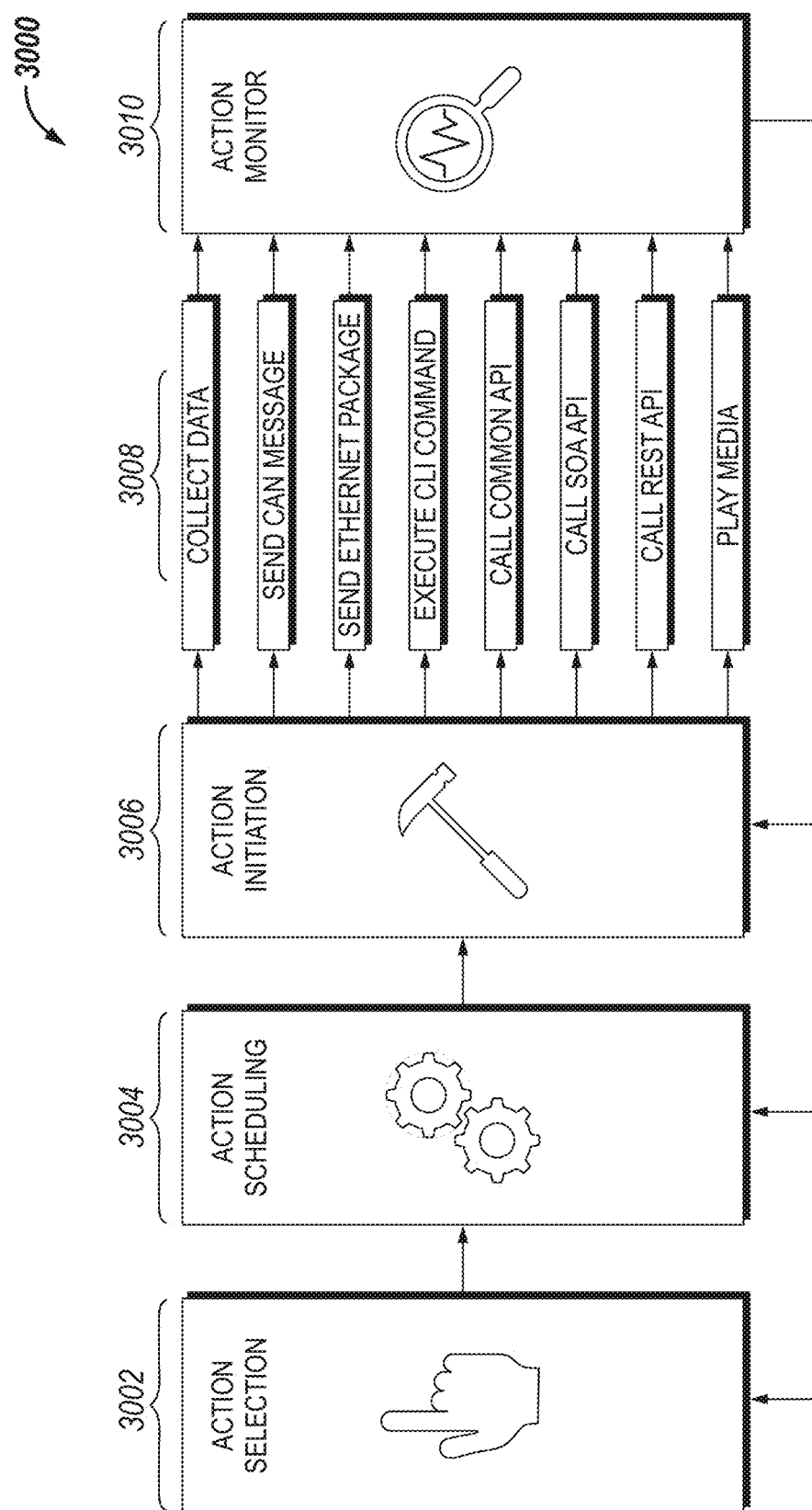
FIG. 30 is a schematic diagram of an example task execution engine according to certain embodiments of the present disclosure.

Referencing FIG. 30, an example task execution engine 3000 is schematically depicted. The example task execution engine 3000 may be utilized in a system 2800, and/or may be embodied, in whole or part, by one or more circuits or controllers described herein and configured to perform operations of the task execution engine 3000. The example task execution engine 3000 includes an action selection layer 3002, for example selecting a task for execution based on trigger conditions, task priority, task hierarchy, or the like. The example task execution engine 3000 includes an action scheduling layer 3004, for example scheduling the commencement, duration, ordering, and the like for a number of active tasks on the system 2800. The example task execution engine 3000 includes an action initiation layer 3006, for example commencing the operation of one or more actions for a task. The example task execution engine 3000 includes a support layer 3008, controlling data communications, data storage, API interactions, database interactions, and/or service interactions (e.g., publishing and/or subscribing to service(s) related to tasks, for example to provide data utilized by the task, and/or to provide actions that may be available as a service and performed as a part of a task). The example task execution engine 3000 includes an action monitor layer 3010, for example determining a task state, task stage, determining confirmation values associated with the task, and/or determining an outcome of the task.

Referencing FIG. 31, an example automated user interface 1504 is schematically depicted, providing an example interface that illustrates aspects of an example recipe and/or recipe creation interface. The example of FIG. 31 includes a recipe name (which may be a name such as "Morning seat adjustment recipe"), and a display area to depict data utilized by the recipe, and/or modifications made to the original data available in the unmodified recipe. The example of FIG. 31 further depicts a number of tasks included in the recipe (e.g., A, B, . . . H in FIG. 31), which in the example of FIG. 31 includes a description of a trigger for the task, actions performed by the task, and/or other tasks called by each given task. In the example of FIG. 31, a graphical depiction of the task relationships is depicted for the convenient reference of the user. In certain embodiments, the automated user interface 1504 is provided for user reference, for example by parsing a code block embodying the recipe, and/or the automated user interface 1504 may be interactive, for example allowing the user to edit the tasks, triggers for the tasks, actions associated with the tasks, and/or relationships between tasks—for example by text edits of the user in data fields, dragging and dropping tasks in the graphical portion, or the like.

Figure 32:
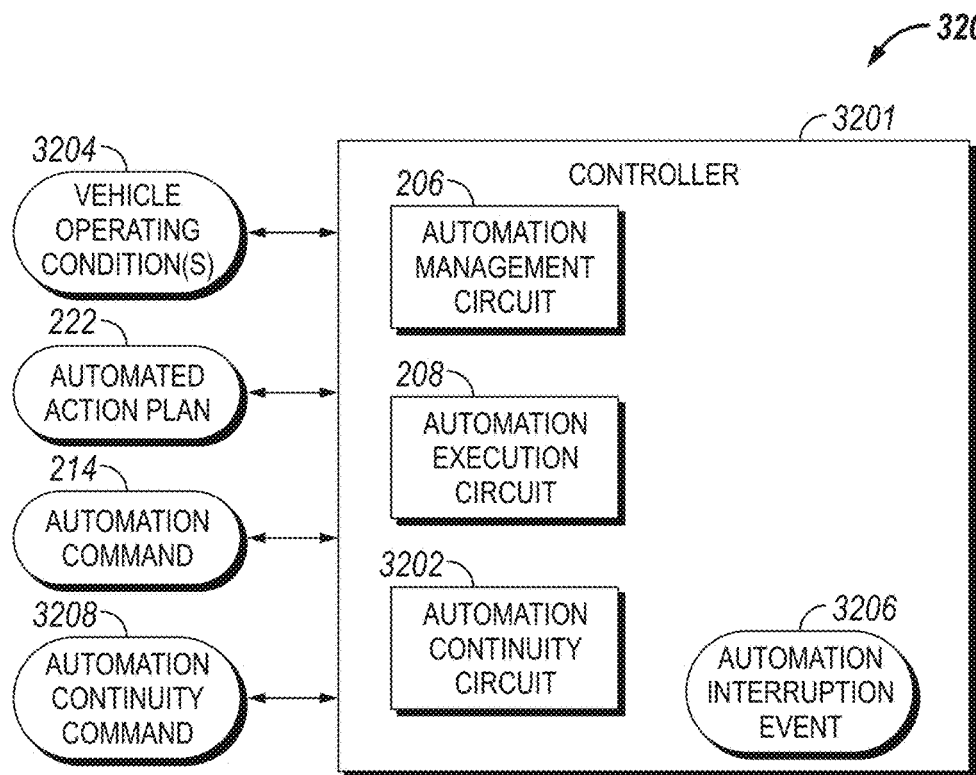
FIG. 32 is a schematic diagram of an example controller configured to provide automation continuity command(s) according to certain embodiments of the present disclosure.
Figure 33:
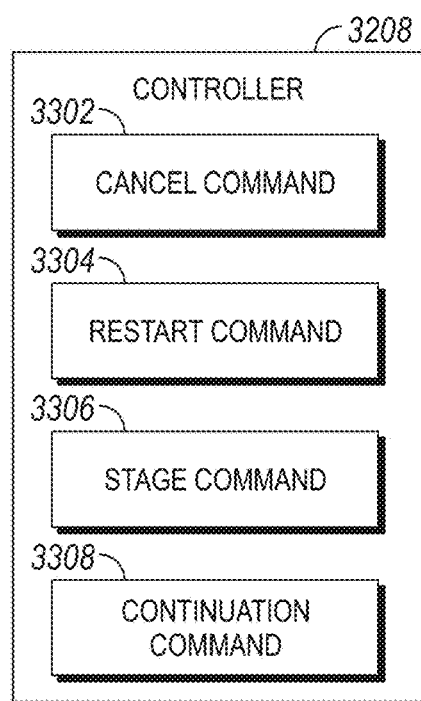
FIG. 33 is a schematic diagram of example automation continuity command(s) according to certain embodiments of the present disclosure.

Referencing FIG. 32, an example apparatus 3200 includes a controller 3201 configured to provide automation continuity command(s) 3208, for example to control interruption and/or recovery of tasks, workflows, and/or automated vehicle response activities. The example controller 3201 includes an automation management circuit 206 that provides an automated action plan 222, an automation execution circuit 208 that provides an automation command 214 in response to the automated action plan 222, and an automation continuity circuit 3208 that determines whether an automation interruption event 3206 has occurred. The example automation continuity circuit 3208 provides an automation continuity command 214 in response to the automation interruption event 3206. Referencing FIG. 33, an example and non-limiting automation continuity command(s) 3208 include one or more of: a cancel command 3302 (e.g., the task is canceled, and will not be resumed, and/or will only be resumed based on future determined trigger conditions); a restart command 3304 (e.g., the task is stopped, and will be resumed when operating conditions are consistent with further progression of the task); a stage command 3306 (e.g., the task is stopped, and should be continued at a particular stage, whether in response to a future determined trigger condition and/or when operating conditions are consistent with further progression of the task—for example when relevant data collected in earlier stages of the task are likely to be still applicable to later stages of the task); and/or a continuation command 3308 (e.g., when an interrupted task can be continued, for example when a limiting value such as data storage availability is relieved). Example and non-limiting automation interruption event(s) 3206 include one or more of determining that a vehicle shutdown event has occurred or is imminent; a determination that a vehicle operating condition precludes the completion of the automated action plan (e.g., data utilized for a later stage trigger or action is presently unavailable); a determination that a vehicle operating condition precludes the continuation of the automated action plan (e.g., data utilized for the present stage trigger or action is presently unavailable, and/or an operating condition is inconsistent with continuing the task); and/or a determination that a vehicle operating condition precludes the execution of at least one aspect of the automated action plan (e.g., a related task is interrupted, where the automated action plan including the currently contemplated task cannot be completed without the completion of the related task). In certain embodiments, the automated action plan 222 is provided as a part of a policy, where the policy includes a continuity description defining criteria to determine whether an interruption has occurred, and/or to adjust a response of the automation continuity circuit 3202 to an interruption of a task. For example, the policy may be utilized by a user to define global or default task interruption responses, responses for selected applications, flows, vehicle functions, end points, or the like.

Figure 34:
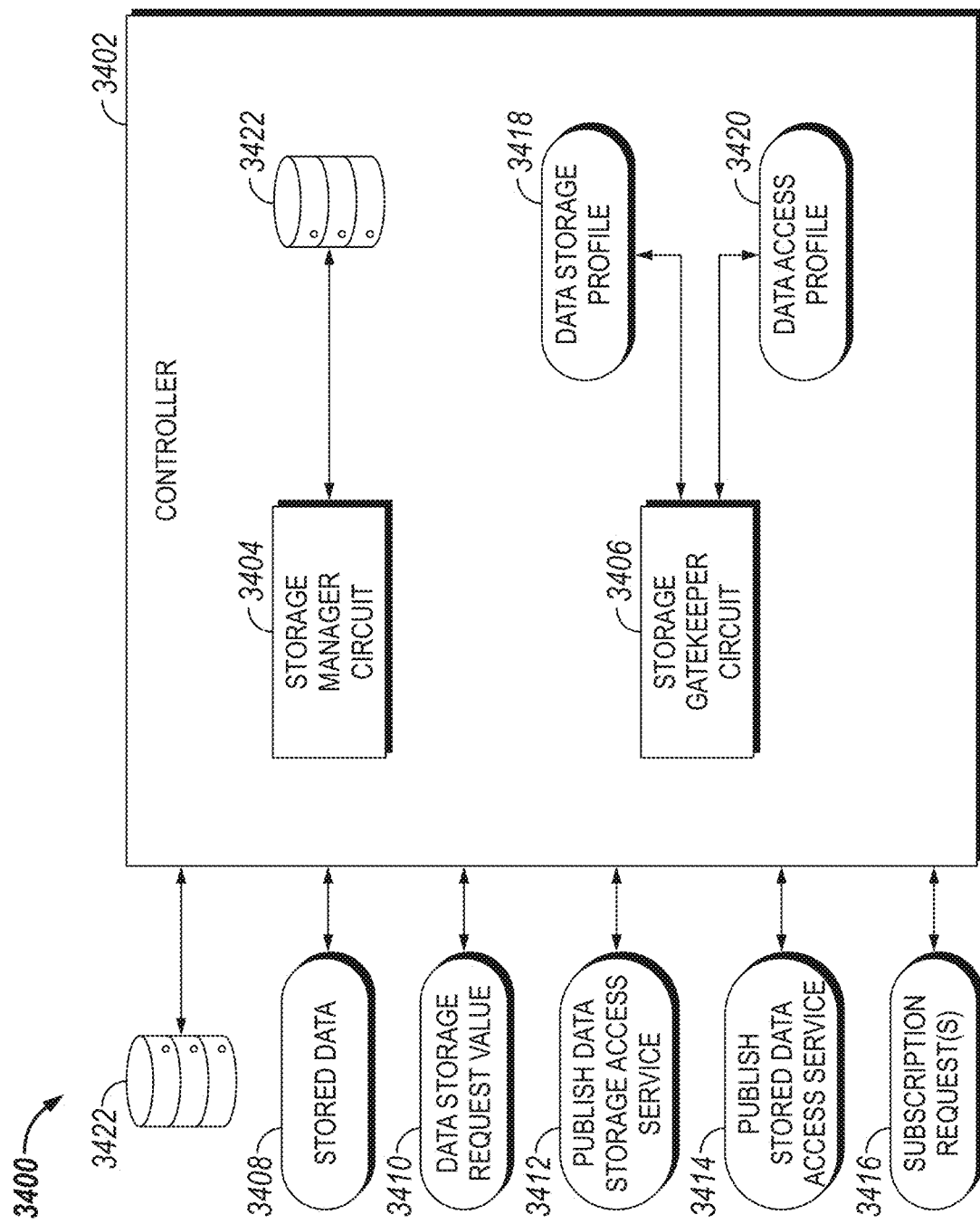
FIG. 34 is a schematic diagram of an example controller configured to manage a service oriented architecture according to certain embodiments of the present disclosure.

Referencing FIG. 34, an example apparatus 3400 includes a controller 3402 configured to manage a service oriented architecture to support tasks, workflows, automated vehicle response activities, and the like. In certain embodiments, the controller 3402 manages a service oriented architecture for utilization by any end point, vehicle function, flow, or the like on the vehicle, and/or for utilization by an external device, for example accessing an automation user interface 1504 and allowing the user to publish services to the vehicle, and/or to subscribe to services available on the vehicle. Without limitation, a service may include a task, workflow, and/or automated vehicle response activity, for example providing a selected actuator response, an automated operation, a data collection operation, or the like.

The example controller 3402 includes a storage manager circuit 3404 that selectively accesses a data store, and that is configured to selectively read data, write data, or edit data on the data store. The example data store may be on-vehicle, off-vehicle, or a combination. The example controller 3402 includes a storage gatekeeper circuit 3406 that interprets a data storage request value 3410 (e.g., from a flow, vehicle function, application, and/or end point), and provides a data storage profile 3418 in response to the data storage request value 3410. For example, the data storage profile 3418 may indicate a reserved amount of memory, and/or a physical location of the memory (e.g., where a shared memory store is distributed across multiple physical devices). The determination of the data storage profile 3418 may be based upon one or more of a priority associated with a requestor of the data storage request value 310, a priority of a supported flow, vehicle function, and/or end point by the requestor, and/or according to available storage on the system. The example storage manager circuit 3404 further performs reserving memory on the data store, and/or saving requestor associated data on the data store in response to the data storage profile 3418.

An example vehicle data storage requestor includes at least one of: an end point on a network zone of a vehicle; a flow associated with a vehicle; an application associated with a vehicle; or a vehicle controller positioned on a vehicle. An example data store includes a shared data store positioned on a controller of a vehicle, for example a single consolidated large memory, and/or a distributed data store that is collectively treated by the storage manager circuit 3404 as the shared data store. An example data store includes a shared data store positioned at least partially off the vehicle, which may be utilized for long-term data storage, low access frequency data storage, and/or to preserve data that would otherwise be lost due to operations related to aging data and/or limited available on-vehicle storage. An example data store is configured as a file system based shared storage, for example where stored data 3408 is stored in files (e.g., delimited files, XML files, and/or files stored in a database configured data file). An example storage gatekeeper circuit 3406 publishes available data storage as a service 3412 on a vehicle.

An example storage gatekeeper circuit 3406 publishes data storage access as a service 3414 on a vehicle, and potentially to an automated user interface 1504, and interprets the data storage request value 3410 in response to a subscription request 3416 for the data storage access (e.g., where the data storage is provided as a service, where data storage is obtained by appropriately subscribing to the data storage surface).

An example storage gatekeeper circuit 3406 provides the data storage profile 3418 in response to a permissions value associated with the vehicle data storage requestor (e.g., a permissions value associated with a requesting flow, application, vehicle function, and/or end point). An example data storage profile 3418 further includes a parameter such as: a data storage amount; a data storage priority; and/or a data storage retention description. An example data store is configured, at least in part, as an object store. An example data store is configured, at least in part, as a relational database. An example data store is configured, at least in part, as a key-value store.

An example storage gatekeeper circuit 3406 further publishes stored data 3408 on the data store as a service on a vehicle, and/or to an automated user interface 1504. The example of FIG. 34 allows the storage gatekeeper circuit 3406 to provide data storage as a service, and/or to provide collected data, stored on the data store, as a service. The example storage gatekeeper circuit 3406 controls access to data storage, and/or to the stored data, utilizing permissions associated with a requestor to regulate the data storage profile 3418, a data access profile 3420, and/or regulating approval to published services in response to the permissions. In certain embodiments, a published service may be regulated by allowing or disallowing a subscription to the published service, and/or by allowing or disallowing visibility of the published subscription based on permissions of the requestor or a prospective requestor (e.g., where the request cannot be made by an entity that does not have visibility).

Figure 35:
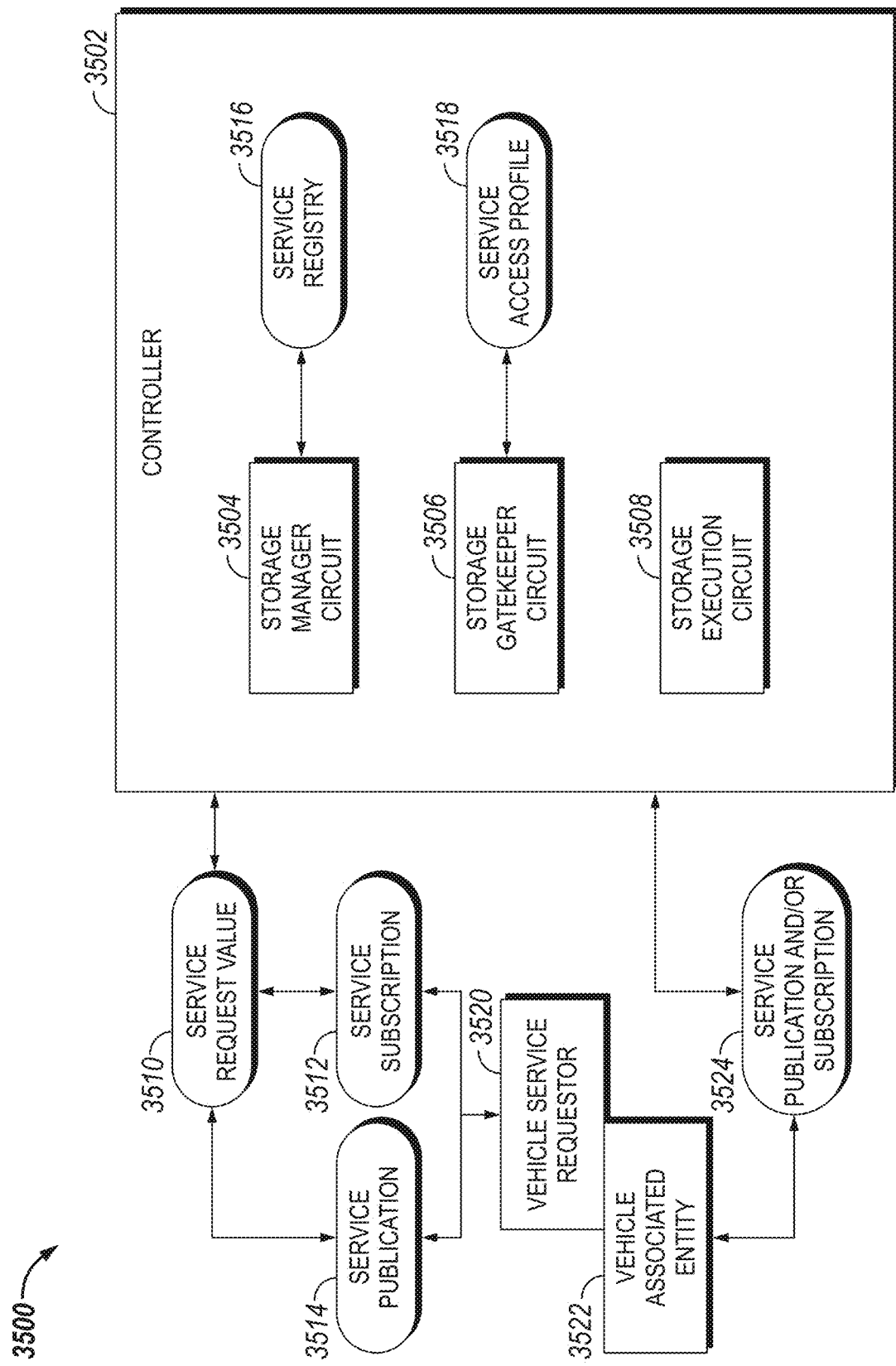
FIG. 35 is a schematic diagram of an example controller configured to manage a service oriented architecture according to certain embodiments of the present disclosure.

Referencing FIG. 35, an example apparatus 3500 includes a controller 3502 configured to manage a service oriented architecture to support tasks, workflows, automated vehicle response activities, and the like. The example controller 3502 includes a service manager circuit 3504 that maintains a service registry 3516 including a listing of vehicle associated entities 3522 (e.g., a vehicle function, flow, application, and/or end point, and which may include off-vehicle entities such as a user interacting with an automated user interface 1504). The example controller 3502 includes a service gatekeeper circuit 3506 that interprets a service request value 3510 from a vehicle service requestor 3520 (and/or certain off-vehicle requestors having sufficient permissions), and provides a service access profile 3518 in response to the service request value 3510. An example service access profile 3518 includes a permission to access a service, and/or a permission to publish a service, for example utilized by the service manager circuit 3504 to update the service registry 3516 accordingly. The example controller 3502 includes a service execution circuit 3508 that allows a service publication 3514 and/or a service subscription 3512, for example in response to the service request value 3510 and the service registry 3516.

An example service description, for example on the service registry 3516, includes a vehicle function (e.g., an actuator, task, workflow, or the like) controllable by the service. An example service description includes vehicle data values provided by one or more end points on one or more network zones of the vehicle. An example service description includes vehicle data values provided by multiple end points, and distributed across at least two network zones of the vehicle. In certain embodiments, the at least two network zones include distinct network protocols, and/or distinct network types. An example service description includes vehicle data values provided, at least in part, by an off-vehicle end point. An example service description includes a vehicle related function performed, at least in part, by an off-vehicle end point. For example, some of the data may be determined off-vehicle, and/or certain vehicle related operations may performed off-vehicle, for example longer cycle incremental improvement operations, operations for certain virtual sensors and/or determination of state parameters for the vehicle, and/or determination of parameters that rely, at least in part, on off-vehicle data (e.g., fuel costs, traffic information, weather information, geography-based and/or jurisdiction-based rules, regulations, preferences, or the like.

The descriptions following depict various example procedures for performing operations to create and implement vehicle automated response activities. The example procedures may be performed utilizing any controllers, circuits, components, managers, engines, or the like as set forth throughout the present disclosure. The example procedures are non-limiting examples, and may be utilized in whole or part in certain embodiments. Operations of the example procedures may be omitted, combined in whole or part, and/or re-ordered in whole or part, as will be evident in view of the disclosure herein.

Figure 36:
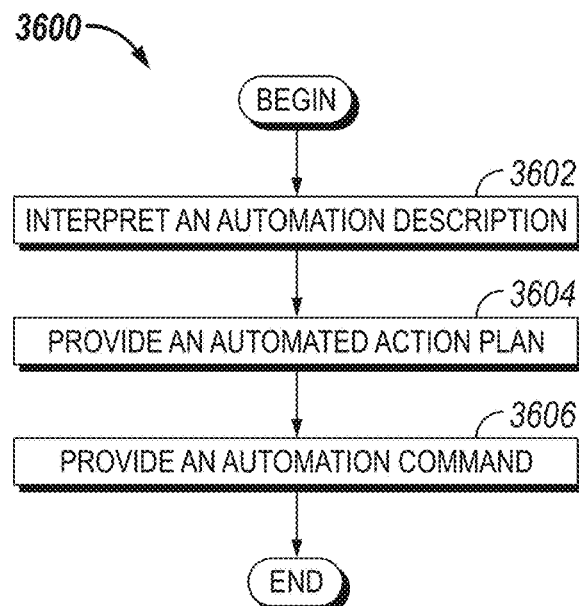
FIG. 36 is a schematic flow diagram according to certain embodiments of the present disclosure.

Referencing FIG. 36, an example procedure 3600 for providing an automation command is schematically depicted. The example procedure 3600 includes an operation 3602 to interpret an automation command, an operation 3604 to provide an automated action plan in response to the automation command, and an operation 3606 to provide an automation command in response to the automated action plan.

Figure 37:
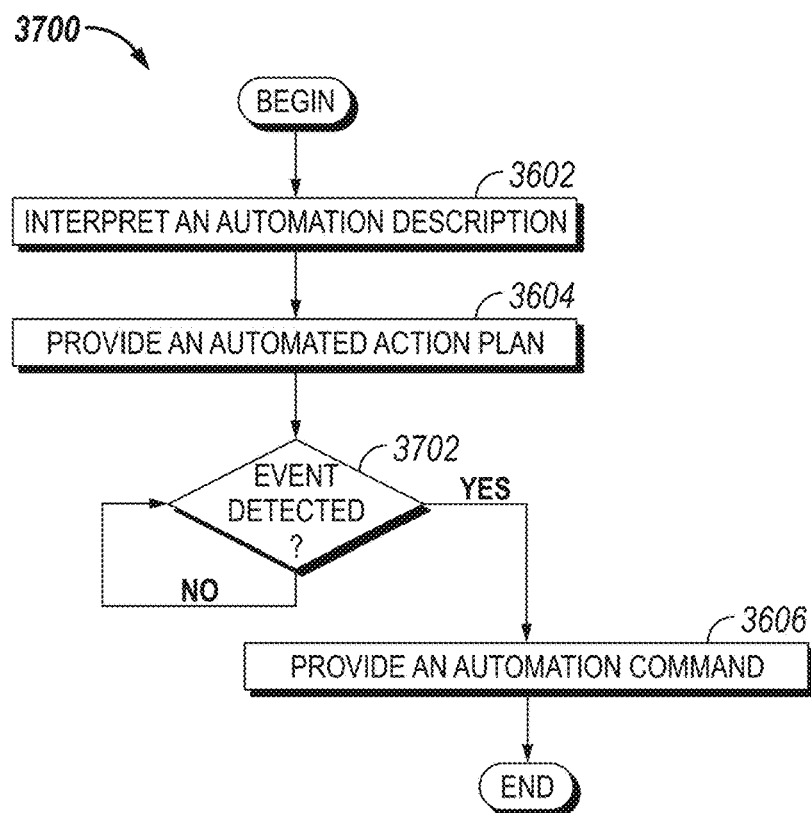
FIG. 37 is a schematic flow diagram according to certain embodiments of the present disclosure.

Referencing FIG. 37, an example procedure 3700 for procedure 3700 for providing an automation command is schematically depicted. The example procedure 370 includes the operation 3602 and the operation 3604, and further includes an operation 3702 to determine whether an event has been detected. In response to operation 3702 indicating YES, the example procedure 3700 includes the operation 3606 to provide the automation command. In response to operation 3702 indicating NO, the example procedure 3700 continues operation 3702 (e.g., monitoring for the detection of the event).

Figure 38:
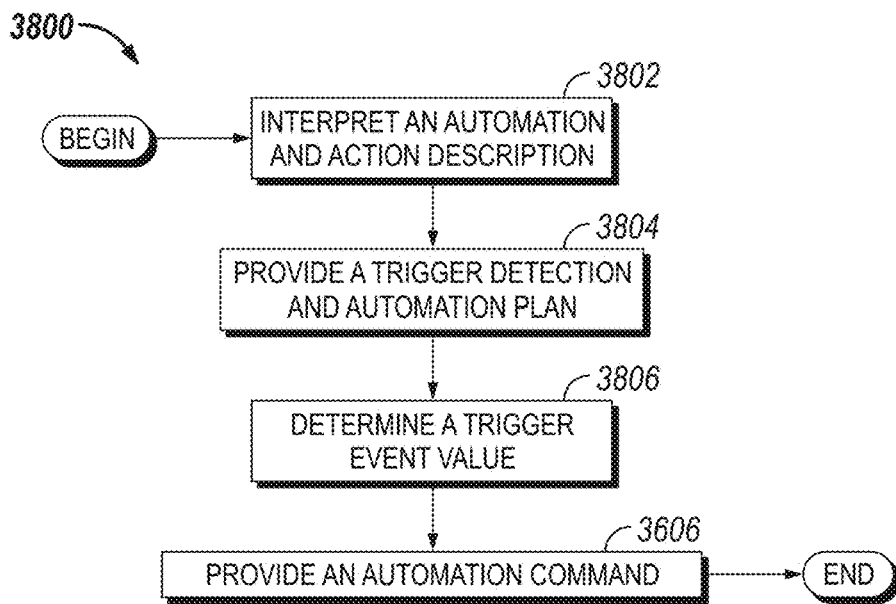
FIG. 38 is a schematic flow diagram according to certain embodiments of the present disclosure.

Referencing FIG. 38, an example procedure 3800 to provide an automation command is schematically depicted. The example procedure 3800 includes an operation 3802 to interpret an automation description and an action description, where the automation description may further include a trigger description. The example procedure 3800 includes an operation 3804 to provide a trigger detection plan and an automation plan in response to the automation description (and/or trigger description) and the action description. The example procedure 3800 includes an operation 3806 to determine a trigger event value, and an operation 3606 to provide an automation command in response to the trigger event value.

Figure 39:
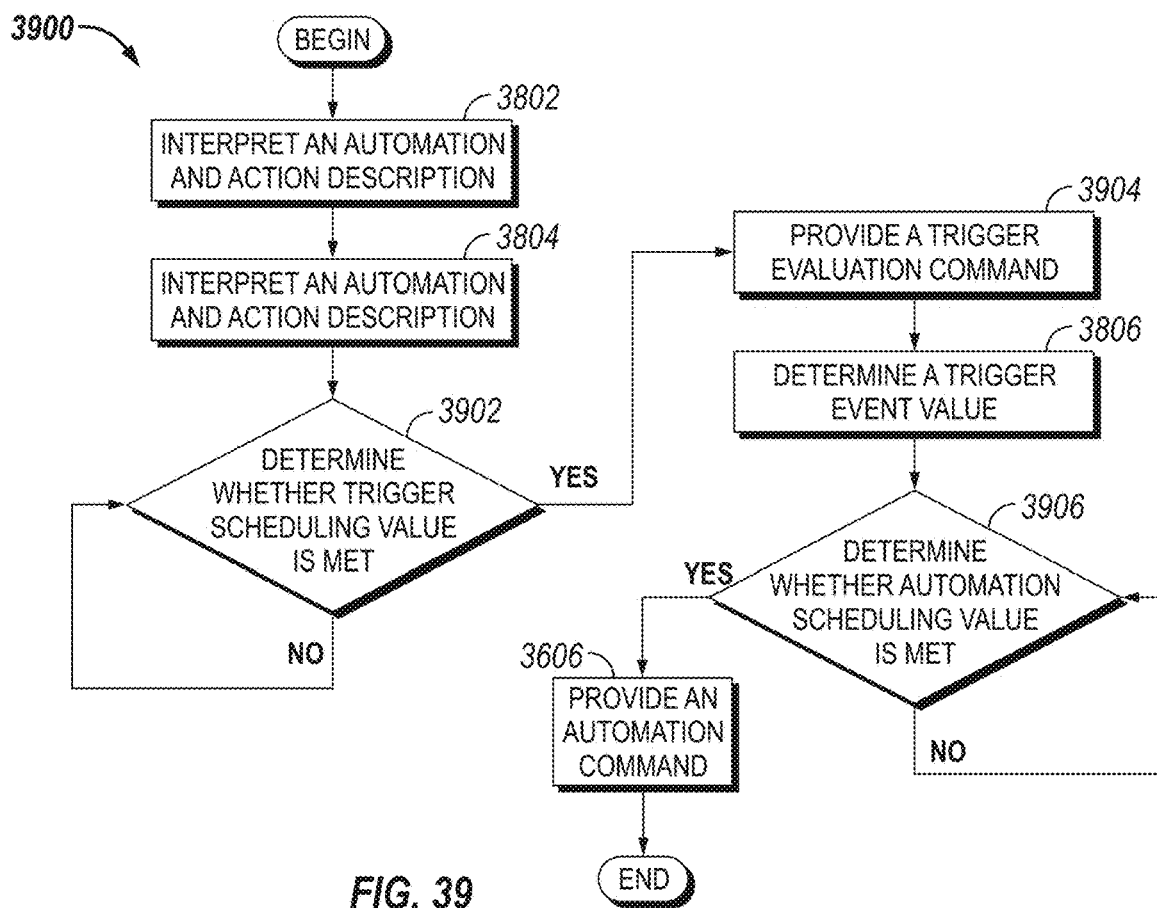
FIG. 39 is a schematic flow diagram according to certain embodiments of the present disclosure.

Referencing FIG. 39, an example procedure 3900 to provide an automation command is schematically depicted. The example procedure 3900 includes the operation 3802 and operation 3804, and further includes an operation 3902 to determine whether a trigger scheduling value is met. In response to operation 3902 indicating YES, the procedure 3900 includes an operation 3904 to provide a trigger evaluation command, operation 3806 to determine a trigger event value, and an operation 3906 to determine whether an automation scheduling value is met (e.g., where a delay period is applied after the trigger event before the automated operations are performed). In response to operation 3906 indicating YES, the procedure 3900 includes an operation 3906 to provide an automation command. In response to operation 3902 indicating NO, the example procedure 3900 continues operation 3902 (e.g., continuing to monitor against the trigger scheduling value). In response to operation 3906 indicating NO, the example procedure 3900 continues operation 3906 (e.g., continuing to monitor against the automation scheduling value).

Figure 40:
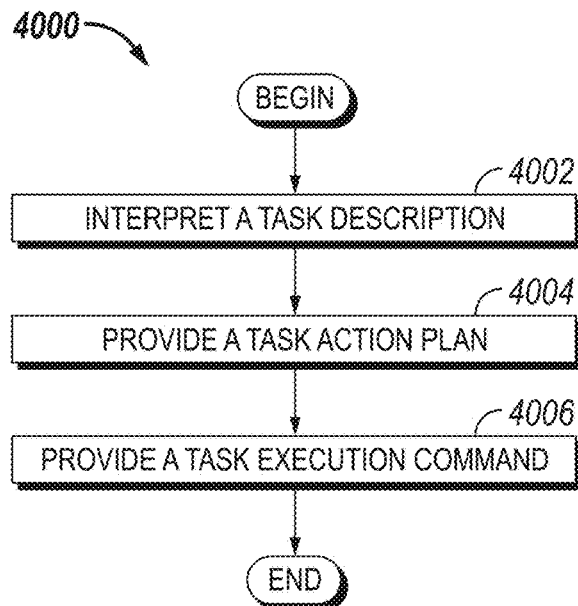
FIG. 40 is a schematic flow diagram according to certain embodiments of the present disclosure.

Referencing FIG. 40, an example procedure 4000 to provide a task execution command is schematically depicted. The example procedure 4000 includes an operation 4002 to interpret a task description, an operation 4004 to provide a task action plan in response to the task description, and an operation 4006 to provide a task execution command in response to the task action plan.

Figure 41:
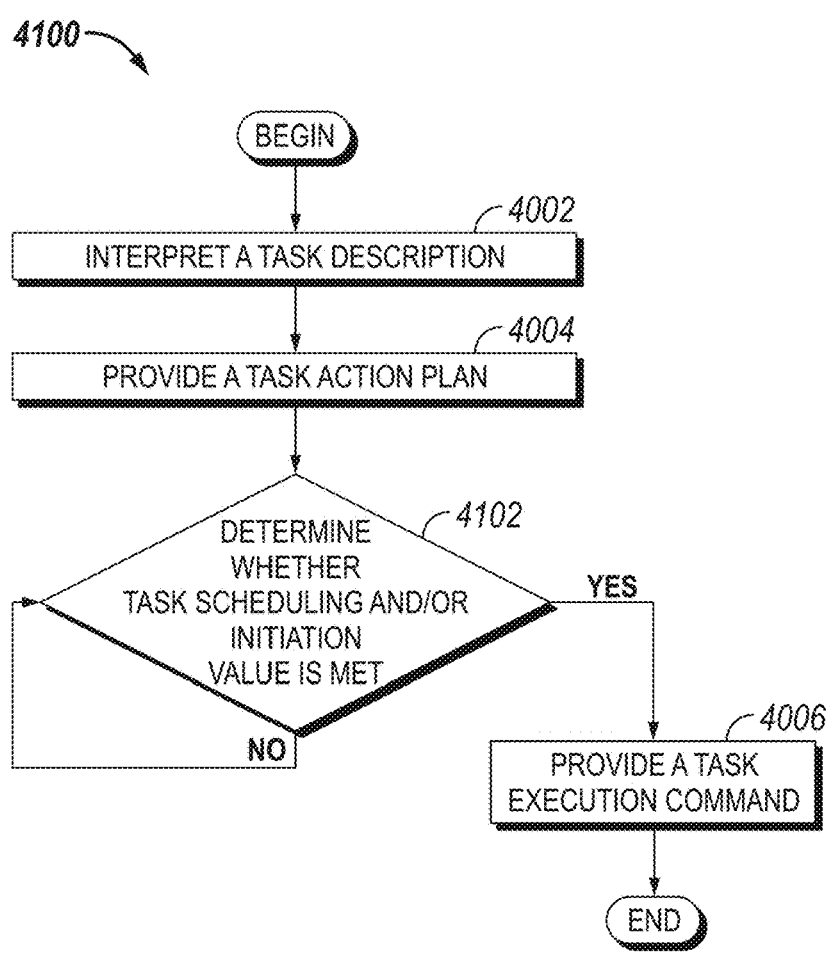
FIG. 41 is a schematic flow diagram according to certain embodiments of the present disclosure.

Referencing FIG. 41, an example procedure 4100 for providing a task execution command is schematically depicted. The example procedure 4100 includes the operation 4002 and operation 4004, and further includes operation 4102 to determine whether a task scheduling value and/or a task initiation value is met. In response to operation 4102 indicating YES, the example procedure 4100 includes operation 4006 to provide the task execution command. In response to operation 4102 indicating NO, the example procedure continues operation 4102 (e.g., continuing to monitor against the task scheduling value, and/or whether the task initiation value is met).

Figure 42:
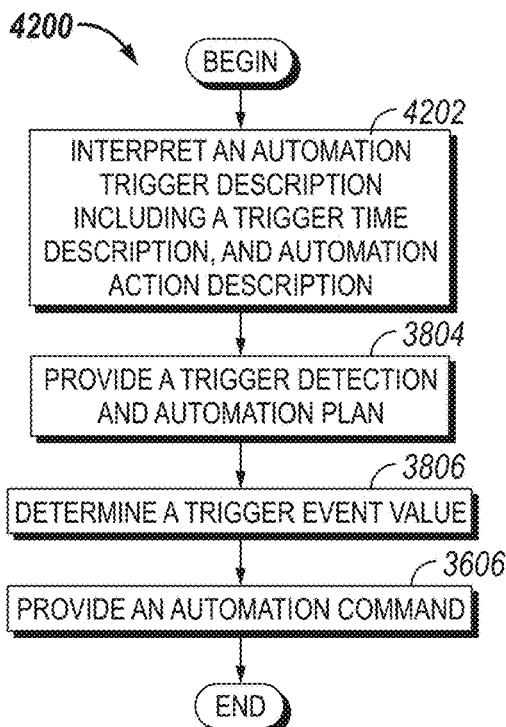
FIG. 42 is a schematic flow diagram according to certain embodiments of the present disclosure.

Referencing FIG. 42, an example procedure 4200 to provide an automation command is schematically depicted. The example procedure 4200 includes an operation 4202 to interpret an automation trigger description including a trigger time description, and an automation action description. The example procedure further includes the operation 3804 to provide a trigger detection plan and an automation plan, operation 3806 to determine a trigger event value, and the operation 3606 to provide an automation command.

Figure 43:
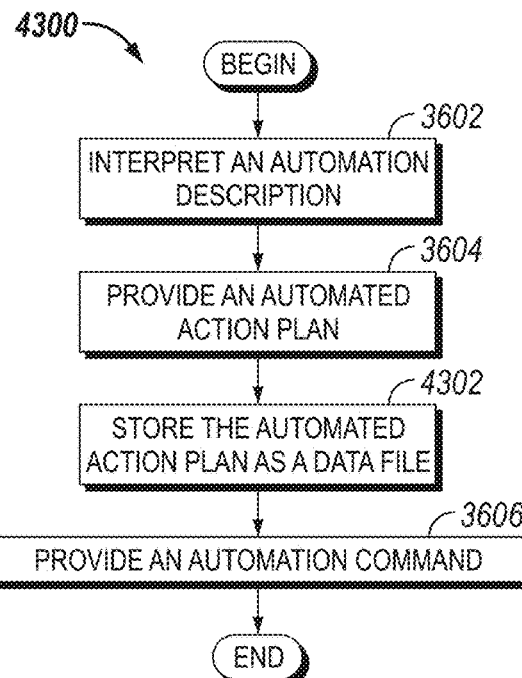
FIG. 43 is a schematic flow diagram according to certain embodiments of the present disclosure.

Referencing FIG. 43, an example procedure 4300 to provide an automation command is schematically depicted. The example procedure 4300 is similar to procedure 3600, 3800, and/or 4200. The example procedure 4300 further includes operation 4302 to store the automated action plan as a data file (e.g., providing an automated vehicle function that is parsed and/or implemented, without changing base software, firmware, or the like on a vehicle controller).

Figure 44:
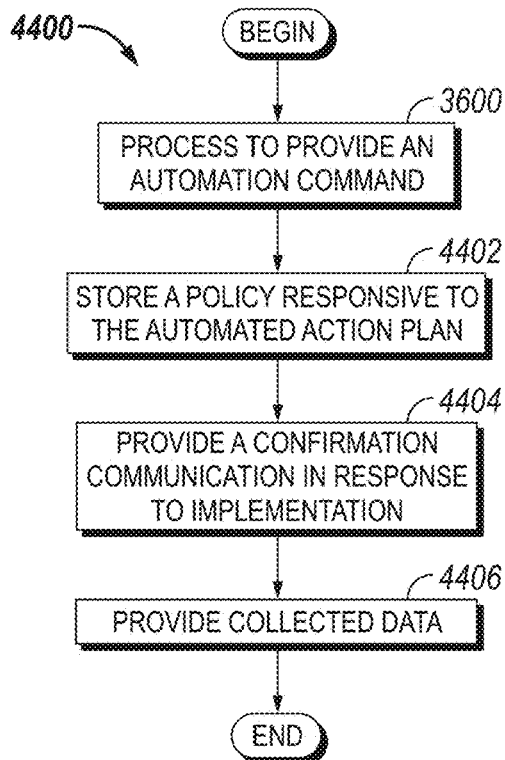
FIG. 44 is a schematic flow diagram according to certain embodiments of the present disclosure.

Referencing FIG. 44, an example procedure 4400 to provide confirmation of an automated vehicle operation, and/or to provide collected data associated with the automated vehicle operation, is schematically depicted. The example procedure 4400 includes a process to provide an automation command, for example and without limitation procedure 3600. The example procedure 4400 includes an operation 4402 to store a policy responsive to the automated action plan (e.g., an updated policy, a dedicated policy for the automated action plan, and/or a new policy including the automated action plan as at least a portion thereof). The example procedure 4400 further includes an operation 4404 to provide a confirmation communication in response to implementation of the policy (e.g., confirming that the policy includes the automation plan, that the automation plan can be executed, and/or that the automation plan has been executed). The example procedure 4400 optionally includes an operation 4406 to provide collected data associated with the automation plan.

Figure 45:
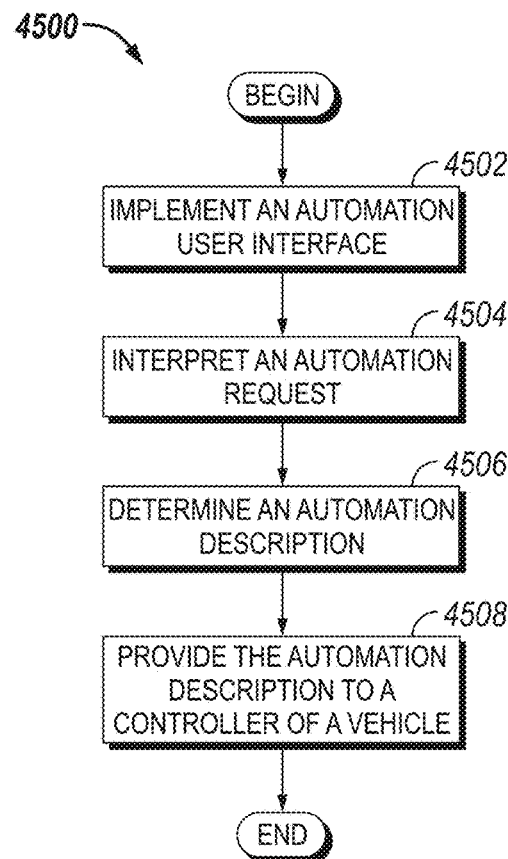
FIG. 45 is a schematic flow diagram according to certain embodiments of the present disclosure.

Referencing FIG. 45, an example procedure 4500 includes an operation 4502 to implement an automation user interface, an operation 4504 to interpret an automation request (e.g., a code block, data structure block, selected recipe, selected workflow, modified recipe, modified workflow, and/or interactively created automation description), an operation 4506 to determine an automation description 4506 in response to the automation request, and an operation 4508 to provide the automation description to a controller of a vehicle.

Figure 46:
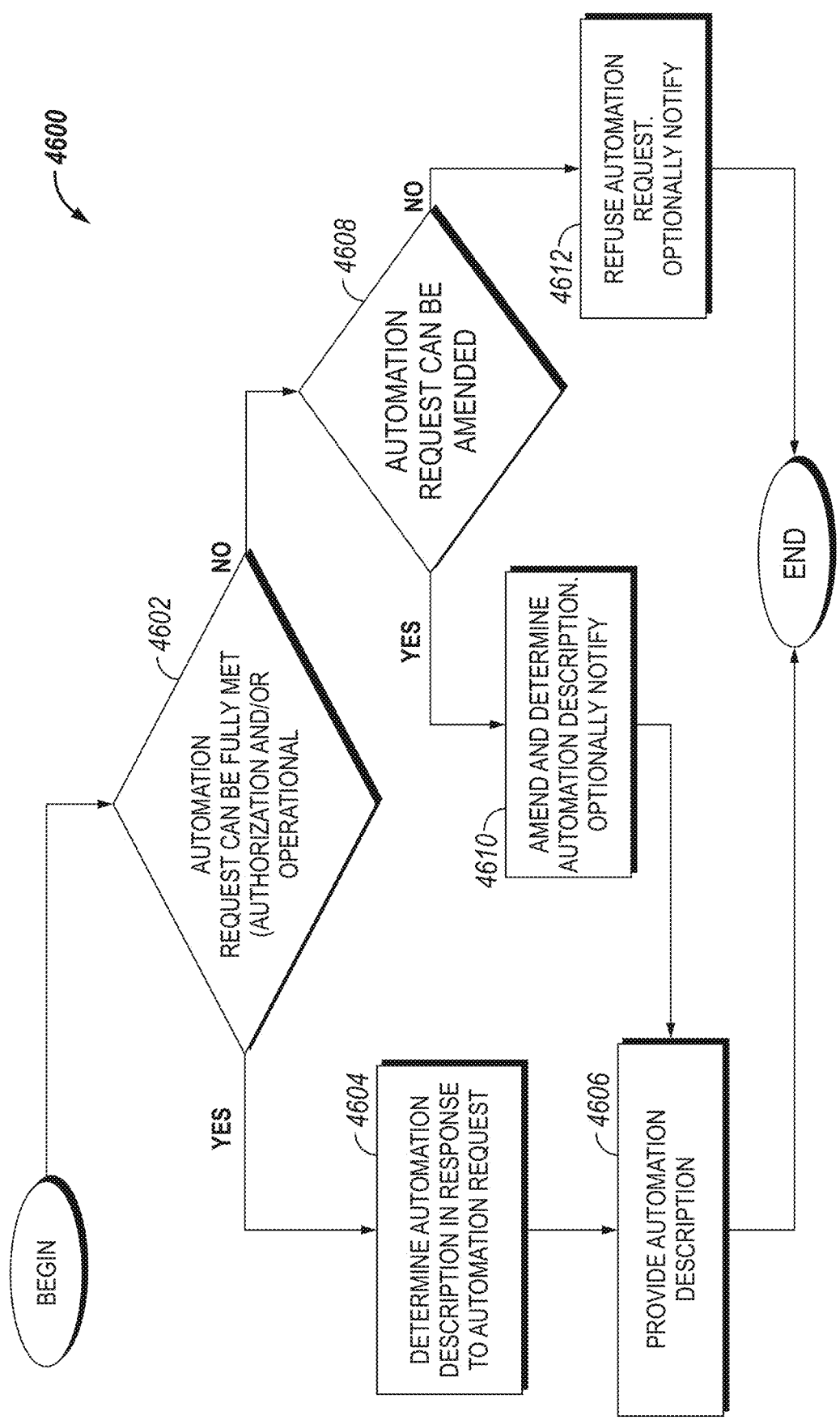
FIG. 46 is a schematic flow diagram according to certain embodiments of the present disclosure.

Referencing FIG. 46, an example procedure 4600 to selectively provide an automation description to a vehicle controller and/or to an automation definition circuit is schematically depicted. The example procedure 4600 includes an operation 4602 to determine whether an automation request can be fulfilled (e.g., if the requestor has authorization to implement the automation request, and/or whether the vehicle is capable to implement the automation request—for example due to resource limitations such as processing, network communication, and/or data storage, and/or due to operational limitations such as the unavailability of requested data, features, actuators, etc.). In response to operation 4602 indicating YES, the example procedure 4600 includes an operation 4604 to determine an automation description in response to the automation request, and an operation 4606 to provide the automation description. In response to operation 4602 indicating NO, the example procedure 4600 includes an operation 4608 to determine whether the automation request can be amended (e.g., whether the requestor allows an amendment, whether amended operations are available, such as a subset of operations, closely related or similar operations are available, and/or whether the priority of the automation request allows an amendment to be made). In response to operation 4608 indicating YES, the example procedure 4600 includes an operation 4610 to amend the automation request and determine the automation description in response to the amended automation request. Operation 4610 may optionally include providing a notification related to the amendment, for example to the requestor or to another entity such as a recipient or beneficiary of the automated operations. In response to operation 4608 determining NO, the example procedure 4600 includes an operation 4612 to refuse (or reject) the automation request—for example where no automation description will be provided based on the automation request. The example operation 4612 optionally includes providing a notification related to the refusal, for example to the requestor or to another entity such as a recipient or beneficiary of the automated operation, and/or an administrator of an automated user interface, a vehicle manufacturer, a security person, or the like.

Figure 47:
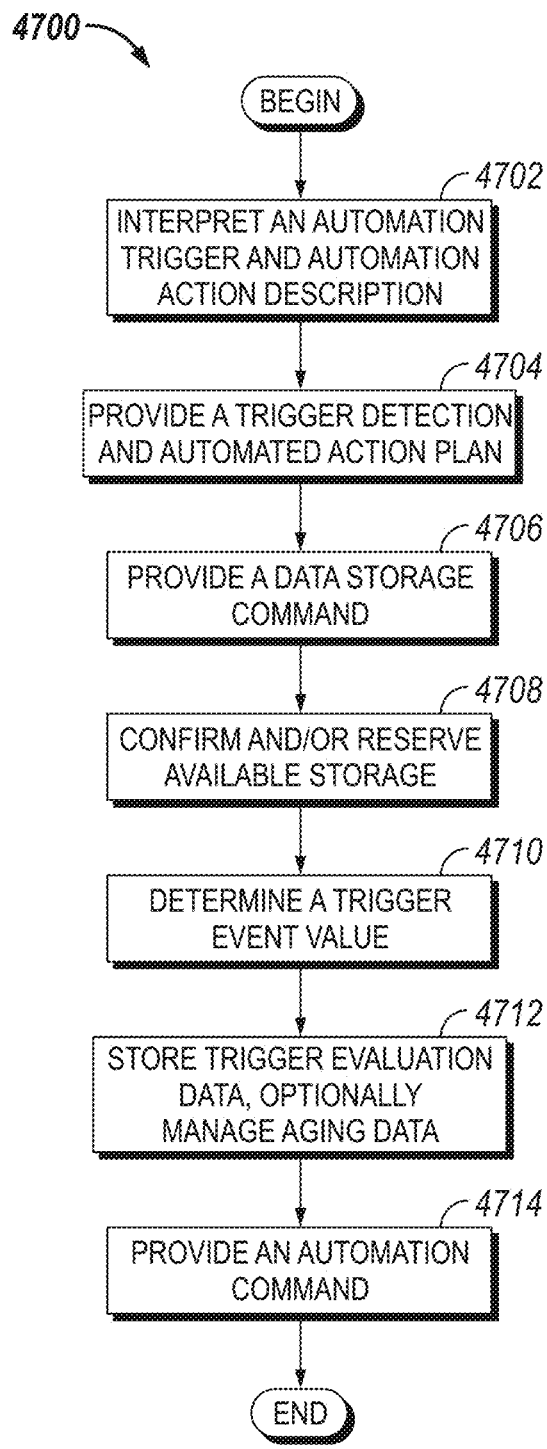
FIG. 47 is a schematic flow diagram according to certain embodiments of the present disclosure.
Figure 48:
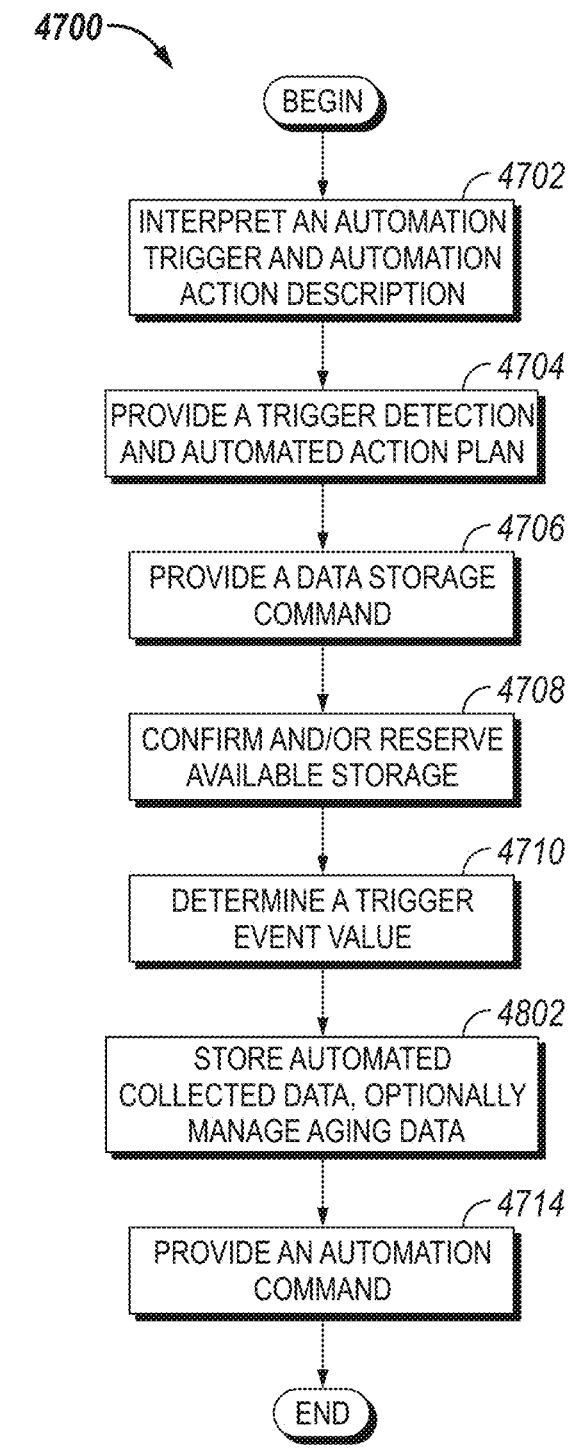
FIG. 48 is a schematic flow diagram according to certain embodiments of the present disclosure.

Referencing FIG. 47, an example procedure 4700 to provide an automation command is schematically depicted. The example procedure 4700 includes an operation 4702 to interpret an automation trigger description and/or an automation action description, an operation 4704 to provide a trigger detection plan and/or an automated action plan in response to the description(s), an operation 4706 to provide a data storage command in response to the plan(s), and operation 4708 to confirm and/or reserve available data storage in response to the data storage command (e.g., to support trigger evaluations, event detections, and/or to support data collection operations of the automated operation described in the automated action plan). The example procedure 4700 further includes an operation 4710 to determine a trigger event value, and an operation 4712 to store trigger evaluation data. The example operation 4712 may optionally include managing aging data of the stored trigger evaluation data. The example procedure 4700 further includes an operation 4714 to provide an automation command, for example in response to the plan(s). Referencing FIG. 48, an example procedure 4800 is schematically depicted. In the example of FIG. 48, the data storage command may additionally or alternatively include data storage sufficient to support data collected as a part of the automated action plan, where the procedure 4800 further includes an operation 4802 to store the automated collected data. The operation 4802 optionally includes managing aging data of the automated collected data.

Figure 49:
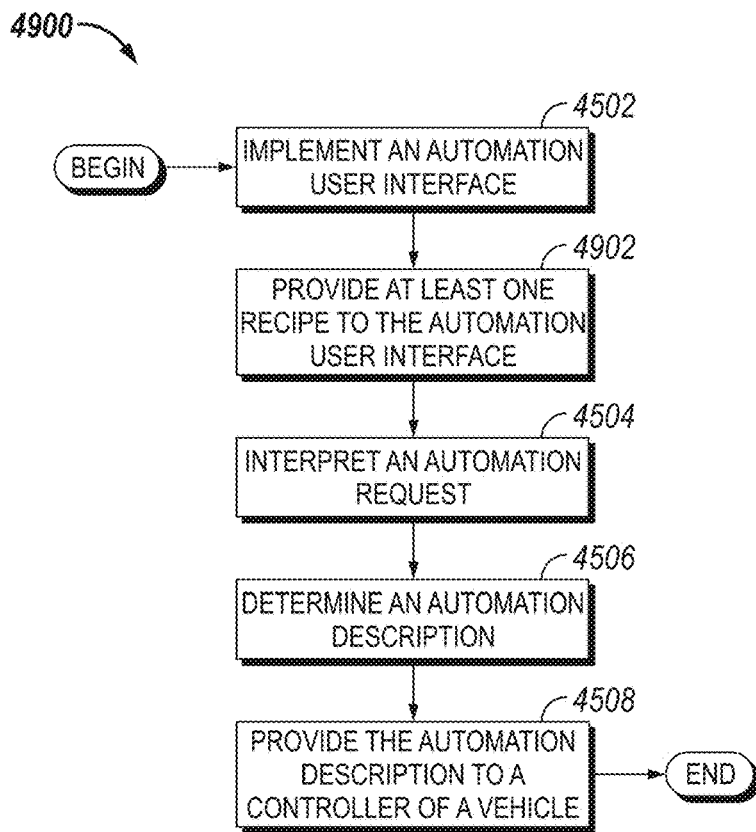
FIG. 49 is a schematic flow diagram according to certain embodiments of the present disclosure.

Referencing FIG. 49, an example procedure 4900 includes an operation 4502 to implement an automation user interface, an operation 4902 to provide at least one recipe to the automation user interface, and an operation 4504 to interpret an automation request (e.g., as a selected one and/or modified one of the recipe(s) provided to the automation user interface). The example procedure 4900 further includes an operation 4506 to determine an automation description in response to the automation request, and an operation 4508 to provide the automation description to a controller of a vehicle.

Figure 50:
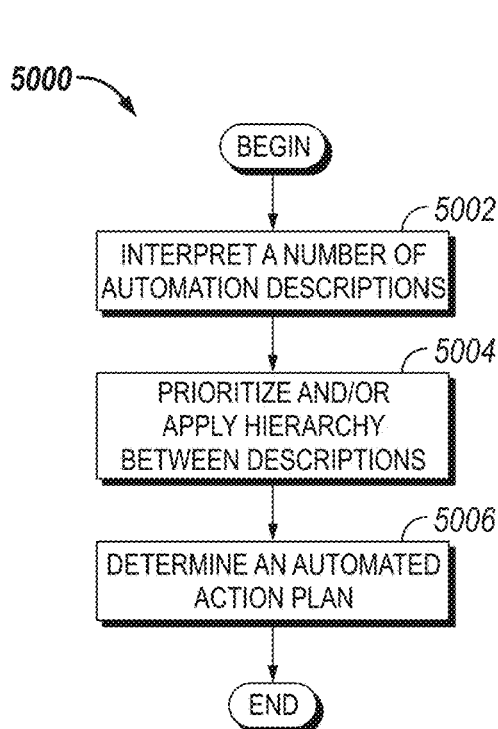
FIG. 50 is a schematic flow diagram according to certain embodiments of the present disclosure.

Referencing FIG. 50, an example procedure 5000 includes an operation 5002 to interpret a number of automation descriptions, an operation 5004 to prioritize and/or apply a hierarchy between the number of automation descriptions, and an operation 5006 to determine an automated action plan in response to the prioritized and/or hierarchical automation descriptions.

Figure 51:
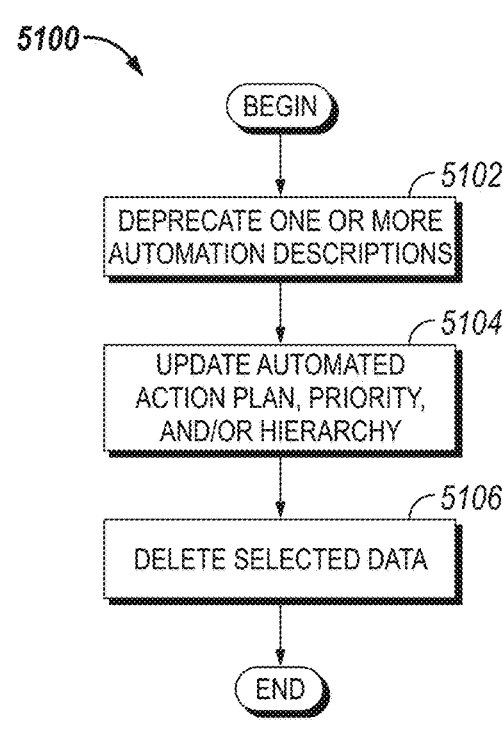
FIG. 51 is a schematic flow diagram according to certain embodiments of the present disclosure.

Referencing FIG. 51, an example procedure 5100 includes an operation 5102 to deprecate at least one automation description (e.g., automation descriptions that have expired, that have already been completed or performed, that have no relevant scheduled actions or trigger conditions available, that no longer have a sufficient priority to be kept, that have been requested for removal such as by the requestor, and/or that can no longer be performed, for example due to a resource limitation, expiration of an authorization, or the like). The example procedure 5100 includes an operation 5104 to update an automated action plan, and/or a priority or hierarchy of the automated action plan, in response to the operation 5102 to deprecate the automated action plan. The example procedure 5106 further includes an operation 5106 to delete selected data in response to the updates of operation 5104, for example deleting data that is no longer needed, deleting data due to a reduced priority of the automation description, or the like.

Figure 52:
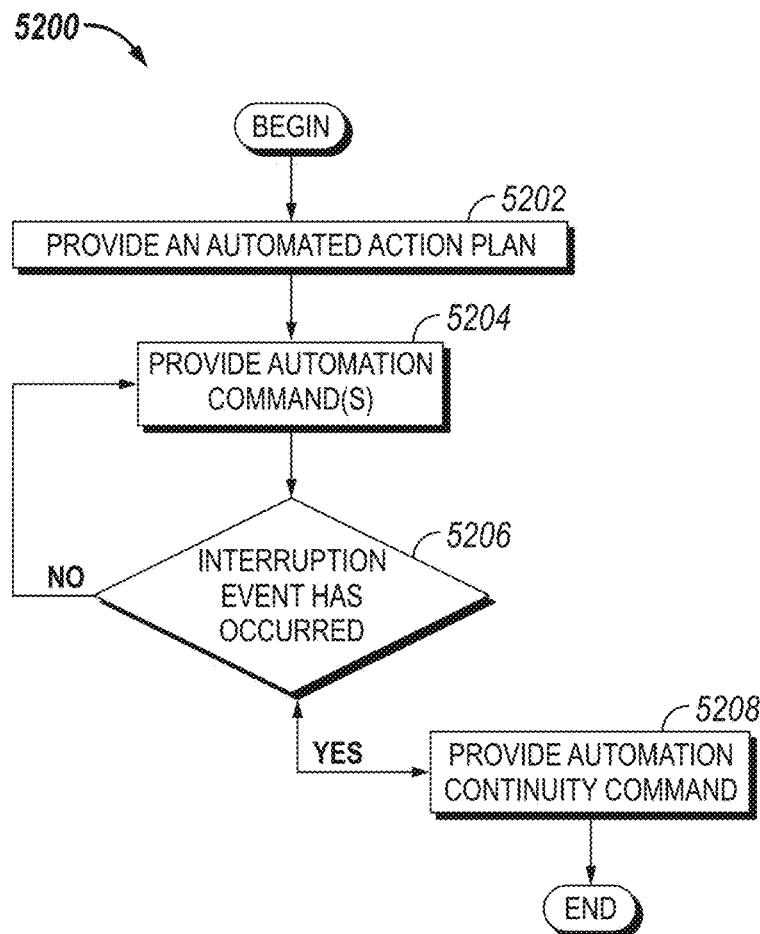
FIG. 52 is a schematic flow diagram according to certain embodiments of the present disclosure.

Referencing FIG. 52, an example procedure 5200 includes an operation 5202 to provide an automated action plan, an operation 5204 to provide automation commands in response to the automated action plan. The example procedure 5200 includes an operation 5206 to determine whether an interruption event of automated operations has occurred. In response to operation 5206 indicating YES, the procedure 5200 includes an operation 5208 to provide an automation continuity command, for example to continue, discontinue, pause, resume, perform data clean-up operations, or the like. In response to operation 5206 determining NO, the example procedure 5200 continues operation 5206 (e.g., continuing to monitor the automated operations for an interruption event).

Figure 53:
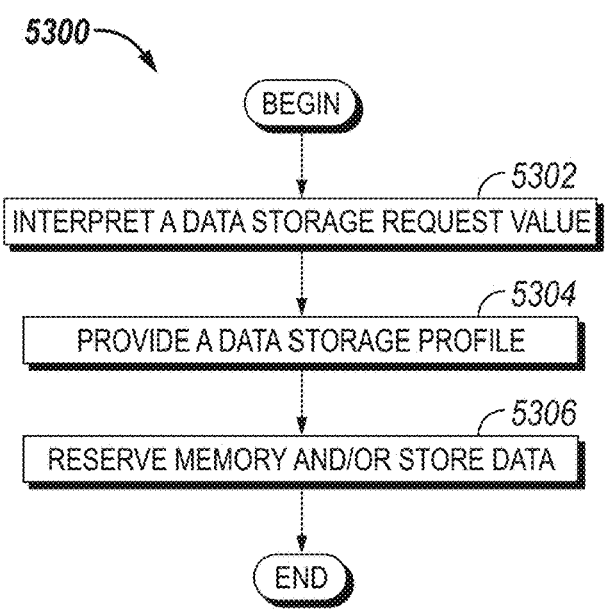
FIG. 53 is a schematic flow diagram according to certain embodiments of the present disclosure.

Referencing FIG. 53, an example procedure 5300 includes an operation 5302 to interpret a data storage request value, an operation 5304 to provide a data storage profile in response to the data storage request value, and an operation 5306 to reserve memory, confirm memory storage, and/or store data (e.g., trigger evaluation data, automated collected data, and/or other associated data with an automated vehicle response) in response to the data storage profile.

Figure 54:
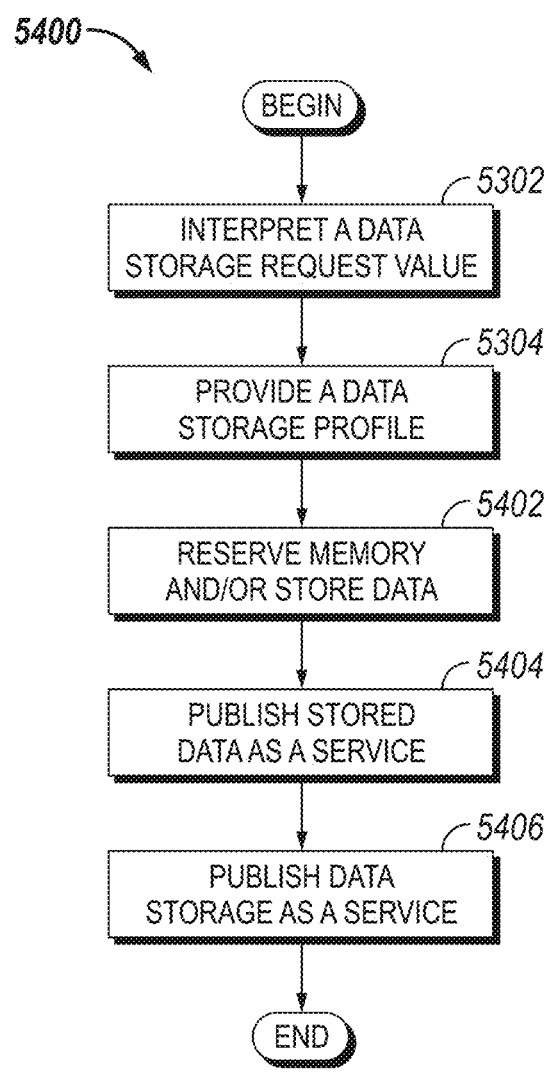
FIG. 54 is a schematic flow diagram according to certain embodiments of the present disclosure.

Referencing FIG. 54, an example procedure 5400 includes operation 5302 and operation 5304, and further includes an operation 5402 to reserve memory and/or store data in response to the data storage profile. The example procedure 5400 further includes an operation 5404 to publish the stored data as a service, and/or an operation 5406 to publish available data storage as a service.

Figure 55:
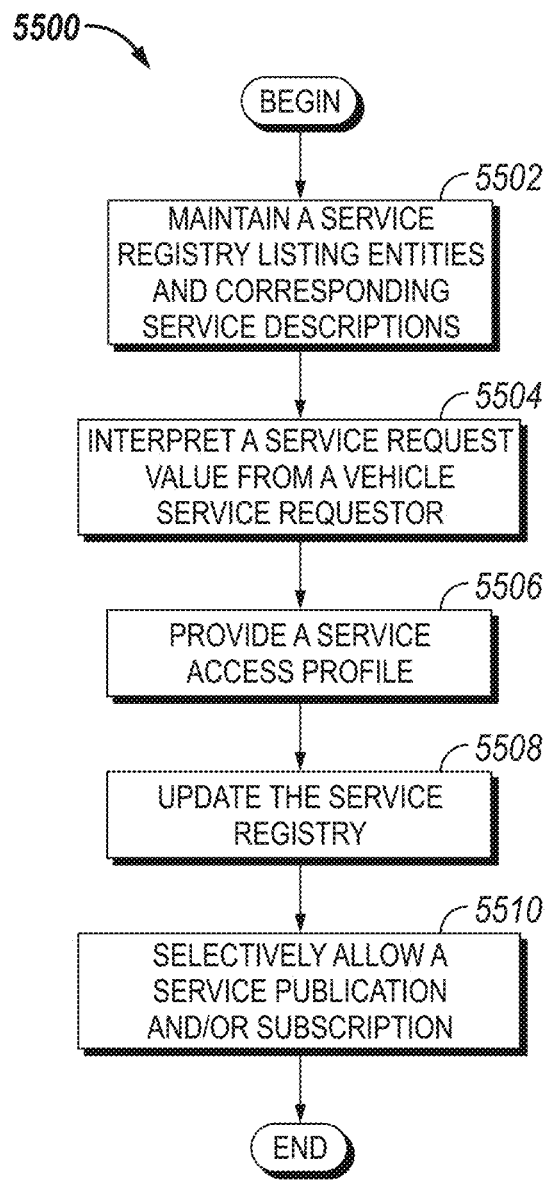
FIG. 55 is a schematic flow diagram according to certain embodiments of the present disclosure.

Referencing FIG. 55, an example procedure 5500 includes an operation 5502 to maintain a service registry (e.g., listing entities such as end points, controllers, flows, applications, etc., and corresponding service(s) for the listed entities), and an operation 5504 to interpret a service request value from a vehicle service requestor (e.g., a requesting end point, flow, application, controller, etc.). The example procedure 5500 includes an operation 5506 to provide a service access profile, an operation 5508 to update the service registry in response to the service access profile, and an operation 5510 to selectively allow a service publication (e.g., allow an entity to publish a service) and/or a service subscription (e.g., allow an entity to subscribe to a service) in response to the updated service registry.

An example embodiment includes a cloud-side executed vehicle automation manager, which can be utilized to create, delete, and/or query vehicle automation descriptions, such as a recipe, automation description, workflow, or the like. The example cloud-side executed vehicle automation manager may be embodied in any controllers, circuits, components, managers, engines, or the like as set forth throughout the present disclosure. In certain embodiments, a vehicle automation description may be stored in a data store accessible to a cloud server, and selectively sent to the vehicle for execution. In certain embodiments, a single vehicle automation description may be active on the vehicle at a given time, although embodiments support multiple vehicle automation descriptions at a given time, and/or multiple automated functions contained within a vehicle automation description. In certain embodiments, the cloud-side executed vehicle automation manager is configured to receive reports about the status, execution, and/or results of vehicle automated response activity. An example cloud-side executed vehicle automation manager provides a function, for example implemented on an automation user interface, to allow for querying of deployments of vehicle automation descriptions on vehicles associated with the cloud server, for example including time values (e.g., related to communicating vehicle automation descriptions to vehicles, time of execution, time of removal, etc.), content of the vehicle automation descriptions, and vehicle details to allow for identification of the associated vehicles. In certain embodiments, the cloud-side executed automation manager allows for the determination of vehicle automation description status and/or statistics, such as time frames, execution status, execution results, and the like, as well as identification of off-nominal cases (e.g., where vehicles have refused or not been able to intake and/or execute operations for the vehicle automation description). In certain embodiments, a cloud-side executed automation manager may be implemented on a mini-cloud device, for example a device in direct communication with the vehicle (e.g., a hard connection, such as an ethernet or CAN connection, and/or a wireless connection such as a WiFi connection or a Bluetooth connection), for example to provide cloud level capability when the vehicle is not capable, or it is not desirable, for the vehicle to communicate fully to the cloud. In certain embodiments, an external device embodying the mini-cloud device can selectively couple to the cloud server at a later time, syncing up information from the automation management operations performed with the vehicle.

The example embodiments herein provide for the ability to create, implement, get status information, verify, and/or troubleshoot automated operations for a vehicle, including by users that do not have vehicle specific information such as an understanding of the control algorithms, parameter names, network names and/or locations of end points, sensors, actuators, etc. on the vehicle. Automated operations for the vehicle, in certain embodiments, are organized into one or more workflows, each workflow having one or more tasks, and each task having one or more related actions. In certain embodiments, plans (and/or an automated description, and/or a recipe) as utilized herein include a number of workflows utilized to implement the plan. The nomenclature utilized to organize the automated operations are not limiting, but the example nomenclature is utilized for clarity to illustrate aspects of the present disclosure. An example organization includes the workflow having a schedule and/or associated trigger evaluation utilized to determine when the workflow should be commenced, which may be determined according to any aspects of the description, such as a time based determination, a determination based upon operating conditions (e.g., vehicle operating conditions and/or external operating conditions), a determination based upon a specific request (e.g., by an operator, user of an automated user interface, service personnel, manufacturer, etc.), and/or a determination based upon a detected event. In the example organization, a number of tasks may be performed by the workflow, where some or all of the tasks may each have a schedule and/or associated trigger evaluation utilized to determine when each task should be commenced. In certain embodiments, multiple tasks may be evaluated against a schedule and/or associated trigger simultaneously (e.g., checking multiple tasks simultaneously to determine whether a given task is ready to commence execution). The example organization includes each task having a number of actions, for example specific operations such as the movement of an actuator, collection and/or interpretation of a data element, providing a communication, or the like. The actions for a task may be scheduled, and may include actions performed in parallel, in serial, with looping or cycling operations, or the like. In certain embodiments, the actions of a given task are performed before another task is commenced, although in certain embodiments more than one task may be executed at the same time.

In a further example, the progression of a workflow at any level (e.g., task level, action level, and/or global workflow level) may be reported as a status value, for example as data collected and/or as trigger evaluation data, allowing for a user to confirm the progression and/or status of the workflow, to perform statistical analysis for the workflow (e.g., for the vehicle, and/or across a group of vehicles), and/or to troubleshoot the workflow, task, or action, for example to see where the workflow, task, or action had a problem, and/or to see what else was happening on the vehicle at the time of the problem and/or before the problem occurred. In certain embodiments, notifications may be provided for detected events, selected status values, and/or error values during the performance of a workflow, task, or action. In certain embodiments, detected events, selected status values, and/or error values may be utilized to trigger additional workflows or tasks, for example to collect relevant data, to determine effects of the problem on the vehicle or for a system including the vehicle, or the like. In certain embodiments, progression data about a workflow and/or task, status data, other operating condition data relevant to the workflow and/or task (e.g., before, during, or after) may be utilized for future development and/or iterative improvement, for example to make the implementation and/or execution of tasks or workflows more efficient, more effective, and/or to reduce undesirable side effects of the task and/or workflow.

As set forth throughout the present disclosure, data observed and/or collected in relation to a task or workflow, for example trigger evaluation data, event detection data, and/or directly utilized data (e.g., data utilized as a parameter for an action) may be data present on the vehicle, data external to the vehicle, and/or data created on the vehicle or externally (e.g., a virtual sensor, determined state value, etc.) to specifically support the task or workflow, and/or to support selected capability for the automation user interface (e.g., to give users a specific type of information for utilization in workflows, recipes, and/or automation descriptions). Additionally or alternatively, any action may be performed on the vehicle or may be performed off the vehicle (e.g., opening a door, interacting with a camera, sending a notification, etc.). Without limitation to any other aspect of the present disclosure, an action may be implemented by an automation command as set forth throughout the present disclosure.

In certain embodiments, the creation of a recipe, workflow, automation description, or the like, as set forth herein, further provides for the creation of constants and/or variables which may be utilized in workflows, tasks, actions, or other automated operations as set forth herein. In certain embodiments, constants and/or variables may be created in a manner similar to the inclusion of input parameters (e.g., reference FIG. 23 and the related description). In certain embodiments, the scope of a constant and/or variable may be selectable, for example making the constant and/or variable available to any workflow, available to any task within a workflow, and/or available to any action within a task. In certain embodiments, a variable may be any value that is capable to hold selectable values, and/or where a task, workflow, and/or action can write values to the variable. In certain embodiments, some tasks, actions, or workflows may have write access to a variable, where other tasks, actions, or workflows may have only read access to a given variable. In certain embodiments, a constant or variable may be determined from, or represent, a value related to the vehicle or an external data value that is also otherwise available on the vehicle (e.g., for convenience in developing the task, workflow, or action), or may be a value that is not related to a value already available on the vehicle or as an external data value (e.g., parameters that are utilized to implement the task, workflow, or action).

Without limitation to any other aspect of the present disclosure, a workflow, automation description, plan, or the like may be implemented at a file—for example a JSON file setting forth the operations of the workflow, automation description, or plan. In certain embodiments, other types of data structures may be utilized, such as an XML file, a script, or the like. In certain embodiments, the workflow, automation description, and/or plan may be created in a domain specific language, for example a proprietary language utilized to implement automated vehicle operations, for example a language created for convenient reading and understanding by the user, including for users that may not have sophisticated knowledge of programming operations, and/or to create an easily understandable environment for the user to understand the vehicle and/or the automated operations being created and/or implemented. Inn certain embodiments, the automated user interface may be configured to support graphical creation and/or modification of recipes, descriptions, plans, or the like.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system, comprising:
   a vehicle having a network comprising a plurality of end points;
   a controller, comprising:
   an automation definition circuit structured to interpret an automation trigger description and an automation action description;
   an automation management circuit structured to provide a trigger detection plan and an automated action plan in response to the automation trigger description and the automation action description; and
   an automation execution circuit structured to determine a trigger event value in response to the trigger detection plan, and to provide an automation command in response to the trigger event value and the automated action plan;
   wherein an end point of the plurality of end points is responsive to the automation command to implement an automated vehicle response.

2. The system of claim 1, further comprising:
   wherein the automation execution circuit is further structured to provide a trigger evaluation command in response to the trigger detection plan;
   wherein a second end point of the plurality of end points is responsive to the trigger evaluation command to provide a trigger evaluation value; and
   wherein the automation execution circuit is further structured to determine the trigger event value in response to the trigger evaluation value.

3. The system of claim 1, further comprising:
   wherein the automation execution circuit is further structured to provide a trigger evaluation command in response to the trigger detection plan;
   wherein the end point is responsive to the trigger evaluation command to provide a trigger evaluation value; and
   wherein the automation execution circuit is further structured to determine the trigger event value in response to the trigger evaluation value.

4. The system of claim 1, wherein the automation action description further comprises an automation scheduling value, and wherein the automation management circuit is further structured to provide the automated action plan in response to the automation scheduling value.

5. The system of claim 1, wherein the automation trigger description further comprises a trigger scheduling value, and wherein the automation management circuit is further structured to provide the automated trigger plan in response to the trigger scheduling value.

6. The system of claim 1, wherein the automated vehicle response comprises at least one of:
   an actuator command;
   an actuator activation; or
   an actuator trajectory.

7. The system of claim 1, wherein the automated vehicle response comprises at least one of:
   selectively enabling a feature of the vehicle;
   adjusting a calibration of a feature of the vehicle;
   adjusting a display of the vehicle;
   adjusting a lighting of the vehicle;
   adjusting an environmental management system of the vehicle;
   adjusting a sound system of the vehicle; or
   adjusting an operator control response of the vehicle.

8. The system of claim 1, wherein the automation action description comprises an action repeat value, and wherein the automation management circuit is further structured to provide the automated action plan in response to the action repeat value.

9. The system of claim 1, wherein the automation action description comprises an action interruption description, and wherein the automation management circuit is further structured to provide the automated action plan in response to the action interruption description.

* * * * *

UNITED STATES PATENT AND TRADEMARK OFFICE
CERTIFICATE OF CORRECTION

| | | |
|---|---|---|
| PATENT NO. | : 11,772,583 B2 | |
| APPLICATION NO. | : 18/093955 | |
| DATED | : October 3, 2023 | |
| INVENTOR(S) | : Fang et al. | |

It is certified that error appears in the above-identified patent and that said Letters Patent is hereby corrected as shown below:

On the Title Page

On page 2, in Column 2, item (56) under "Other Publications", Line 36, delete "Reporton" and insert --Report on-- therefor In the Drawings Sheet 14 of 35, Fig. 20, delete "1501" and insert --2001-- therefor On sheet 18 of 35, Fig. 25, delete "2502" and insert --2504-- therefor On sheet 31 of 35, Fig. 48, delete "4700" and insert --4800-- therefor In the Specification In Column 40, Line 4, delete "1506" and insert --1504-- therefor In Column 44, Line 16, delete "3208" and insert --3202-- therefor In Column 44, Line 18, delete "3208" and insert --3202-- therefor In Column 47, Line 26, delete "370" and insert --3700-- therefor Signed and Sealed this
Twenty-eighth Day of May, 2024

Katherine Kelly Vidal
*Director of the United States Patent and Trademark Office*